US012735210B2

(12) United States Patent
Lowe et al.

(10) Patent No.: US 12,735,210 B2
(45) Date of Patent: Sep. 15, 2026

(54) LANDING AND ALIGNMENT OF AN UNMANNED AERIAL VEHICLE WITH A BASE STATION

(71) Applicant: Skydio, Inc., San Mateo, CA (US)

(72) Inventors: Patrick Allen Lowe, Palo Alto, CA (US); Christopher C. Berthelet, Sunnyvale, CA (US); Maximilian Joseph Halper Krogius, San Mateo, CA (US); Divyanshu Pachisia, San Francisco, CA (US); Philipp Foehn, Foster City, CA (US); Benjamin Scott Thompson, San Carlos, CA (US); Yee Shan Woo, Campbell, CA (US); Joseph Tankeh, Fremont, CA (US); Andrew Xu, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/090,828

(22) Filed: Mar. 26, 2025

(65) Prior Publication Data

US 2026/0048867 A1 Feb. 19, 2026

Related U.S. Application Data

(60) Provisional application No. 63/683,496, filed on Aug. 15, 2024.

(51) Int. Cl.

*B64U 70/97* (2023.01)
*B64U 50/37* (2023.01)

(Continued)

(52) U.S. Cl.

CPC ............. *B64U 70/97* (2023.01); *B64U 50/37* (2023.01); *B64U 70/50* (2023.01); *B64U 80/25* (2023.01);

(Continued)

(58) Field of Classification Search

CPC ........ B64U 70/97; B64U 80/25; B64U 80/70; B64U 10/14; B64U 70/92; B64U 70/95; B64U 70/99

See application file for complete search history.

(56) References Cited

U.S. PATENT DOCUMENTS

| | | | |
|---|---|---|---|
| 3,253,806 | A | 5/1966 | Eickmann |
| 3,417,729 | A | 12/1968 | Gilday et al. |

(Continued)

FOREIGN PATENT DOCUMENTS

| | | | |
|---|---|---|---|
| CN | 104220780 | A | 12/2014 |
| CN | 106986043 | A | 7/2017 |

(Continued)

OTHER PUBLICATIONS

International Search Report and Written Opinion mailed on Jan. 9, 2026 in corresponding PCT Application No. PCT/US2025/042006.

*Primary Examiner* — Justin M Benedik

(74) *Attorney, Agent, or Firm* — Young Basile Hanlon & MacFarlane. P.C.

(57) ABSTRACT

A base station for an unmanned aerial vehicle (UAV) with a reconfigurable landing platform including alignment members, which engage the UAV and are repositionable between extended and retracted positions, and a drive mechanism, which is connected (secured) to the alignment members to facilitate extension and retraction thereof. During retraction, the alignment members engage the UAV and generally align a power source on the UAV with a charging hub of the base station, which facilitates not only charging of the UAV but proper closure of the base station.

20 Claims, 24 Drawing Sheets

(51) Int. Cl.

| | |
|---|---|
| ***B64U 70/50*** | (2023.01) |
| ***B64U 80/25*** | (2023.01) |
| ***B64U 80/70*** | (2023.01) |
| *B64F 1/35* | (2024.01) |
| *B64U 10/14* | (2023.01) |
| *B64U 70/92* | (2023.01) |
| *B64U 70/95* | (2023.01) |
| *B64U 70/99* | (2023.01) |

(52) U.S. Cl.
CPC ................ *B64U 80/70* (2023.01); *B64F 1/35* (2024.01); *B64U 10/14* (2023.01); *B64U 70/92* (2023.01); *B64U 70/95* (2023.01); *B64U 70/99* (2023.01)

(56) References Cited

U.S. PATENT DOCUMENTS

| | | | |
|---|---|---|---|
| 3,483,696 | A | 12/1969 | Gilbert et al. |
| 3,575,527 | A | 4/1971 | Watanabe et al. |
| 3,805,723 | A | 4/1974 | Bernaerts |
| 4,262,712 | A | 4/1981 | Young |
| 4,865,248 | A | 9/1989 | Barth |
| 4,954,962 | A | 9/1990 | Evans, Jr. et al. |
| 5,040,116 | A | 8/1991 | Evans, Jr. et al. |
| 5,116,273 | A | 5/1992 | Chan |
| 5,283,739 | A | 2/1994 | Summerville et al. |
| 5,371,581 | A | 12/1994 | Wangler et al. |
| 5,386,462 | A | 1/1995 | Schlamp |
| 5,452,374 | A | 9/1995 | Cullen et al. |
| 5,497,236 | A | 3/1996 | Wolff et al. |
| 5,731,884 | A | 3/1998 | Inoue |
| 5,842,667 | A | 12/1998 | Jones |
| 5,847,522 | A | 12/1998 | Barba |
| 5,901,253 | A | 5/1999 | Tretter |
| 5,995,898 | A | 11/1999 | Tuttle |
| 6,031,612 | A | 2/2000 | Shirley |
| 6,073,283 | A | 6/2000 | Zheng |
| 6,079,668 | A | 6/2000 | Brown |
| 6,266,577 | B1 | 7/2001 | Popp et al. |
| 6,344,796 | B1 | 2/2002 | Ogilvie et al. |
| 6,374,155 | B1 | 4/2002 | Wallach et al. |
| 6,426,699 | B1 | 7/2002 | Porter |
| 6,507,670 | B1 | 1/2003 | Moed |
| 6,543,983 | B1 | 4/2003 | Felder et al. |
| 6,636,781 | B1 | 10/2003 | Shen et al. |
| 6,676,460 | B1 | 1/2004 | Motsenbocker |
| 6,690,997 | B2 | 2/2004 | Rivalto |
| 6,694,217 | B2 | 2/2004 | Bloom |
| 6,705,523 | B1 | 3/2004 | Stamm et al. |
| 6,804,607 | B1 | 10/2004 | Wood |
| 6,919,803 | B2 | 7/2005 | Breed |
| 6,954,290 | B1 | 10/2005 | Braudaway et al. |
| 6,961,711 | B1 | 11/2005 | Chee |
| 6,965,440 | B1 | 11/2005 | Nakagiri et al. |
| 6,970,838 | B1 | 11/2005 | Kamath et al. |
| 7,006,952 | B1 | 2/2006 | Matsumoto et al. |
| 7,016,536 | B1 | 3/2006 | Ling et al. |
| 7,031,519 | B2 | 4/2006 | Elmenhurst |
| 7,082,883 | B1 | 8/2006 | Arias |
| 7,129,817 | B2 | 10/2006 | Yamagishi |
| 7,133,743 | B2 | 11/2006 | Tilles et al. |
| 7,145,699 | B2 | 12/2006 | Dolan |
| 7,149,611 | B2 | 12/2006 | Beck et al. |
| 7,171,879 | B2 | 2/2007 | Gass et al. |
| 7,188,513 | B2 | 3/2007 | Wilson |
| 7,334,755 | B2 | 2/2008 | Svoboda, Jr. |
| 7,335,071 | B1 | 2/2008 | Motsenbocker |
| 7,337,686 | B2 | 3/2008 | Sagi-Dolev |
| 7,337,944 | B2 | 3/2008 | Devar |
| 7,339,993 | B1 | 3/2008 | Brooks et al. |
| 7,459,880 | B1 | 12/2008 | Rosen |
| 7,639,386 | B1 | 12/2009 | Siegel et al. |
| 7,668,404 | B2 | 2/2010 | Adams et al. |
| 7,673,831 | B2 | 3/2010 | Steele et al. |
| 7,685,953 | B2 | 3/2010 | Giles |
| 7,693,745 | B1 | 4/2010 | Pomerantz et al. |
| 7,894,939 | B2 | 2/2011 | Zini et al. |
| 7,925,375 | B2 | 4/2011 | Schininger et al. |
| 7,946,526 | B2 | 5/2011 | Zimet |
| 7,946,530 | B1 | 5/2011 | Talmage, Jr. |
| 7,966,093 | B2 | 6/2011 | Zhuk |
| 8,015,023 | B1 | 9/2011 | Lee et al. |
| 8,052,081 | B2 | 11/2011 | Olm et al. |
| 8,078,317 | B2 | 12/2011 | Allinson et al. |
| 8,126,642 | B2 | 2/2012 | Trepagnier et al. |
| 8,131,607 | B2 | 3/2012 | Park et al. |
| 8,145,351 | B2 | 3/2012 | Schininger et al. |
| 8,195,328 | B2 | 6/2012 | Mallett et al. |
| 8,245,469 | B2 | 8/2012 | Rubel et al. |
| 8,256,172 | B2 | 9/2012 | Benson |
| 8,286,236 | B2 | 10/2012 | Jung et al. |
| 8,412,588 | B1 | 4/2013 | Bodell et al. |
| 8,418,959 | B2 | 4/2013 | Kang et al. |
| 8,429,754 | B2 | 4/2013 | Jung et al. |
| 8,511,606 | B1 | 8/2013 | Lutke et al. |
| 8,599,027 | B2 | 12/2013 | Sanchez |
| 8,602,349 | B2 | 12/2013 | Petrov |
| 8,639,400 | B1 | 1/2014 | Wong |
| 8,736,820 | B2 | 5/2014 | Choe et al. |
| 8,752,166 | B2 | 6/2014 | Jung et al. |
| 8,791,790 | B2 | 7/2014 | Robertson et al. |
| 8,874,301 | B1 | 10/2014 | Rao et al. |
| 8,899,903 | B1 | 12/2014 | Saad et al. |
| 8,948,914 | B2 | 2/2015 | Zini et al. |
| 8,956,100 | B2 | 2/2015 | Davi et al. |
| 8,989,053 | B1 | 3/2015 | Skaaksrud et al. |
| 9,033,285 | B2 | 5/2015 | Iden et al. |
| 9,050,997 | B1 | 6/2015 | Schramm |
| 9,051,043 | B1 | 6/2015 | Peeters et al. |
| 9,056,676 | B1 | 6/2015 | Wang |
| 9,079,587 | B1 | 7/2015 | Rupp et al. |
| 9,126,693 | B1 | 9/2015 | Shi et al. |
| 9,139,310 | B1 | 9/2015 | Wang |
| 9,163,909 | B2 | 10/2015 | Chengalva |
| 9,193,452 | B2 | 11/2015 | Carreker |
| 9,195,959 | B1 | 11/2015 | Lopez et al. |
| 9,216,587 | B2 | 12/2015 | Ando et al. |
| 9,216,857 | B1 | 12/2015 | Kalyan et al. |
| 9,235,213 | B2 | 1/2016 | Villamar |
| 9,244,147 | B1 | 1/2016 | Soundararajan et al. |
| 9,256,852 | B1 | 2/2016 | Myllymaki |
| 9,261,578 | B2 | 2/2016 | Im et al. |
| 9,290,277 | B2 | 3/2016 | You |
| 9,321,531 | B1 | 4/2016 | Takayama et al. |
| 9,336,635 | B2 | 5/2016 | Robertson et al. |
| 9,358,975 | B1 | 6/2016 | Watts |
| 9,381,916 | B1 | 7/2016 | Zhu et al. |
| 9,387,928 | B1 | 7/2016 | Gentry et al. |
| 9,397,518 | B1 | 7/2016 | Theobald |
| 9,404,761 | B2 | 8/2016 | Meuleau |
| 9,409,644 | B2 | 8/2016 | Stanek et al. |
| 9,411,337 | B1 | 8/2016 | Theobald et al. |
| 9,412,280 | B1 | 8/2016 | Zwillinger et al. |
| 9,421,869 | B1 | 8/2016 | Ananthanarayanan et al. |
| 9,436,183 | B2 | 9/2016 | Thakur et al. |
| 9,436,926 | B2 | 9/2016 | Cousins et al. |
| 9,446,858 | B2 | 9/2016 | Hess |
| 9,448,559 | B2 | 9/2016 | Kojo et al. |
| 9,457,899 | B2 | 10/2016 | Duffy et al. |
| 9,489,490 | B1 | 11/2016 | Theobald |
| 9,527,605 | B1 | 12/2016 | Gentry et al. |
| 9,535,421 | B1 | 1/2017 | Canoso et al. |
| 9,545,852 | B2 | 1/2017 | Streett |
| 9,551,989 | B2 | 1/2017 | Scarlatti et al. |
| 9,561,941 | B1 | 2/2017 | Watts |
| 9,563,201 | B1 | 2/2017 | Tofte et al. |
| 9,568,335 | B2 | 2/2017 | Thakur et al. |
| 9,582,950 | B2 | 2/2017 | Shimizu et al. |
| 9,589,448 | B1 | 3/2017 | Schneider et al. |
| 9,600,645 | B2 | 3/2017 | Fadell et al. |
| 9,619,776 | B1 | 4/2017 | Ford et al. |
| 9,623,562 | B1 | 4/2017 | Watts |
| 9,643,722 | B1 | 5/2017 | Myslinski |

(56) References Cited

U.S. PATENT DOCUMENTS 9,650,136 B1 5/2017 Haskin et al.
9,652,912 B2 5/2017 Fadell et al.
9,656,805 B1 5/2017 Evans et al.
9,671,791 B1 6/2017 Paczan
9,677,564 B1 6/2017 Woodworth et al.
9,697,730 B2 7/2017 Thakur et al.
9,718,564 B1 8/2017 Beckman et al.
9,720,414 B1 8/2017 Theobald
9,731,821 B2 8/2017 Hoareau et al.
9,733,646 B1 8/2017 Nusser et al.
9,746,852 B1 8/2017 Watts et al.
9,746,853 B2 8/2017 Scheepjens et al.
9,778,653 B1 10/2017 McClintock et al.
9,783,075 B2 10/2017 Henry et al.
9,783,301 B2 10/2017 Schliwa et al.
9,786,187 B1 10/2017 Bar-Zeev et al.
9,796,529 B1 10/2017 Hoareau et al.
9,815,633 B1 11/2017 Kisser et al.
9,828,092 B1 11/2017 Navot et al.
9,858,604 B2 1/2018 Apsley et al.
9,886,035 B1 2/2018 Watts et al.
9,896,204 B1 2/2018 Willison
9,957,045 B1 5/2018 Daly
9,959,771 B1 5/2018 Carlson
9,974,612 B2 5/2018 Pinter et al.
10,007,272 B2 * 6/2018 Tirpak .................. B64U 80/25
10,022,753 B2 7/2018 Chelian et al.
10,048,697 B1 8/2018 Theobald
10,079,497 B2 9/2018 Cheng et al.
10,099,561 B1 10/2018 Ananthanarayanan et al.
10,099,785 B1 10/2018 Gonzalez
10,108,185 B1 10/2018 Theobald
10,112,712 B1 10/2018 Gentry et al.
10,137,984 B1 11/2018 Flick
10,176,722 B1 1/2019 Boyd et al.
10,268,208 B1 4/2019 Hopwood Thomas
10,287,033 B2 5/2019 Hu
10,310,501 B2 6/2019 Greenberger et al.
10,434,885 B2 10/2019 Antonini et al.
10,467,685 B1 11/2019 Brisson et al.
10,507,938 B2 12/2019 Raz et al.
10,526,094 B2 1/2020 Cheng et al.
10,558,226 B1 2/2020 Bigdeli
10,577,126 B2 3/2020 Mozer
10,633,115 B2 4/2020 Pilskalns
10,719,080 B2 7/2020 Zhang et al.
10,745,102 B2 8/2020 Nysæter et al.
10,745,132 B1 8/2020 Kimchi
10,780,988 B2 9/2020 Buchmueller et al.
D903,576 S 12/2020 Feldman
10,860,115 B1 12/2020 Tran
10,899,436 B2 1/2021 Gentry
10,967,970 B2 4/2021 Van Niekerk et al.
11,007,290 B2 5/2021 Kreitenberg et al.
11,079,752 B1 8/2021 Lombardini
11,111,033 B1 9/2021 Burks et al.
D932,369 S 10/2021 Passley
11,148,805 B2 10/2021 Cooper et al.
11,148,808 B2 10/2021 Wiggerich
11,164,149 B1 11/2021 Williams et al.
11,180,253 B1 11/2021 Seeley
11,235,890 B1 2/2022 Dahlstrom et al.
11,292,620 B1 4/2022 Molony
11,370,561 B2 6/2022 Ratajczak et al.
11,459,117 B1 10/2022 Shapiro
11,534,801 B2 12/2022 Volta et al.
11,572,197 B1 2/2023 Nevdahs et al.
11,597,515 B2 3/2023 Passley
11,597,516 B1 3/2023 Klinkmueller et al.
11,603,218 B2 3/2023 Fisher et al.
11,603,219 B2 3/2023 Ratajczak et al.
11,609,581 B2 3/2023 Carthew et al.
11,619,952 B2 4/2023 Kwon et al.
11,628,932 B2 4/2023 Seung et al.
11,636,771 B2 4/2023 Barker et al.
11,641,966 B2 5/2023 Nakanishi
11,649,050 B1 5/2023 Miller
11,655,049 B1 * 5/2023 Montúfar Chávez ..... B64F 1/12 244/114 R
11,667,402 B2 6/2023 Liske et al.
11,673,690 B2 6/2023 Dayan et al.
11,710,092 B2 7/2023 Dearing
11,713,136 B2 8/2023 Foggia et al.
11,714,189 B2 8/2023 Padmanabhan et al.
11,738,867 B2 8/2023 Ehasoo et al.
11,741,422 B2 8/2023 Gil et al.
11,748,688 B2 9/2023 Ur
11,760,485 B2 9/2023 Wabnegger et al.
11,767,129 B2 9/2023 Warwick et al.
11,772,814 B2 10/2023 Dubois et al.
11,776,136 B1 10/2023 Pachikov et al.
11,780,606 B2 10/2023 Carthew et al.
11,794,894 B2 10/2023 Brock et al.
11,794,922 B1 10/2023 Twyford et al.
11,808,580 B1 11/2023 Ebrahimi Afrouzi et al.
11,814,191 B2 11/2023 Cheng et al.
11,814,241 B2 11/2023 Tian
D1,008,873 S 12/2023 Lin
11,840,152 B2 * 12/2023 Fisher ..................... B64C 29/02
11,851,162 B1 12/2023 Daube et al.
11,851,209 B2 12/2023 Fisher et al.
11,858,662 B2 1/2024 Gil
11,866,168 B2 1/2024 Cooper et al.
11,868,146 B2 1/2024 Yasunaga et al.
11,873,116 B2 1/2024 Kozlenko et al.
11,884,422 B2 1/2024 Lowe et al.
11,898,368 B2 2/2024 Blake et al.
11,900,823 B2 2/2024 Surace
11,932,315 B2 3/2024 Hwang et al.
11,933,613 B2 3/2024 Michini et al.
11,939,046 B1 3/2024 Berry et al.
11,939,057 B2 3/2024 Hamm
11,939,080 B2 3/2024 Cowden
11,939,083 B2 3/2024 Baklycki
12,017,553 B2 6/2024 Lowe et al.
12,059,089 B1 8/2024 Dunn
12,065,273 B2 * 8/2024 Kiyokami .............. B64U 10/13
12,084,211 B2 * 9/2024 Li .......................... B64U 70/99
12,090,359 B1 9/2024 Gonzalez
12,091,194 B2 9/2024 Wang et al.
12,099,370 B2 9/2024 Jourdan et al.
12,134,329 B2 11/2024 Todeschini
12,168,533 B1 12/2024 Hinman et al.
12,172,777 B2 12/2024 Carthew et al.
12,183,940 B2 12/2024 Bell
12,195,213 B2 1/2025 Qi et al.
12,195,214 B2 1/2025 Shi et al.
12,246,610 B2 3/2025 Altenhofen et al.
12,275,318 B2 4/2025 Lowe et al.
12,358,662 B2 * 7/2025 Roberts .................. B64U 80/25
12,391,414 B2 * 8/2025 Qiu ........................ B64U 80/70
2001/0045449 A1 11/2001 Shannon
2002/0016726 A1 2/2002 Ross
2002/0035450 A1 3/2002 Thackston
2002/0072979 A1 6/2002 Sinha et al.
2002/0087375 A1 7/2002 Griffin et al.
2002/0107751 A1 8/2002 Rajagopalan et al.
2002/0111914 A1 8/2002 Terada et al.
2002/0116289 A1 8/2002 Yang
2002/0123930 A1 9/2002 Boyd et al.
2002/0156645 A1 10/2002 Hansen
2003/0040980 A1 2/2003 Nakajima et al.
2003/0072031 A1 4/2003 Kuwata et al.
2003/0121968 A1 7/2003 Miller et al.
2003/0141411 A1 7/2003 Pandya et al.
2004/0002898 A1 1/2004 Kuhlmann et al.
2004/0068416 A1 4/2004 Solomon
2004/0112660 A1 6/2004 Johansson et al.
2004/0160335 A1 8/2004 Reitmeier
2004/0162638 A1 8/2004 Solomon
2004/0256519 A1 12/2004 Ellis et al.
2004/0257199 A1 12/2004 Fitzgibbon et al.
2005/0061910 A1 3/2005 Wobben
2005/0068178 A1 3/2005 Lee et al.

(56) References Cited

U.S. PATENT DOCUMENTS

2005/0093865 A1 5/2005 Jia
2005/0102240 A1 5/2005 Misra et al.
2005/0178894 A1 8/2005 McGeer et al.
2005/0244060 A1 11/2005 Nagarajan et al.
2005/0285934 A1 12/2005 Carter
2006/0038067 A1 2/2006 Dennis
2006/0053534 A1 3/2006 Mullen
2006/0118162 A1 6/2006 Saelzer et al.
2006/0136237 A1 6/2006 Spiegel et al.
2006/0249622 A1 11/2006 Steele
2006/0287829 A1 12/2006 Pashko-Paschenko
2007/0016496 A1 1/2007 Bar et al.
2007/0073552 A1 3/2007 Hileman
2007/0102565 A1 5/2007 Speer et al.
2007/0150375 A1 6/2007 Yang
2007/0170237 A1 7/2007 Neff
2007/0176432 A1 8/2007 Rolt
2007/0210953 A1 9/2007 Abraham et al.
2007/0233337 A1 10/2007 Plishner
2007/0244763 A1 10/2007 Williams et al.
2007/0246601 A1 10/2007 Layton
2007/0262195 A1 11/2007 Bulaga et al.
2007/0293978 A1 12/2007 Wurman et al.
2008/0012697 A1 1/2008 Smith et al.
2008/0027591 A1 1/2008 Lenser et al.
2008/0100258 A1 5/2008 Ward
2008/0109246 A1 5/2008 Russell
2008/0111816 A1 5/2008 Abraham et al.
2008/0141921 A1 6/2008 Hinderks
2008/0150679 A1 6/2008 Bloomfield
2008/0154659 A1 6/2008 Bettes et al.
2008/0167817 A1 7/2008 Hessler et al.
2008/0184906 A1 8/2008 Kejha
2008/0189012 A1 8/2008 Kaufmann
2008/0217486 A1 9/2008 Colten et al.
2008/0301009 A1 12/2008 Plaster et al.
2009/0027253 A1 1/2009 van Tooren et al.
2009/0057486 A1 3/2009 Becht, IV et al.
2009/0062974 A1 3/2009 Tamamoto et al.
2009/0063166 A1 3/2009 Palmer
2009/0079388 A1 3/2009 Reddy
2009/0086275 A1 4/2009 Liang et al.
2009/0091435 A1 4/2009 Bolourchi
2009/0106124 A1 4/2009 Yang
2009/0149985 A1 6/2009 Chirnomas
2009/0164379 A1 6/2009 Jung et al.
2009/0165127 A1 6/2009 Jung et al.
2009/0216394 A1 8/2009 Heppe et al.
2009/0236470 A1 9/2009 Goossen et al.
2009/0254457 A1 10/2009 Folsom
2009/0254482 A1 10/2009 Vadlamani et al.
2009/0299903 A1 12/2009 Hung et al.
2009/0303507 A1 12/2009 Abeloe
2009/0314883 A1 12/2009 Arlton et al.
2010/0007479 A1 1/2010 Smith
2010/0030608 A1 2/2010 Kaminsky et al.
2010/0031351 A1 2/2010 Jung et al.
2010/0038480 A1 2/2010 Wu et al.
2010/0088163 A1 4/2010 Davidson et al.
2010/0088175 A1 4/2010 Lundquist
2010/0100269 A1 4/2010 Ekhaguere et al.
2010/0169185 A1 7/2010 Cottingham
2010/0170993 A1 7/2010 Misegades
2010/0206145 A1 8/2010 Tetelbaum et al.
2010/0287065 A1 11/2010 Alivandi
2010/0299067 A1 11/2010 McCollough et al.
2010/0299222 A1 11/2010 Hamilton, IV et al.
2010/0320313 A1 12/2010 Hanafin et al.
2011/0035149 A1 2/2011 McAndrew et al.
2011/0068224 A1 3/2011 Kang et al.
2011/0074570 A1 3/2011 Feldstein et al.
2011/0087350 A1 4/2011 Fogel et al.
2011/0112761 A1 5/2011 Hurley et al.
2011/0153052 A1 6/2011 Pettibone et al.
2011/0166707 A1 7/2011 Romanov et al.
2011/0174925 A1 7/2011 Ying
2011/0178711 A1 7/2011 Christoph
2011/0210866 A1 9/2011 David et al.
2011/0227435 A1 9/2011 Maeda
2011/0246331 A1 10/2011 Luther et al.
2011/0253831 A1 10/2011 Cheng
2011/0264311 A1 10/2011 Lee et al.
2011/0282476 A1 11/2011 Hegemier et al.
2011/0301787 A1 12/2011 Chaperon et al.
2011/0313878 A1 12/2011 Norman
2012/0039694 A1 2/2012 Suzanne
2012/0078592 A1 3/2012 Sims, Jr.
2012/0080556 A1 4/2012 Root, Jr.
2012/0091260 A1 4/2012 Callou
2012/0109419 A1 5/2012 Mercado
2012/0219397 A1 8/2012 Baker
2012/0221438 A1 8/2012 Cook, Jr. et al.
2012/0227389 A1 9/2012 Hinderks
2012/0229325 A1 9/2012 Dutruc
2012/0234969 A1 9/2012 Savoye et al.
2012/0235606 A1 9/2012 Takeuchi
2012/0323365 A1 12/2012 Taylor et al.
2013/0006739 A1 1/2013 Horvitz et al.
2013/0073477 A1 3/2013 Grinberg
2013/0081245 A1 4/2013 Vavrina et al.
2013/0093582 A1 4/2013 Walsh et al.
2013/0126611 A1 5/2013 Kangas et al.
2013/0148123 A1 6/2013 Hayashi
2013/0193269 A1 8/2013 Zwaan et al.
2013/0206915 A1 8/2013 Desaulniers et al.
2013/0218446 A1 8/2013 Bradley et al.
2013/0218799 A1 8/2013 Lehmann et al.
2013/0233964 A1 9/2013 Woodworth et al.
2013/0261792 A1 10/2013 Gupta et al.
2013/0262252 A1 10/2013 Lakshman et al.
2013/0262276 A1 10/2013 Wan et al.
2013/0262336 A1 10/2013 Wan et al.
2013/0264381 A1 10/2013 Kim et al.
2013/0320133 A1 12/2013 Ratti et al.
2013/0324164 A1 12/2013 Vulcano
2013/0332062 A1 12/2013 Kreitmair-Steck et al.
2013/0344778 A1 12/2013 Schafer et al.
2014/0010656 A1 1/2014 Nies
2014/0025230 A1 1/2014 Levien et al.
2014/0030444 A1 1/2014 Swaminathan et al.
2014/0031964 A1 1/2014 Sidhu et al.
2014/0032034 A1 1/2014 Raptopoulos et al.
2014/0040065 A1 2/2014 DuBois
2014/0052661 A1 2/2014 Shakes et al.
2014/0058959 A1 2/2014 Isbjornssund et al.
2014/0081445 A1 3/2014 Villamar
2014/0089073 A1 3/2014 Jacobs et al.
2014/0124621 A1* 5/2014 Godzdanker ........... B64F 1/125
244/110 E
2014/0136282 A1 5/2014 Fedele
2014/0136414 A1 5/2014 Abhyanker
2014/0149244 A1 5/2014 Abhyanker
2014/0156053 A1 6/2014 Mahdavi et al.
2014/0180914 A1 6/2014 Abhyanker
2014/0200697 A1 7/2014 Cheng
2014/0214684 A1 7/2014 Pell
2014/0244433 A1 8/2014 Cruz
2014/0254896 A1 9/2014 Zhou et al.
2014/0257595 A1 9/2014 Tillmann
2014/0271200 A1 9/2014 Sutton et al.
2014/0283104 A1 9/2014 Nilsson
2014/0309813 A1 10/2014 Ricci
2014/0319272 A1 10/2014 Magana et al.
2014/0325218 A1 10/2014 Shimizu et al.
2014/0330456 A1 11/2014 Lopez Morales et al.
2015/0006005 A1 1/2015 Yu et al.
2015/0066178 A1 3/2015 Stava
2015/0069968 A1 3/2015 Pounds
2015/0097530 A1 4/2015 Scarlatti et al.
2015/0098819 A1 4/2015 Tourin et al.
2015/0102154 A1 4/2015 Duncan et al.
2015/0112837 A1 4/2015 O'Dea
2015/0112885 A1 4/2015 Fadell et al.
2015/0120094 A1 4/2015 Kimchi et al.

(56) References Cited

U.S. PATENT DOCUMENTS

2015/0120602 A1 4/2015 Huffman et al.
2015/0123462 A1 5/2015 Kamradt
2015/0127712 A1 5/2015 Fadell et al.
2015/0129716 A1 5/2015 Yoffe
2015/0158599 A1 6/2015 Sisko
2015/0175276 A1 6/2015 Koster
2015/0183528 A1 7/2015 Walsh et al.
2015/0185034 A1 7/2015 Abhyanker
2015/0191255 A1 7/2015 Zolich et al.
2015/0202770 A1 7/2015 Patron et al.
2015/0227882 A1 8/2015 Bhatt
2015/0246727 A1 9/2015 Masticola et al.
2015/0253777 A1 9/2015 Binney et al.
2015/0254611 A1 9/2015 Perez
2015/0259078 A1 9/2015 Filipovic et al.
2015/0286216 A1 10/2015 Miwa
2015/0314881 A1 11/2015 Tsaliah et al.
2015/0317597 A1 11/2015 Shucker et al.
2015/0332206 A1 11/2015 Trew et al.
2015/0336669 A1 11/2015 Kantor et al.
2015/0336670 A1 11/2015 Zhang
2015/0336677 A1 11/2015 Smaoui et al.
2015/0363843 A1 12/2015 Loppatto et al.
2015/0367850 A1 12/2015 Clarke et al.
2015/0370251 A1 12/2015 Siegel et al.
2016/0001877 A1 1/2016 Paulos
2016/0001883 A1 1/2016 Sanz et al.
2016/0003637 A1 1/2016 Andersen
2016/0009413 A1* 1/2016 Lee .......................... G08G 5/57
701/16
2016/0011592 A1 1/2016 Zhang et al.
2016/0019495 A1 1/2016 Kolchin
2016/0023761 A1 1/2016 McNally
2016/0033966 A1 2/2016 Farris et al.
2016/0039541 A1 2/2016 Beardsley et al.
2016/0051110 A1 2/2016 Cao et al.
2016/0058181 A1 3/2016 Han et al.
2016/0068264 A1 3/2016 Ganesh et al.
2016/0068265 A1 3/2016 Hoareau et al.
2016/0068267 A1 3/2016 Liu et al.
2016/0070265 A1 3/2016 Liu et al.
2016/0085238 A1 3/2016 Hayes
2016/0101856 A1 4/2016 Kohstall
2016/0104099 A1 4/2016 Villamar
2016/0104113 A1 4/2016 Gorlin
2016/0107750 A1 4/2016 Yates
2016/0114488 A1 4/2016 Mascorro Medina et al.
2016/0117931 A1 4/2016 Chan et al.
2016/0125746 A1 5/2016 Kunzi et al.
2016/0129592 A1 5/2016 Saboo et al.
2016/0130000 A1 5/2016 Rimanelli
2016/0130015 A1 5/2016 Caubel et al.
2016/0131025 A1 5/2016 Pekrul
2016/0132059 A1 5/2016 Mason et al.
2016/0144734 A1 5/2016 Wang et al.
2016/0144982 A1 5/2016 Sugumaran
2016/0180618 A1 6/2016 Ho et al.
2016/0185466 A1 6/2016 Dreano, Jr.
2016/0194959 A1 7/2016 Pekrul
2016/0196755 A1 7/2016 Navot et al.
2016/0196756 A1 7/2016 Prakash et al.
2016/0200438 A1 7/2016 Bokeno et al.
2016/0207627 A1 7/2016 Hoareau et al.
2016/0214717 A1 7/2016 De Silva
2016/0214728 A1 7/2016 Rossi et al.
2016/0221671 A1 8/2016 Fisher et al.
2016/0229299 A1 8/2016 Streett
2016/0229530 A1 8/2016 Welsh et al.
2016/0235236 A1 8/2016 Byers et al.
2016/0239789 A1 8/2016 Hanks
2016/0239803 A1 8/2016 Borley et al.
2016/0244162 A1 8/2016 Weller
2016/0244187 A1 8/2016 Byers et al.
2016/0257401 A1 9/2016 Buchmueller et al.
2016/0257423 A1 9/2016 Martin
2016/0257424 A1 9/2016 Stabler et al.
2016/0257426 A1* 9/2016 Mozer .................... B64U 70/30
2016/0258775 A1 9/2016 Santilli et al.
2016/0266578 A1 9/2016 Douglas et al.
2016/0272317 A1 9/2016 Cho et al.
2016/0280371 A1 9/2016 Canavor et al.
2016/0282126 A1 9/2016 Watts et al.
2016/0286128 A1 9/2016 Zhou
2016/0291445 A1 10/2016 Fisher, Sr. et al.
2016/0299233 A1 10/2016 Levien et al.
2016/0304198 A1 10/2016 Jourdan
2016/0304217 A1 10/2016 Fisher et al.
2016/0307448 A1 10/2016 Salnikov et al.
2016/0311329 A1 10/2016 Rodriguez
2016/0321503 A1 11/2016 Zhou
2016/0334229 A1 11/2016 Ross et al.
2016/0340006 A1 11/2016 Tang
2016/0340021 A1 11/2016 Zhang et al.
2016/0355261 A1 12/2016 Chin et al.
2016/0364660 A1 12/2016 Brown
2016/0364679 A1 12/2016 Cao
2016/0364823 A1 12/2016 Cao
2016/0364989 A1 12/2016 Speasl et al.
2016/0371984 A1 12/2016 Macfarlane et al.
2016/0378108 A1 12/2016 Paczan et al.
2017/0011333 A1 1/2017 Greiner et al.
2017/0011340 A1 1/2017 Gabbai
2017/0015415 A1 1/2017 Chan et al.
2017/0021923 A1 1/2017 Fisher et al.
2017/0021941 A1 1/2017 Fisher et al.
2017/0021942 A1 1/2017 Fisher et al.
2017/0023949 A1 1/2017 Fisher et al.
2017/0032315 A1 2/2017 Gupta et al.
2017/0050749 A1* 2/2017 Pilskalns ................. B60L 53/37
2017/0073085 A1 3/2017 Tremblay et al.
2017/0081043 A1 3/2017 Jones et al.
2017/0087999 A1 3/2017 Miller et al.
2017/0096222 A1 4/2017 Spinelli et al.
2017/0100837 A1 4/2017 Zevenbergen et al.
2017/0113352 A1 4/2017 Lutz et al.
2017/0117676 A1 4/2017 James et al.
2017/0121023 A1 5/2017 High et al.
2017/0129464 A1* 5/2017 Wang .................... H02J 7/0045
2017/0129603 A1 5/2017 Raptopoulos et al.
2017/0132558 A1 5/2017 Perez
2017/0137118 A1 5/2017 Gentry
2017/0137150 A1 5/2017 Conyers et al.
2017/0144776 A1 5/2017 Fisher et al.
2017/0147975 A1 5/2017 Natarajan et al.
2017/0152060 A1 6/2017 Morisawa
2017/0154347 A1 6/2017 Bateman
2017/0158352 A1 6/2017 von Flotow et al.
2017/0158353 A1 6/2017 Schmick
2017/0166327 A1 6/2017 Schmidt
2017/0167881 A1 6/2017 Rander et al.
2017/0174335 A1 6/2017 Malloy
2017/0190443 A1 7/2017 Fisher et al.
2017/0193442 A1 7/2017 Ekkel et al.
2017/0199522 A1 7/2017 Li
2017/0203632 A1 7/2017 Westendarp et al.
2017/0203857 A1 7/2017 O'Toole
2017/0217323 A1 8/2017 Antonini et al.
2017/0225782 A1 8/2017 Kohstall et al.
2017/0225783 A1 8/2017 Fisher et al.
2017/0225799 A1 8/2017 Selwyn et al.
2017/0225801 A1 8/2017 Bennett
2017/0225802 A1 8/2017 Lussier et al.
2017/0240062 A1 8/2017 Jaiswal et al.
2017/0240291 A1 8/2017 Kim
2017/0247120 A1 8/2017 Miller
2017/0253349 A1 9/2017 Wang et al.
2017/0255896 A1 9/2017 Van Dyke
2017/0270314 A1 9/2017 Tsybrovskyy et al.
2017/0275025 A1 9/2017 Johnson et al.
2017/0283090 A1 10/2017 Miller et al.
2017/0286905 A1 10/2017 Richardson et al.
2017/0300855 A1 10/2017 Lund et al.
2017/0305526 A1 10/2017 Thomassey
2017/0305575 A1 10/2017 Bash et al.

(56) References Cited

U.S. PATENT DOCUMENTS

2017/0308850 A1 10/2017 Roush et al.
2017/0316379 A1 11/2017 Lepek et al.
2017/0316701 A1 11/2017 Gil et al.
2017/0323129 A1 11/2017 Davidson et al.
2017/0327091 A1 11/2017 Capizzo
2017/0330145 A1 11/2017 Studnicka
2017/0341769 A1 11/2017 Haberbusch et al.
2017/0345245 A1 11/2017 Torresani et al.
2017/0372256 A1 12/2017 Kantor et al.
2018/0024554 A1 1/2018 Brady et al.
2018/0039286 A1 2/2018 Tirpak et al.
2018/0053139 A1 2/2018 Stoman
2018/0056794 A1 3/2018 Kim et al.
2018/0088586 A1 3/2018 Hance et al.
2018/0092345 A1 4/2018 Okumura
2018/0092484 A1 4/2018 Lewis et al.
2018/0105020 A1 4/2018 Smith et al.
2018/0105271 A1 4/2018 Wypyszynski et al.
2018/0105289 A1 4/2018 Walsh et al.
2018/0118340 A1 5/2018 Russo
2018/0118374 A1 5/2018 Lombardini et al.
2018/0127211 A1 5/2018 Jarvis et al.
2018/0137454 A1 5/2018 Kulkarni et al.
2018/0194484 A1 7/2018 Livieratos et al.
2018/0196418 A1 7/2018 Meier et al.
2018/0208070 A1 7/2018 Sanchez et al.
2018/0233055 A1 8/2018 Damnjanovic et al.
2018/0237161 A1 8/2018 Minnick et al.
2018/0245365 A1 8/2018 Wankewycz
2018/0257775 A1 9/2018 Baek et al.
2018/0265196 A1 9/2018 Phillips et al.
2018/0265295 A1 9/2018 Beckman et al.
2018/0265296 A1 9/2018 Beckman et al.
2018/0295327 A1 10/2018 Yearwood
2018/0312276 A1 11/2018 Miller et al.
2018/0319496 A1 11/2018 Zhang et al.
2018/0327091 A1 11/2018 Burks et al.
2018/0354649 A1 12/2018 Ortiz et al.
2018/0357910 A1 12/2018 Hobbs et al.
2018/0360326 A1 12/2018 Lee et al.
2018/0364740 A1 12/2018 Collins et al.
2018/0370618 A1 12/2018 Harris
2018/0370652 A1 12/2018 Vendrame et al.
2019/0002128 A1 1/2019 Raz et al.
2019/0009926 A1 1/2019 Hu
2019/0016476 A1 1/2019 Scherz
2019/0023133 A1 1/2019 Renold et al.
2019/0023416 A1 1/2019 Borko et al.
2019/0028904 A1 1/2019 Carpenter et al.
2019/0047462 A1 2/2019 Vijayaraghavan et al.
2019/0051192 A1 2/2019 Schick et al.
2019/0055018 A1 2/2019 Bei et al.
2019/0100108 A1 4/2019 Davis et al.
2019/0100313 A1 4/2019 Campbell
2019/0100330 A1 4/2019 Cheng et al.
2019/0106224 A1 4/2019 Nishikawa et al.
2019/0108472 A1 4/2019 Sweeney et al.
2019/0135403 A1 5/2019 Perry et al.
2019/0152326 A1* 5/2019 Nishikawa ............ B64U 50/19
2019/0161190 A1 5/2019 Gil et al.
2019/0172358 A1 6/2019 Zhou et al.
2019/0193952 A1 6/2019 Zevenbergen et al.
2019/0202578 A1 7/2019 Fox et al.
2019/0217952 A1 7/2019 Zawadzki et al.
2019/0217968 A1 7/2019 Schmidt
2019/0233103 A1 8/2019 High et al.
2019/0233107 A1 8/2019 Tian
2019/0245365 A1 8/2019 Farrahi Moghaddam et al.
2019/0256201 A1 8/2019 Plekhanov
2019/0256202 A1 8/2019 Resnick
2019/0256207 A1 8/2019 Nohmi et al.
2019/0258910 A1 8/2019 Stoman
2019/0263519 A1 8/2019 Argus
2019/0270526 A1 9/2019 Hehn et al.
2019/0283871 A1 9/2019 Wieczorek
2019/0291961 A1 9/2019 Urban
2019/0308724 A1* 10/2019 Cooper .................. B64U 80/25
2019/0315235 A1 10/2019 Kung
2019/0315463 A1 10/2019 Chen et al.
2019/0337407 A1 11/2019 Wang
2019/0348862 A1 11/2019 Obayashi
2019/0382134 A1 12/2019 Baklycki
2019/0383052 A1 12/2019 Blake et al.
2020/0003529 A1 1/2020 Benezra
2020/0010214 A1 1/2020 Newcomb
2020/0017218 A1 1/2020 Ahmad et al.
2020/0017237 A1 1/2020 Walker
2020/0031466 A1 1/2020 Anderson
2020/0036243 A1 1/2020 Zhao
2020/0044463 A1 2/2020 Kim et al.
2020/0055613 A1 2/2020 Miller et al.
2020/0062373 A1 2/2020 Liao
2020/0062419 A1 2/2020 Jimenez Hernandez et al.
2020/0094957 A1 3/2020 Sohmshetty et al.
2020/0108930 A1 4/2020 Foley
2020/0113167 A1 4/2020 Bouten
2020/0148322 A1 5/2020 Pekrul
2020/0165008 A1* 5/2020 Krauss ................. G05D 1/0676
2020/0180940 A1 6/2020 Rainville
2020/0189731 A1 6/2020 Mistry et al.
2020/0198803 A1 6/2020 Zhou
2020/0207484 A1 7/2020 Foggia et al.
2020/0207485 A1 7/2020 Foggia et al.
2020/0218287 A1 7/2020 Wang et al.
2020/0218288 A1 7/2020 Johnson et al.
2020/0225684 A1 7/2020 Anderson et al.
2020/0239160 A1 7/2020 Cheng et al.
2020/0247540 A1 8/2020 Jones et al.
2020/0262583 A1 8/2020 Ducharme et al.
2020/0272144 A1 8/2020 Yang et al.
2020/0284883 A1 9/2020 Ferreira et al.
2020/0290752 A1 9/2020 Kolosiuk
2020/0301445 A1 9/2020 Jourdan et al.
2020/0309489 A1 10/2020 Kadavanich et al.
2020/0310465 A1* 10/2020 Carthew ................ B64U 70/92
2020/0324898 A1 10/2020 Youmans et al.
2020/0346736 A1 11/2020 Krasnoff
2020/0346743 A1 11/2020 Bernard
2020/0349852 A1 11/2020 DiCosola
2020/0369384 A1 11/2020 Kelly
2020/0369408 A1 11/2020 Dolata et al.
2020/0398999 A1 12/2020 Ortiz et al.
2020/0406773 A1 12/2020 Lacaze et al.
2021/0016696 A1 1/2021 Kelly et al.
2021/0031947 A1* 2/2021 Wankewycz ............ B60L 53/51
2021/0045564 A1 2/2021 Duckers et al.
2021/0047055 A1 2/2021 Lee et al.
2021/0053677 A1 2/2021 Passley
2021/0070468 A1 3/2021 Svirsky et al.
2021/0074170 A1 3/2021 Barker et al.
2021/0086913 A1 3/2021 Friedman et al.
2021/0089055 A1 3/2021 Tran
2021/0094686 A1 4/2021 Metzner et al.
2021/0107682 A1 4/2021 Kozlenko et al.
2021/0107684 A1 4/2021 Le Lann
2021/0114729 A1 4/2021 Ragan et al.
2021/0122495 A1 4/2021 Rezvani et al.
2021/0125503 A1 4/2021 Henry et al.
2021/0127658 A1 5/2021 Luebke et al.
2021/0197983 A1 7/2021 Wang et al.
2021/0214068 A1 7/2021 Bry et al.
2021/0214102 A1 7/2021 Geng et al.
2021/0224739 A1* 7/2021 Sweeny ................. B64U 80/25
2021/0229805 A1* 7/2021 Getman .................. B64C 27/52
2021/0237694 A1 8/2021 Hirschvogel et al.
2021/0237899 A1 8/2021 Warwick et al.
2021/0253242 A1 8/2021 Falk-Petersen et al.
2021/0276735 A1 9/2021 Raptopoulos et al.
2021/0284335 A1 9/2021 Mclaughlin et al.
2021/0284356 A1 9/2021 Jourdan et al.
2021/0300591 A1 9/2021 Tian
2021/0309388 A1 10/2021 Ratajczak et al.
2021/0339842 A1 11/2021 Sauer
2021/0347500 A1 11/2021 Hagan

(56) References Cited

U.S. PATENT DOCUMENTS

2021/0349456 A1 11/2021 Pham et al.
2021/0354820 A1 11/2021 Hiller
2021/0371128 A1 12/2021 Rodriguez et al.
2021/0394930 A1 12/2021 O'Toole
2021/0405655 A1* 12/2021 Yi .......................... B64U 70/90
2022/0009647 A1 1/2022 Johannesson et al.
2022/0019247 A1* 1/2022 Dayan .................... G05D 1/104
2022/0041279 A1 2/2022 Rowse et al.
2022/0041299 A1 2/2022 Wankewycz et al.
2022/0055745 A1 2/2022 Walker et al.
2022/0055770 A1 2/2022 O'Toole
2022/0063798 A1 3/2022 Johnson
2022/0073214 A1 3/2022 Liske et al.
2022/0106125 A1 4/2022 Ragan et al.
2022/0119103 A1* 4/2022 Braun .................... B25J 9/1687
2022/0119105 A1 4/2022 Schmalzried et al.
2022/0162001 A1 5/2022 Gherardi et al.
2022/0163980 A1 5/2022 Beer et al.
2022/0169400 A1 6/2022 Seeley
2022/0169401 A1 6/2022 Di Cosola
2022/0171388 A1 6/2022 Yanagihashi et al.
2022/0177124 A1 6/2022 Marshall et al.
2022/0185501 A1 6/2022 Kempley
2022/0234757 A1 7/2022 Dayan et al.
2022/0242589 A1 8/2022 Pham et al.
2022/0247347 A1 8/2022 Gavrilov
2022/0289376 A1 9/2022 Hayakawa
2022/0306320 A1 9/2022 Howe et al.
2022/0315248 A1 10/2022 Castellano Aldave et al.
2022/0380063 A1 12/2022 Shah et al.
2022/0396373 A1 12/2022 Wang et al.
2023/0017530 A1 1/2023 Lowe et al.
2023/0023246 A1 1/2023 McLaughlin et al.
2023/0031028 A1 2/2023 Ehasoo et al.
2023/0044050 A1 2/2023 Cevacins et al.
2023/0045483 A1 2/2023 Ahn
2023/0045691 A1 2/2023 Cevacins et al.
2023/0046127 A1 2/2023 Guerra Johansson
2023/0063715 A1* 3/2023 Bell ..................... G05D 1/0246
2023/0065140 A1 3/2023 Blevins et al.
2023/0074715 A1 3/2023 Kwon
2023/0088830 A1 3/2023 Kim
2023/0096139 A1 3/2023 Ubaldi
2023/0100169 A1 3/2023 Laczak et al.
2023/0133068 A1 5/2023 Wiegman
2023/0140387 A1 5/2023 Infanti et al.
2023/0159192 A1 5/2023 Gil et al.
2023/0202680 A1 6/2023 Yehya
2023/0202682 A1* 6/2023 Kiyokami .............. B64U 70/90
244/114 R
2023/0202691 A1* 6/2023 Kiyokami .............. B64U 70/93
244/114 R
2023/0244249 A1 8/2023 Smith et al.
2023/0298268 A1 9/2023 Oleynikova et al.
2023/0303272 A1 9/2023 Passley
2023/0347765 A1 11/2023 Lowe et al.
2023/0348099 A1 11/2023 Woo et al.
2023/0348100 A1 11/2023 Altenhofen et al.
2023/0348103 A1 11/2023 Lowe et al.
2023/0348104 A1 11/2023 Lowe et al.
2023/0348105 A1 11/2023 Grasberger et al.
2023/0348106 A1* 11/2023 Berthelet ............... B64U 70/97
2023/0348122 A1 11/2023 Fehler et al.
2023/0349146 A1 11/2023 Vasconi
2023/0373626 A1 11/2023 Kiyokami
2023/0373668 A1 11/2023 Kozlenko et al.
2023/0399132 A1* 12/2023 Kiyokami ............. B64C 39/024
2024/0002080 A1* 1/2024 Shi .......................... B64F 1/362
2024/0010368 A1 1/2024 Liao et al.
2024/0067371 A1 2/2024 Turner et al.
2024/0076067 A1 3/2024 Takahashi et al.
2024/0076072 A1* 3/2024 Arii ........................ B64U 30/20
2024/0101038 A1 3/2024 Liffring et al.
2024/0101286 A1 3/2024 Regev
2024/0101287 A1 3/2024 Takahashi et al.
2024/0109656 A1 4/2024 Stege
2024/0132238 A1* 4/2024 Qiu ........................ B64U 70/92
2024/0140228 A1 5/2024 Lowe et al.
2024/0140630 A1 5/2024 Lee et al.
2024/0158112 A1 5/2024 Le Lann
2024/0176367 A1 5/2024 Zhou et al.
2024/0190593 A1 6/2024 Shah et al.
2024/0262545 A1* 8/2024 Fu .......................... B64U 80/20
2024/0278946 A1* 8/2024 Roberts .................. B64U 70/92
2024/0300677 A1 9/2024 Sercel et al.
2024/0336378 A1* 10/2024 Neate ..................... B64U 10/60
2024/0343426 A1* 10/2024 Cornew ................. B64U 80/25
2024/0365728 A1 11/2024 Miller et al.
2024/0384587 A1 11/2024 Anderson et al.
2024/0391616 A1* 11/2024 Dayan .................... B64U 70/90
2024/0425199 A1 12/2024 Li et al.
2025/0002185 A1* 1/2025 Liu ........................ B64U 80/70
2025/0026509 A1 1/2025 Infanti et al.
2025/0074632 A1 3/2025 DiCosola
2025/0108943 A1 4/2025 Sekiguchi et al.
2025/0121966 A1 4/2025 Gronstedt et al.
2025/0128638 A1 4/2025 Scheler et al.
2025/0145314 A1 5/2025 Gronstedt et al.
2025/0223061 A1 7/2025 Merdin et al.

FOREIGN PATENT DOCUMENTS

CN 206485585 U 9/2017
CN 110494362 A 11/2019
EP 4059841 A1 9/2022
WO 2014160589 A1 10/2014
WO 2021230948 A2 11/2021
WO 2023056516 A1 4/2023

* cited by examiner

LANDING AND ALIGNMENT OF AN UNMANNED AERIAL VEHICLE WITH A BASE STATION

CROSS-REFERENCE TO RELATED APPLICATION(S)

This application claims the benefit of and priority to U.S. Provisional Patent Application Ser. No. 63/683,496, filed on Aug. 15, 2024, the entire content of which is hereby incorporated by reference.

TECHNICAL FIELD

The present disclosure relates to a base station for an unmanned aerial vehicle (UAV) (e.g., a drone). More specifically, the present disclosure relates to a base station that includes a reconfigurable landing platform that facilitates landing and charging of the UAV and improves the overall docking procedure.

BACKGROUND

Base stations are utilized to service and accommodate UAVs during use and storage. During landing, the UAV is received by a landing surface that is often configured for electrical connection to the UAV in order to charge the UAV. Proper landing thus facilitates not only charging of the UAV but closure of the base station in a manner that avoids damage to the UAV and/or the base station.

In order to improve upon the overall docking procedure, the present disclosure provides a base station with a landing platform that is reconfigurable from a first configuration into a second configuration to reposition (e.g., generally center) the UAV on the landing platform, which generally aligns a power source on the UAV with a charging hub of the base station and inhibits (if not entirely prevents) contact between the UAV and the roof of the base station during closure.

SUMMARY

In one aspect of the present disclosure, a base station for a UAV is disclosed that includes a roof and a base that supports the roof.

The base includes a body and a landing platform that is supported by the body. The landing platform includes a stage, which defines landing areas that are configured to receive the UAV during docking, and alignment members, which are configured for engagement with the UAV and are repositionable in relation to the stage from an extended position into a retracted position to thereby reposition the UAV on the landing platform and inhibit contact between the UAV and the roof during closure.

In certain embodiments, the platform may be pivotably connected to the body such that the landing platform is repositionable between a closed position and an open position.

In certain embodiments, the landing areas may define depressions that extend vertically into the stage.

In certain embodiments, the depressions may be generally circular in configuration.

In certain embodiments, the depressions may be configured to receive legs of the UAV.

In certain embodiments, the alignment members may be positioned laterally outward of the landing areas in the extended position.

In certain embodiments, the alignment members may include fences that span the landing areas and projections that extend laterally inward from the fences.

In certain embodiments, the projections may be generally centered along the fences.

In certain embodiments, the projections may be generally triangular in configuration.

In certain embodiments, the projections may define bearing surfaces that are configured for engagement with the UAV.

In certain embodiments, the bearing surfaces may subtend an angle therebetween that lies substantially within a range of approximately 90 degrees to approximately 150 degrees whereby the projections urge the UAV outwardly towards a periphery of the landing platform upon contact therewith during repositioning of the alignment members from the extended position into the retracted position.

In another aspect of the present disclosure, a base station for a UAV is disclosed that includes: a body; a charging hub that is supported by the body and which is configured for electrical connection to the UAV to facilitate charging thereof; and a landing platform that is supported by the body.

The landing platform includes a stage and alignment members that are configured for engagement with the UAV.

The stage includes depressions that are configured to receive the UAV to thereby inhibit movement of the UAV in relation to the landing platform and a window that is generally aligned with the charging hub.

The alignment members are configured for engagement with the UAV and are repositionable in relation to the stage from an extended position into a retracted position to thereby generally align a power source on the UAV with the charging hub.

In certain embodiments, the landing platform may further include fiducials that are configured to facilitate landing of the UAV.

In certain embodiments, the fiducials may include at least one first fiducial having a first configuration and at least one second fiducial having a second configuration that is different than the first configuration.

In certain embodiments, the at least one first fiducial may be positioned within at least one of the depressions.

In certain embodiments, the at least one second fiducial may be positioned between the depressions.

In certain embodiments, the landing platform may further include at least one light source that is associated with the at least one first fiducial and the at least one second fiducial to facilitate backlighting thereof.

In certain embodiments, the fiducials may further include at least one third fiducial that is devoid of backlighting.

In another aspect of the present disclosure, a base station for a UAV is disclosed that includes a charging hub and a landing platform.

The charging hub is configured for electrical connection to the UAV.

The landing platform is configured to receive the UAV and is reconfigurable from a first configuration into a second configuration to thereby generally align the UAV with the charging hub and facilitate charging of the UAV.

In certain embodiments, the landing platform may include alignment members that are repositionable along an axis that extends in generally orthogonal relation to a landing direction of the UAV during reconfiguration of the landing platform from the first configuration into the second configuration.

In certain embodiments, the alignment members may be movable laterally inward towards each other during reconfiguration of the landing platform from the first configuration into the second configuration.

In another aspect of the present disclosure, a landing platform for a base station is disclosed that is configured to receive a UAV. The landing platform is reconfigurable from a first configuration into a second configuration to thereby reposition the UAV on the landing platform and includes: a stage; alignment members; and a drive mechanism.

The alignment members are configured for engagement with the UAV and are repositionable in relation to the stage from an extended position, which corresponds to the first configuration of the landing platform, into a retracted position, which corresponds to the second configuration of the landing platform.

The drive mechanism is connected to the alignment members to facilitate repositioning from the extended position into the retracted position and includes: a drive member; pulley assemblies that engage the drive member; drive brackets that extend between and connect the drive member and the alignment members such that movement of the drive member causes corresponding movement of the drive brackets and the alignment members; and slide assemblies that support the alignment members.

The slide assemblies include: slide brackets that are connected to the stage; guides that are connected to the slide brackets; and slide members that are movable in relation to the guides and which are connected to the alignment members such that movement of the alignment members causes corresponding movement of the slide members.

In certain embodiments, the pulley assemblies may include: a first pulley assembly, which defines a first axis of rotation; a second pulley assembly, which defines second axes of rotation; third pulley assemblies, which define third axes of rotation; and a fourth pulley assembly, which defines a fourth axis of rotation.

In certain embodiments, the first axis of rotation, the third axes of rotation, and the fourth axis of rotation may be fixed.

In certain embodiments, the second axes of rotation may be movable.

In certain embodiments, the pulley assemblies may include: a first pulley assembly; a second pulley assembly; third pulley assemblies; and a fourth pulley assembly.

The first pulley assembly is connected to the stage and includes a first frame and a first pulley that extends into the first frame. The first pulley engages the drive member such that the drive member extends about the first pulley whereby rotation of the first pulley causes movement of the drive member.

The second pulley is connected to the stage and includes a second frame and second pulleys that are rotatable in relation to the second frame. The second pulleys engage the drive member such that the drive member extends between the second pulleys.

The third pulley assemblies are connected to the stage and each include a third frame and third pulleys that are rotatable in relation to the third frame. The third pulleys engage the drive member such that the drive member extends about the third pulleys.

The fourth pulley assembly is connected to the stage and includes a first bracket and a second bracket.

The first bracket is fixedly connected to the stage, and the second bracket is movably connected to the stage such that the second bracket is axially movable in relation to the first bracket.

The second bracket includes a fourth frame and a fourth pulley that is rotatable in relation to the fourth frame. The fourth pulley engages the drive member such that the drive member extends about the fourth pulley.

In certain embodiments, the second pulleys may be laterally movable in relation to the second frame.

In certain embodiments, the second pulley assembly may further include pulley shafts that are connected to the second pulleys and which extend into slots in the frame.

In certain embodiments, the second pulley assembly may further include a biasing member that extends between the pulley shafts to bias the second pulleys laterally inward and thereby apply a lateral tension to the drive member.

In certain embodiments, the third pulleys may be laterally fixed in relation to the third frame.

In certain embodiments, the fourth pulley assembly may further include an adjustment member that extends between the first bracket and the second bracket, wherein the adjustment member is configured to vary an axial tension in the drive member.

In another aspect of the present disclosure, a reconfigurable landing platform for a base station is disclosed that is configured to receive a UAV. The reconfigurable landing platform includes alignment members and a drive mechanism.

The alignment members are configured for engagement with the UAV and are repositionable from an extended position into a retracted position to thereby reposition the UAV on the reconfigurable landing platform.

The drive mechanism is connected to the alignment members to facilitate repositioning from the extended position into the retracted position. The drive mechanism includes a drive member and pulley assemblies that engage the drive member and which are configured to vary a lateral tension and an axial tension in the drive member.

In certain embodiments, the pulley assemblies may include adjustable pulley assemblies and non-adjustable pulley assemblies.

In certain embodiments, the adjustable pulley assemblies may include a first adjustable pulley assembly that is configured to apply the lateral tension to the drive member and a second adjustable pulley assembly that is configured to apply the axial tension to the drive member.

In certain embodiments, the first adjustable pulley assembly may include: a first frame that defines slots; pulley shafts that extend into the slots; and first pulleys that are connected to the pulley shafts.

In certain embodiments, the first adjustable pulley assembly may further include a biasing member that extends between the pulley shafts to bias the first pulleys laterally inward and thereby vary the lateral tension in the drive member.

In certain embodiments, the second adjustable pulley assembly may include a fixed bracket and a movable bracket that is axially repositionable in relation to the fixed bracket, wherein axial repositioning of the movable bracket in relation to the fixed bracket varies the axial tension in the drive member.

In another aspect of the present disclosure, a reconfigurable landing platform for a base station is disclosed that is configured to receive a UAV. The reconfigurable landing platform includes alignment members and a drive mechanism.

The alignment members are configured for engagement with the UAV and are repositionable from an extended position into a retracted position to thereby reposition the UAV on the reconfigurable landing platform.

The drive mechanism is connected to the alignment members to facilitate repositioning from the extended position into the retracted position. The drive mechanism includes a drive member and drive brackets that extend between and connect the drive member and the alignment members such that movement of the drive member causes corresponding movement of the drive brackets and the alignment members.

In certain embodiments, the drive mechanism may further include slide assemblies that support the alignment members to facilitate repositioning of the alignment members from the extended position into the retracted position.

In certain embodiments, the slide assemblies may include guides and slide members that are movable in relation to the guides. The slide members are connected to the alignment members such that movement of the alignment members causes corresponding movement of the slide members.

In certain embodiments, the slide assemblies may further include guards that are positioned between the slide members and the alignment members. The guards conceal the slide members to thereby protect the slide members from water and/or debris.

In another aspect of the present disclosure, a method of docking a UAV with a base station is disclosed. The method includes landing the UAV on a landing platform of the base station and reconfiguring the landing platform from a first configuration into a second configuration to thereby reposition the UAV on the landing platform.

In certain embodiments, landing the UAV may include receiving the UAV within landing areas defining depressions that extend vertically into the landing platform.

In certain embodiments, reconfiguring the landing platform from the first configuration into the second configuration may include generally centering the UAV on the landing platform.

In certain embodiments, reconfiguring the landing platform from the first configuration into the second configuration may include repositioning alignment members on the landing platform from an extended position into a retracted position.

In certain embodiments, repositioning the alignment members from the extended position into the retracted position may include moving the alignment members laterally inwards towards each other.

In certain embodiments, reconfiguring the landing platform from the first configuration into the second configuration may include causing the alignment members to engage legs of the UAV and urging the UAV towards a periphery of the landing platform. In certain embodiments, reconfiguring the landing platform from the first configuration into the second configuration may include generally aligning a power source on the UAV with a charging hub of the base station.

In certain embodiments, the method may further include repositioning the charging hub from a first position into a second position.

In certain embodiments, repositioning the charging hub from the first position into the second position may include extending the charging hub through a window in the landing platform.

In certain embodiments, extending the charging hub may include electrically connecting the charging hub to the power source on the UAV to thereby charge the UAV.

In another aspect of the present disclosure, a method of docking a UAV with a base station is disclosed. The method includes: opening a roof of the base station; guiding the UAV via visualization of a fiducial on a landing platform of the base station; landing the UAV on the landing platform; and retracting alignment members on the landing platform into engagement with the UAV to thereby generally center the UAV on the landing platform.

In certain embodiments, retracting the alignment members may include repositioning the alignment members along an axis of movement that extends in generally orthogonal relation to a landing direction of the UAV.

In certain embodiments, the method may further include performing a landing assessment to confirm proper landing of the UAV.

In certain embodiments, performing the landing assessment may include confirming that the UAV is positioned within landing areas on the landing platform.

In certain embodiments, confirming that the UAV is positioned within the landing areas may include detecting the UAV via the at least one fiducial.

In certain embodiments, guiding the UAV may include visualizing a first fiducial that is positioned within at least one of a plurality of landing areas on the landing platform and visualizing a second fiducial that is positioned between the plurality of landing areas.

In certain embodiments, the method may further include backlighting the first fiducial and/or the second fiducial.

In certain embodiments, the method may further include extending the alignment members to thereby disengage the alignment members from the UAV and closing the roof of the base station.

In another aspect of the present disclosure, a method of docking a UAV with a base station is disclosed. The method includes: opening a roof of the base station to expose a landing platform; guiding the UAV via visualization of a fiducial positioned within at least one of a plurality of landing areas that extend vertically into the landing platform; receiving the UAV within the landing areas; generally aligning a power source on the UAV with a charging hub of the base station; repositioning the charging hub from a first position, in which the charging hub is concealed within the landing platform, into a second position, in which the charging hub extends through a window in the landing platform; and electrically connecting the power source on the UAV to the charging hub to thereby charge the UAV.

In certain embodiments, generally aligning the power source on the UAV with the charging hub may include repositioning the UAV on the landing platform.

In certain embodiments, repositioning the UAV on the landing platform may include urging the UAV towards a periphery of the landing platform and generally centering the UAV on the landing platform.

In another aspect of the present disclosure, a landing platform is disclosed for a base station that is configured to receive a UAV. The landing platform includes: a drive member; pulley assemblies that engage the drive member; drive brackets that are connected to the drive member such that movement of the drive member causes corresponding movement of the drive brackets; and alignment members that are connected to the drive brackets such that movement of the drive brackets causes corresponding movement of the alignment members between an extended position and a retracted position, wherein the alignment members are configured to engage the UAV such that movement of the alignment members from the extended position into the retracted position repositions the UAV on the landing platform.

The pulley assemblies include: a first pulley assembly, which defines a first axis of rotation; a second pulley assembly, which defines second axes of rotation; third pulley assemblies, which define third axes of rotation; and a fourth pulley assembly, which defines a fourth axis of rotation.

In certain embodiments, the first axis of rotation, the third axes of rotation, and the fourth axis of rotation may be fixed.

In certain embodiments, the second axes of rotation may be movable.

In certain embodiments, the second pulley assembly may be adjustable to thereby vary a lateral tension in the drive member.

In certain embodiments, the second pulley assembly may include: a frame; pulley shafts that extend into the frame; and pulleys that engage the drive member and which are connected to the pulley shafts such that the pulley shafts and the pulleys are laterally movable in relation to the frame.

In certain embodiments, the second pulley assembly may further include a biasing member that is connected to the pulley shafts to bias the pulley shafts and the pulleys laterally inward to thereby apply the lateral tension to the drive member.

In certain embodiments, the fourth pulley assembly may be adjustable to thereby vary an axial tension in the drive member.

In certain embodiments, the fourth pulley assembly may include a fixed bracket and a movable bracket that engages the drive member, wherein the movable bracket is axially repositionable in relation to the fixed bracket to thereby expand and compress the fourth pulley assembly.

In certain embodiments, the fourth pulley assembly may further include an adjustment member that extends between the fixed bracket and the movable bracket.

In certain embodiments, the adjustment member may threadably engage the movable bracket such that rotation of the adjustment member causes axial repositioning of the movable bracket.

In another aspect of the present disclosure, a landing platform is disclosed for a base station that is configured to receive a UAV. The landing platform includes: a drive member; alignment members that are operatively connected to the drive member such that movement of the drive member causes corresponding movement of the alignment members; and pulley assemblies that support the drive member, wherein the pulley assemblies include adjustable pulley assemblies and non-adjustable pulley assemblies.

In certain embodiments, the adjustable pulley assemblies nay include a first adjustable pulley assembly, which is configured to apply a lateral tension to the drive member, and a second adjustable pulley assembly, which is configured to apply an axial tension to the drive member.

In certain embodiments, the first adjustable pulley assembly may include a frame and first pulleys that engage the drive member and which are laterally movable in relation to the frame.

In certain embodiments, the first adjustable pulley assembly may further include a biasing member that is configured to bias the first pulleys laterally inward.

In certain embodiments, the second adjustable pulley assembly nay include: a first bracket; a second bracket, which includes a second pulley that engages the drive member; and an adjustment member that extends between the first bracket and the second bracket, wherein rotation of the adjustment member causes axial repositioning of the second bracket to thereby expand and compress the second adjustable pulley assembly.

In another aspect of the present disclosure, a landing platform is disclosed for a base station that is configured to receive a UAV. The landing platform includes: a drive member; alignment members that are operatively connected to the drive member such that movement of the drive member causes extension and retraction of the alignment members to thereby reposition the UAV on the landing platform; a first pulley assembly that is configured to apply a lateral tension to the drive member; and a second pulley assembly that is configured to apply an axial tension to the drive member.

In certain embodiments, the first pulley assembly may include first pulleys that engage the drive member and which are rotatable about movable axes of rotation.

In certain embodiments, the second pulley assembly may include a second pulley that engages the drive member and which is rotatable about a fixed axis of rotation.

In certain embodiments, the first pulley assembly may include a first biasing member that extends in generally orthogonal relation to a length of the drive member.

In certain embodiments, the second pulley assembly may include a second biasing member that extends in generally parallel relation to the length of the drive member.

In another aspect of the present disclosure, a method is disclosed for using a base station that is configured to receive a UAV. The method includes: applying a lateral tension to a drive member that is operatively connected to alignment members on a landing platform of the base station such that movement of the drive member causes corresponding movement of the alignment members to thereby reconfigure the landing platform and reposition the UAV on the landing platform; applying an axial tension to the drive member; and actuating a motor assembly to thereby advance and retract the drive member.

In certain embodiments, applying the lateral tension to the drive member may include applying a lateral force to the drive member via a first pulley assembly.

In certain embodiments, applying the lateral force to the drive member may include applying the lateral force in a direction that is generally orthogonal in relation to a length of the drive member.

In certain embodiments, applying the lateral force to the drive member may include biasing first pulleys towards each other.

In certain embodiments, biasing the first pulleys towards each other may include applying the lateral force to pulley shafts supporting the first pulleys.

In certain embodiments, actuating the motor assembly may include rotating the first pulleys about movable axes of rotation.

In certain embodiments, applying the axial tension to the drive member may include applying an axial force to the drive member via a second pulley assembly, which includes a first bracket and a second bracket.

In certain embodiments, applying the axial force to the drive member may include applying the axial force in a direction that is generally parallel in relation to a length of the drive member.

In certain embodiments, applying the axial force to the drive member may include moving the second bracket axially in relation to the first bracket.

In certain embodiments, moving the second bracket axially in relation to the first bracket may include rotating an adjustment member that extends between the first bracket and the second bracket.

In another aspect of the present disclosure, a method is disclosed for using a base station that is configured to receive a UAV. The method includes: applying a lateral tension to a drive member that extends internally within the base station; applying an axial tension to the drive member; and moving the drive member to reposition alignment members that are operatively connected thereto to thereby reposition the UAV on a landing platform of the base station.

In certain embodiments, applying the lateral tension to the drive member may include biasing first pulleys into engagement with the drive member.

In certain embodiments, biasing the first pulleys into engagement with the drive member may include applying a biasing force to pulleys shafts that are connected to the first pulleys.

In certain embodiments, applying the axial tension to the drive member may include approximating a first bracket and a second bracket.

In certain embodiments, approximating the first bracket and the second bracket may include rotating an adjustment member that extends therebetween.

In another aspect of the present disclosure, a method is disclosed for using a base station that is configured to receive a UAV. The method includes: moving a drive member to reposition alignment members and generally align a power source on the UAV with a charging hub of the base station; applying a first tension to the drive member in a direction that is generally orthogonal in relation to a length of the drive member; and applying a second tension to the drive member in a direction that is generally parallel in relation to the length of the drive member.

In certain embodiments, applying the first tension to the drive member may include approximating first pulleys.

In certain embodiments, applying the second tension to the drive member may include approximating a fixed bracket and a movable bracket, wherein the movable bracket includes a second pulley.

In certain embodiments, moving the drive member may include rotating the first pulleys and the second pulley about movable axes of rotation.

In certain embodiments, approximating the fixed bracket and the movable bracket may include rotating an adjustment member that threadably engages the movable bracket.

In another aspect of the present disclosure, a landing platform for a base station is disclosed that is configured to receive a UAV. The landing platform includes a stage and alignment members that are movable in relation to the stage and which are configured for engagement with the UAV to thereby reposition the UAV on the landing platform. The alignment members include fences and projections that extend laterally inward form the fences.

In certain embodiments, the fences and the projections may be formed from a single piece of material.

In certain embodiments, the stage may include landing areas that are configured to receive the UAV.

In certain embodiments, the fences may span the landing areas.

In certain embodiments, the projections may define lengths corresponding to front-to-rear spacing between legs of the UAV.

In certain embodiments, the projections may be generally centered along the fences.

In certain embodiments, the projections may be generally triangular in configuration.

In certain embodiments, the projections may define bearing surfaces that are configured for engagement with the UAV such that approximation of the alignment members urges the UAV outwardly towards a periphery of the landing platform.

In certain embodiments, the bearing surfaces may subtend an angle therebetween that lies substantially within the range of approximately 90 degrees to approximately 150 degrees.

In certain embodiments, the alignment members may further include resilient bumpers to absorb force upon contact between the alignment members and the UAV.

In another aspect of the present disclosure, a landing platform for a base station is disclosed that is configured to receive a UAV. The landing platform includes alignment members that are configured for engagement with the UAV and which are repositionable from an extended position into a retracted position to generally center the UAV on the landing platform.

In certain embodiments, the alignment members may include alignment brackets with mounts that are configured to receive first fasteners.

In certain embodiments, the landing platform may further include a drive mechanism that is connected to the mounts and which is configured to reposition the alignment members between the extended position and the retracted position.

In certain embodiments, the alignment brackets may include first sections; second sections that extend in generally parallel relation to the first sections; and transitions that extend between and connect the first sections and the second sections.

In certain embodiments, the second sections may include fins that are configured to facilitate drainage.

In certain embodiments, the first sections and the second sections may be vertically offset.

In certain embodiments, the alignment brackets may be configured such that the transitions subtend angles with the first sections and the second sections that lie substantially within the range of approximately 110 degrees to approximately 150 degrees.

In another aspect of the present disclosure, a landing platform for a base station is disclosed that is configured to receive a UAV. The landing platform includes a stage, which defines slots and includes landing areas that are configured to receive the UAV, and alignment members that are configured for engagement with the UAV. The alignment members are movable in relation to the stage and include: fences, which span the landing areas; projections, which extend laterally inward from the fences; and alignment brackets, which extend laterally inward from the fences and are positioned outwardly of the projections. The alignment brackets are movable through the slots during movement of the alignment members and include: first sections; second sections; and transitions that extend between and connect the first sections and the second sections.

In certain embodiments, the first sections and the second sections may be vertically offset.

In certain embodiments, the second sections may extend in generally parallel relation to the first sections.

In another aspect of the present disclosure, a landing platform for a base station is disclosed that is configured to receive a UAV. The landing platform includes: alignment members that are configured for engagement with the UAV; drive brackets that are connected to the alignment members; and a drive member that is connected to the drive brackets such that the drive brackets extend between and connect the alignment members and the drive member, whereby movement of the drive member causes corresponding movement of the drive brackets and the alignment members to thereby reposition the UAV on the landing platform.

In certain embodiments, the drive brackets may include first ends that are connected to the drive member and second ends that are connected to the alignment members.

In certain embodiments, the first ends may include first openings that are configured to receive first fasteners such that the first fasteners facilitate connection of the drive member to the drive brackets.

In certain embodiments, the second ends may include second openings that are configured to receive second fasteners such that the second fasteners extend through the drive brackets and into the alignment members.

In certain embodiments, the second openings may extend in generally orthogonal relation to the first openings.

In certain embodiments, the first ends may include grooves that are configured to receive the drive member such that the drive member extends into the drive brackets.

In certain embodiments, the grooves may extend in generally parallel relation to a length of the drive member.

In certain embodiments, the landing platform may further include retainers that extends between and connect the drive brackets and the drive member.

In certain embodiments, the retainers may overlie the drive member.

In certain embodiments, the retainers may span the grooves.

In another aspect of the present disclosure, a landing platform for a base station is disclosed that is configured to receive a UAV. The landing platform includes: a drive member; alignment members that are driven by the drive member such that the landing platform is reconfigurable from a first configuration into a second configuration to thereby generally center the UAV on the landing platform; and drive brackets that extend between and connect the drive member and the alignment members such that movement of the drive member causes corresponding movement of the drive brackets and the alignment members.

In certain embodiments, the drive brackets may include first ends that are connected to the drive member and second ends that are connected to the alignment members.

In certain embodiments, the first ends may include first openings that are configured to receive first fasteners, which facilitate connection of the drive member to the drive brackets.

In certain embodiments, the second ends may include second openings that are configured to receive second fasteners such that the second fasteners extend through the drive brackets and into the alignment members.

In certain embodiments, the second openings may extend in generally orthogonal relation to the first openings.

In another aspect of the present disclosure, a landing platform for a base station is disclosed that is configured to receive a UAV. The landing platform includes: a stage that is configured to receive the UAV; alignment members that are configured for engagement with the UAV and which are movable in relation to the stage from an extended position into a retracted position to thereby generally align a power source on the UAV with a charging hub of the base station; a drive member that is positioned beneath the stage; and drive brackets that extend between and connect the alignment members and the drive member such that movement of the drive member repositions the alignment members from the extended position into the retracted position.

In certain embodiments, the drive brackets may include grooves that are configured to receive the drive member such that the drive member extends into the drive brackets.

In certain embodiments, the grooves may extend in generally parallel relation to a length of the drive member.

In certain embodiments, the landing platform may further include retainers that extend between and connect the drive brackets and the drive member.

In certain embodiments, the retainers may overlie the drive member.

In certain embodiments, the retainers may span the grooves.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
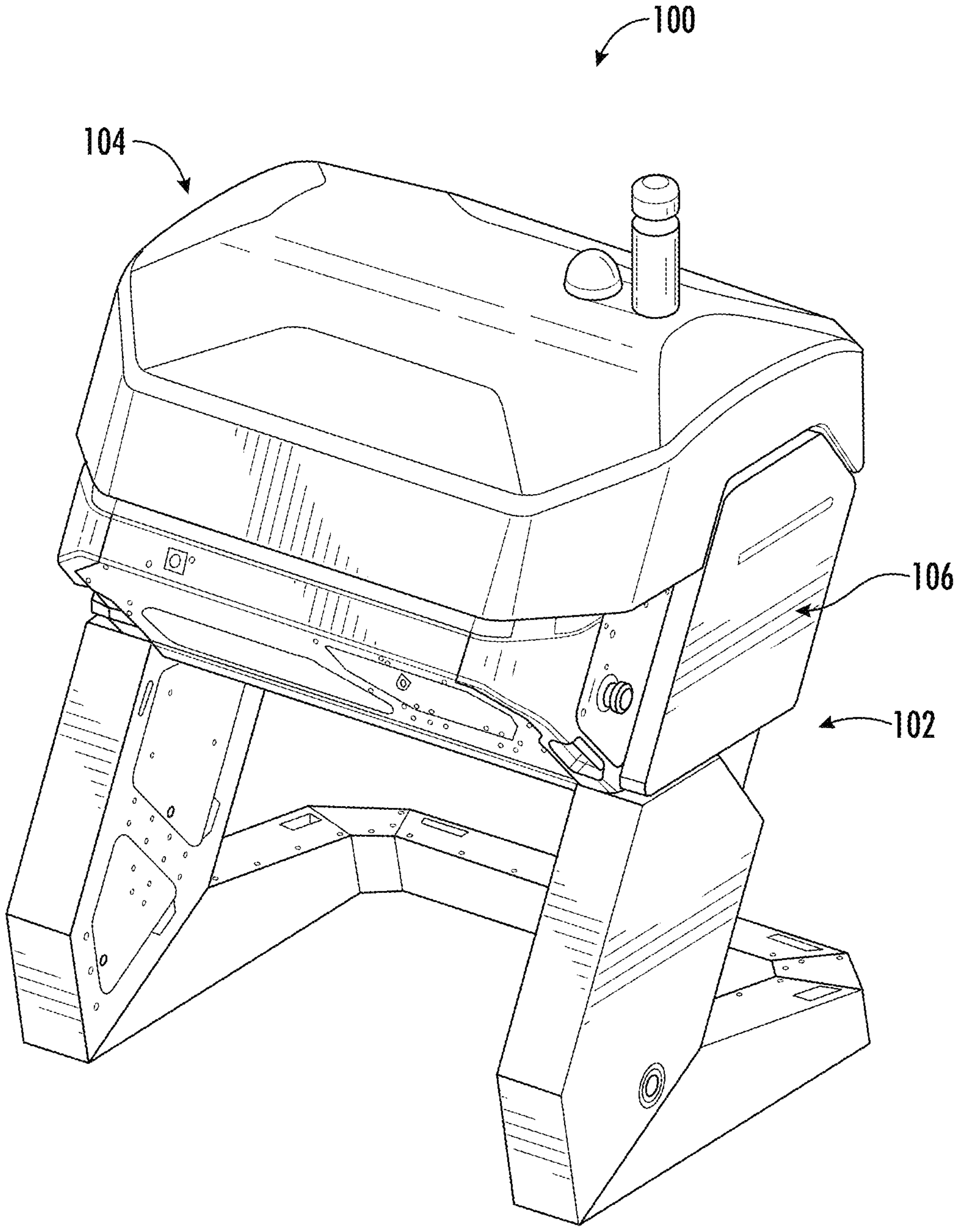
FIG. 1 is a front, perspective view of a base station according to the principles of the present disclosure shown in a closed position.
Figure 2:
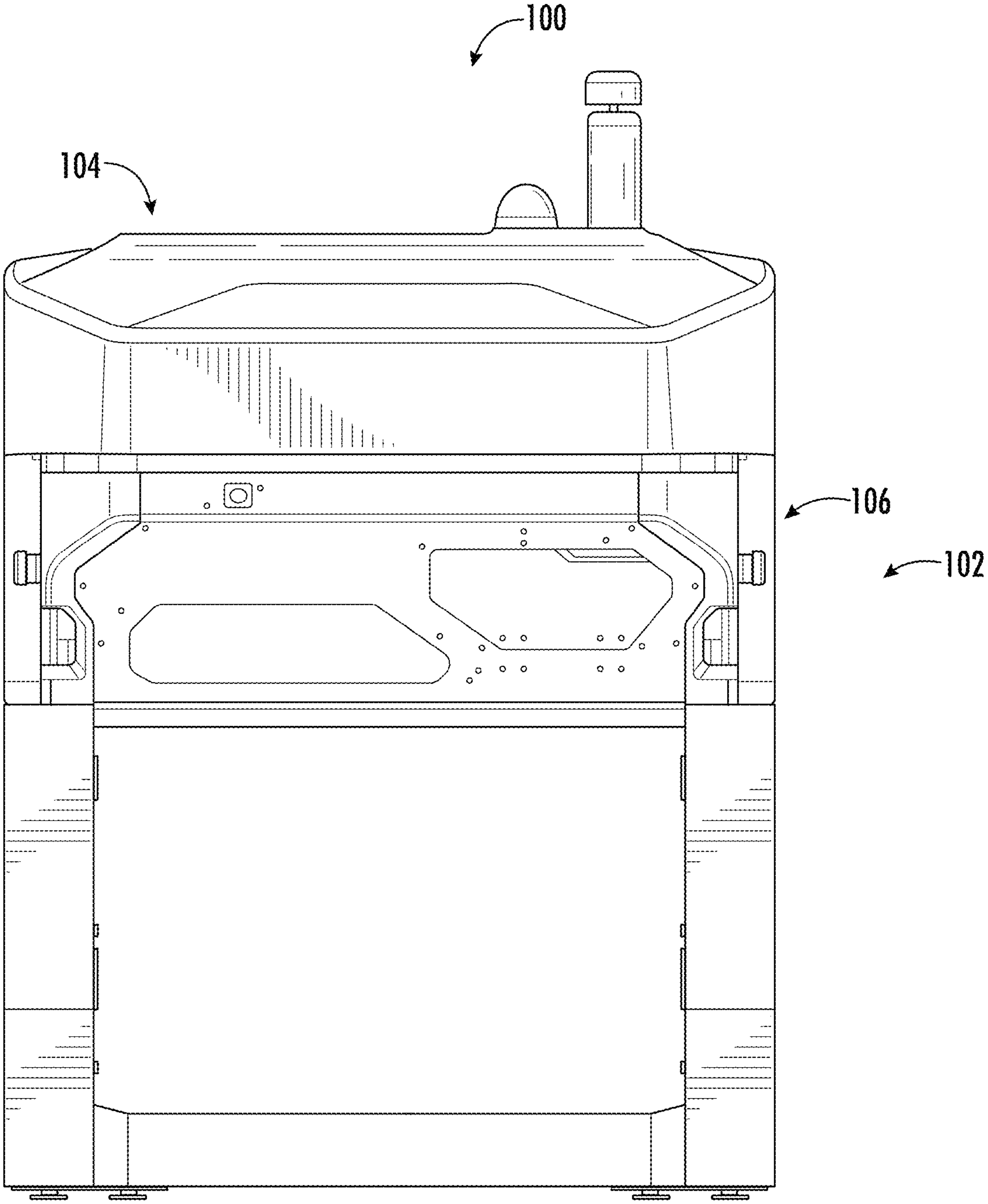
FIG. 2 is a front, plan view of the base station.
Figure 3A:
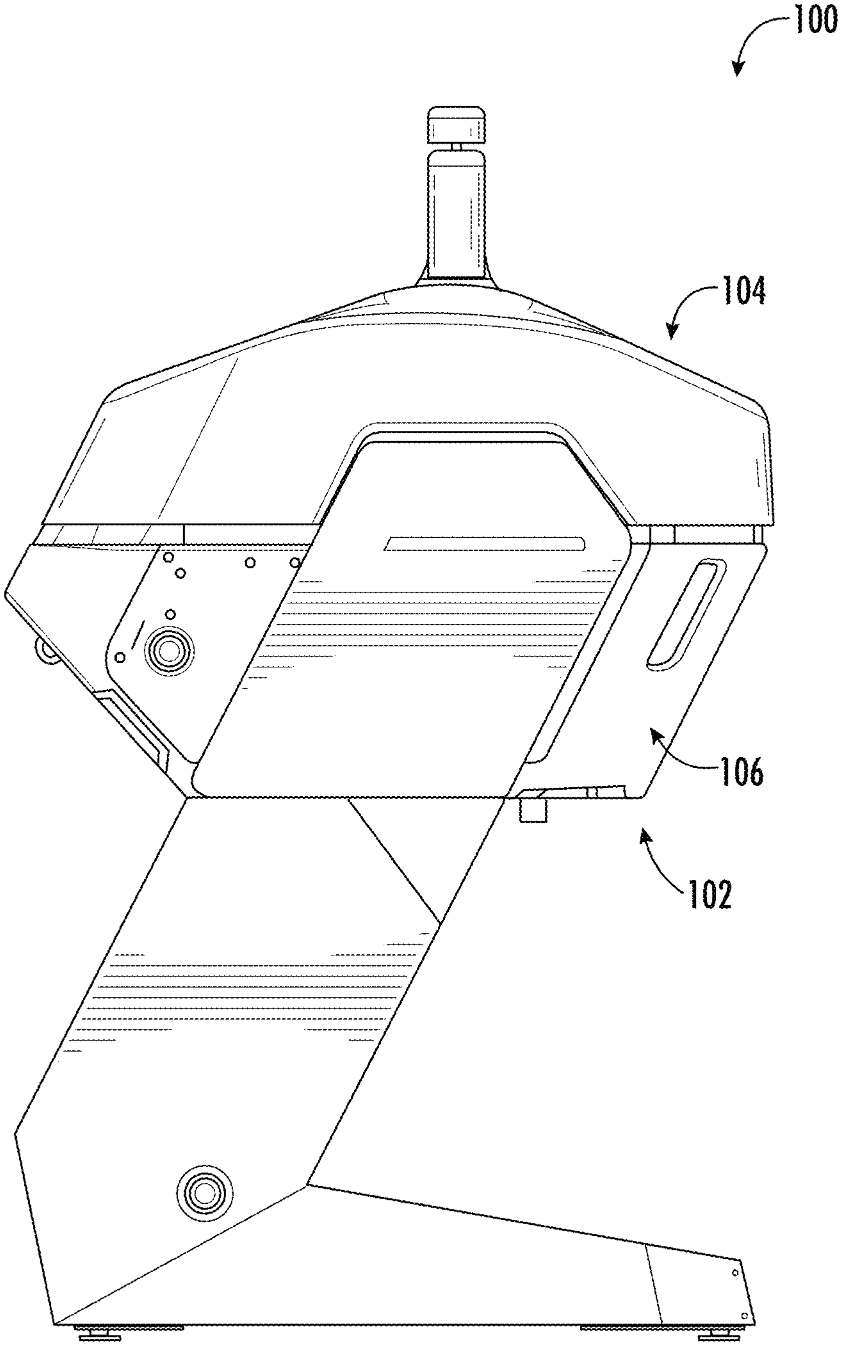
FIG. 3A is a side, plan view of the base station.
Figure 3B:
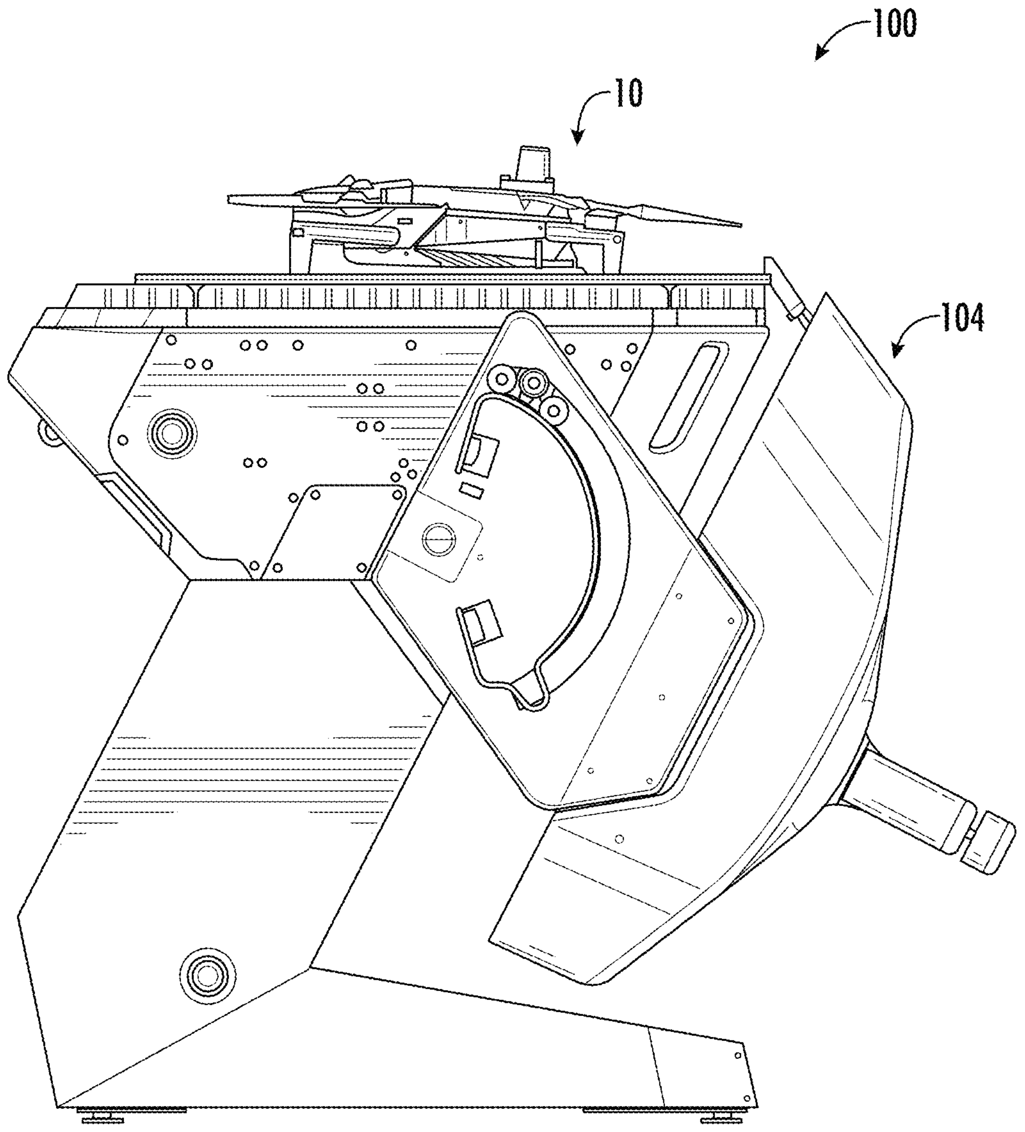
FIG. 3B is a side, plan view of the base station shown in an open position.
Figure 4:
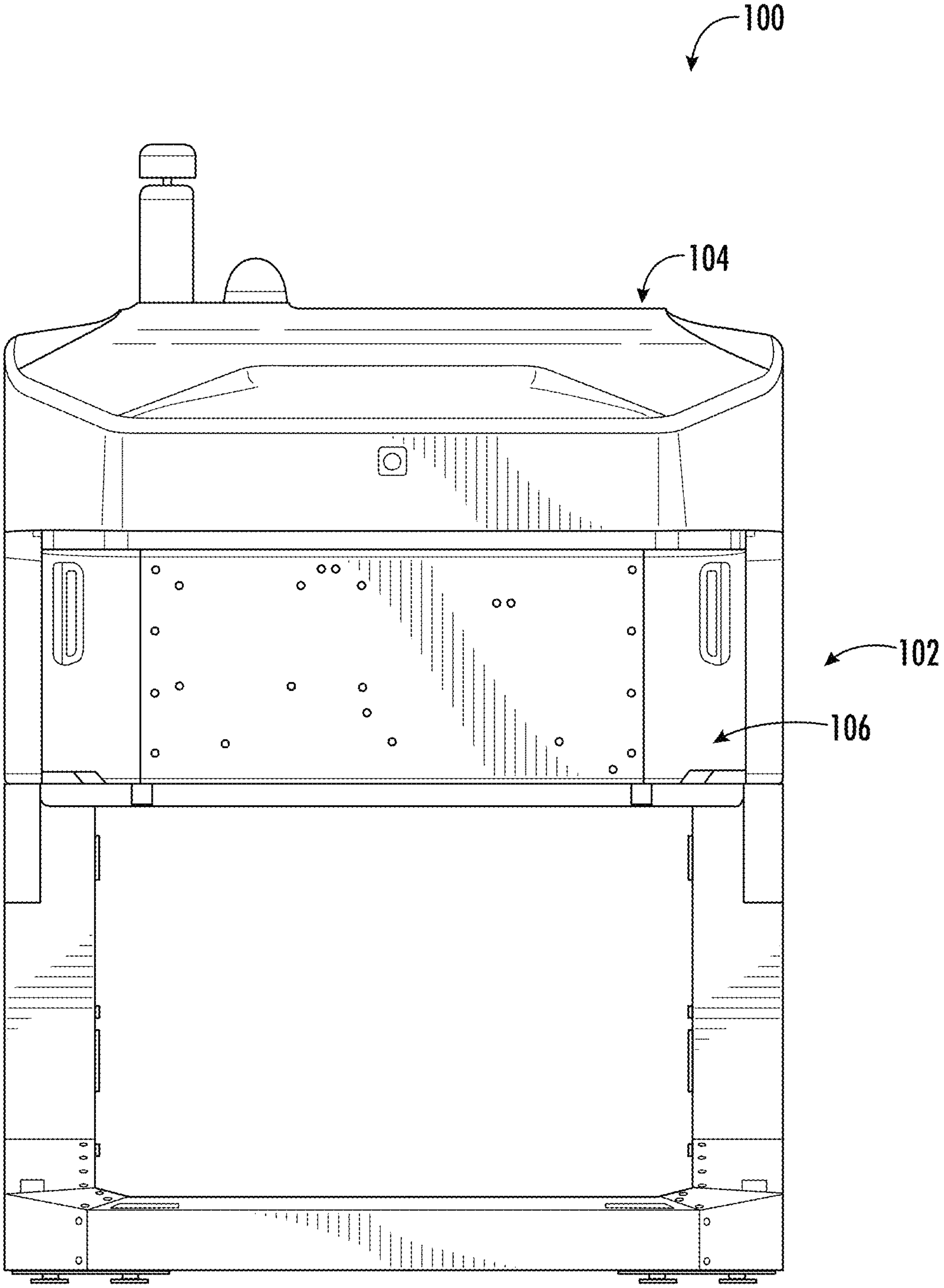
FIG. 4 is a rear, plan view of the base station.

The present disclosure describes a base station for a UAV that includes a reconfigurable landing platform, which facilitates landing and charging of the UAV and improves the overall docking procedure.

The landing platform includes alignment members, which engage the UAV and are repositionable (movable) between extended and retracted positions, and a drive mechanism, which is connected (secured) to the alignment members to facilitate extension and retraction thereof. During repositioning of the alignment members into the retracted position, the alignment members engage (contact) the UAV and reposition (e.g., generally center) the UAV on the landing platform, which generally aligns a power source on the UAV with a charging hub of the base station and facilitates proper closure of the base station.

The drive mechanism includes: a drive member; adjustable and non-adjustable pulley assemblies that engage the drive member; drive brackets that extend between and connect the drive member and the alignment members such that movement of the drive member causes corresponding movement of the drive brackets and the alignment members; and slide assemblies that support the alignment members during extension and retraction. The pulley assemblies support and guide the drive member during movement and are configured to apply both an axial and a lateral tension thereto in order to facilitate proper extension and retraction of the alignment members.

Referring now to the drawings, FIGS. 1, 2, 3A, 3B, and 4 illustrate a base station (dock) 100 for an unmanned aerial vehicle (UAV) 10 (FIGS. 3B, 8C, 12-15) (e.g., a drone), which is configured for automated servicing (e.g., storage, charging, operation, etc.) and accommodation of the UAV 10. While a single base station 100 and a single UAV 10 are shown and described herein, in certain embodiments of the disclosure, it is envisioned that a plurality of base stations 100 and UAVs 10 may be utilized depending, for example, upon the particular intended use of the UAVs 10.

To support autonomous landing and docking of the UAV 10 with the base station 100, it is envisioned that the UAV 10 may follow any suitable process or procedure and may include any suitable electrical and/or logic components, as described in U.S. Pat. No. 11,873,116, the entire contents of which are hereby incorporated by reference.

The base station 100 includes a base 102 and a roof 104, which is supported by the base 102 such that the roof 104 and the base station 100 are repositionable between a closed position (FIGS. 1, 2, 3A, 4), in which the base 102 and the roof 104 collectively define an enclosure that conceals the UAV 10 therein, and an open position (FIG. 3B), which facilitates takeoff and landing of the UAV 10.

With reference now to FIGS. 5-7, 8A, 8B, 8C, and 9-21 as well, the base 102 includes a body 106, which is the main structural member of the base 102 and supports various internal and external components of the base station 100; a charging hub 108 (FIGS. 11-15), which is movably supported by the body 106; and a (reconfigurable) landing platform 110.

The charging hub 108 is configured for engagement (contact) with and electrical connection to a power source 12 (e.g., a battery) on the UAV 10, which is located (e.g., attached to or otherwise supported on) a lower (bottom) surface thereof, to facilitate charging of the UAV 10.

Figure 14:
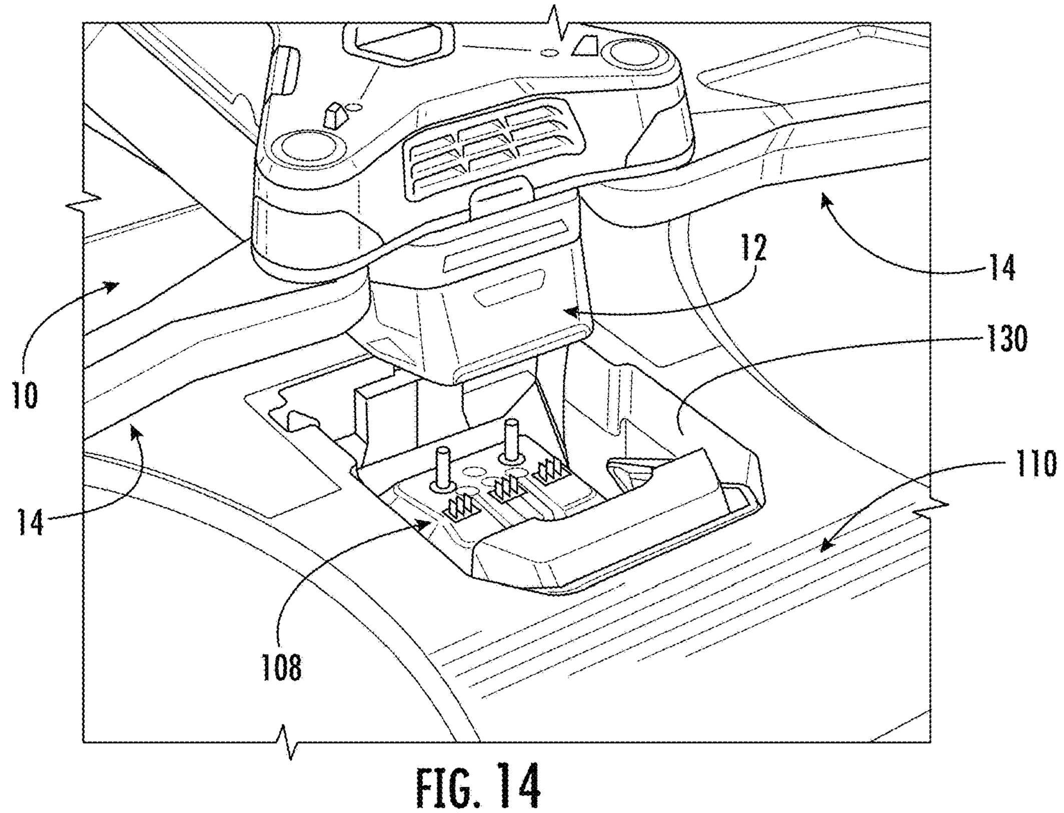
FIG. 14 is a partial, top, perspective view of the landing platform, the UAV, and a charging hub of the base station, which is shown in a retracted position.
Figure 15:
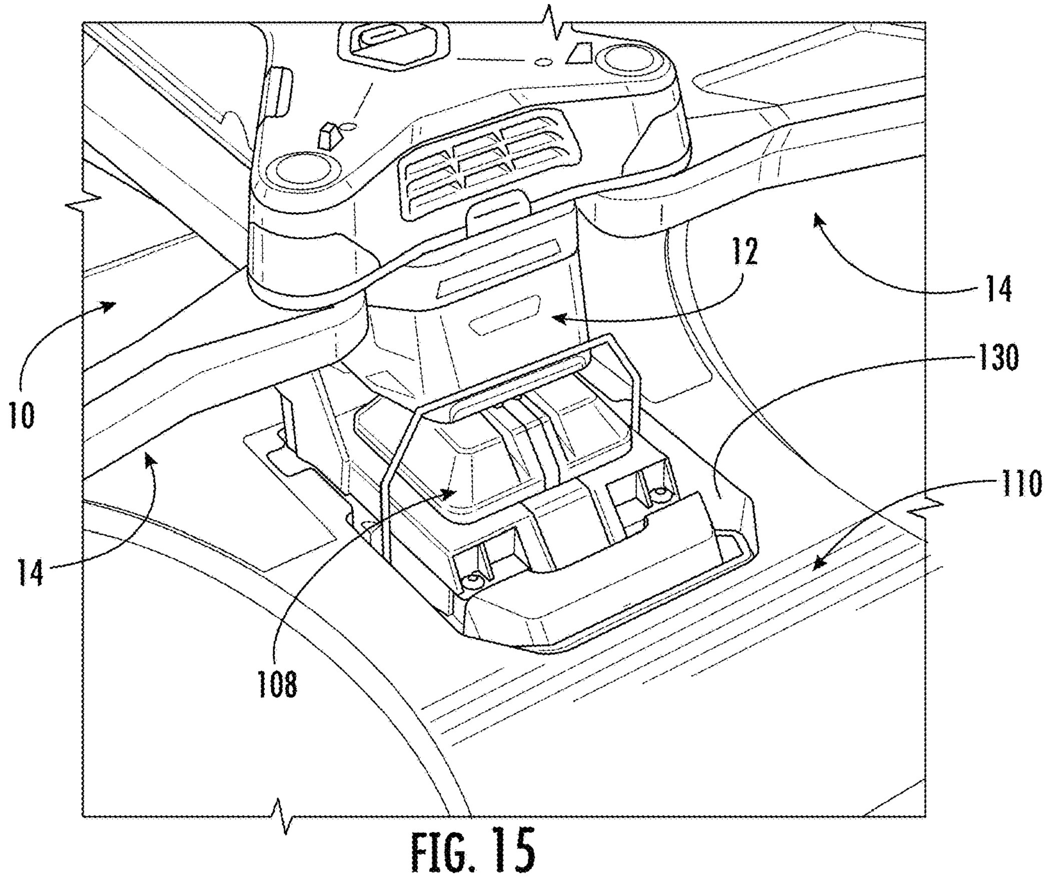
FIG. 15 is a partial, top, perspective view of the landing platform, the UAV, and the charging hub, which is shown in an extended position.

The charging hub 108 may draw power from any suitable source, whether internal to the base station 100 or external, and is repositionable between a (first) retracted position (FIG. 14) and a (second) extended position (FIG. 15). Prior to landing of the UAV 10, the charging hub 108 is maintained in the retracted position such that the charging hub 108 is concealed by the landing platform 110. Concealing the charging hub 108 facilitates docking of the UAV 10 by increasing the landing envelope (i.e., the surface area on the landing platform 110 that is available to the UAV 10), which reduces the requisite precision, thereby increasing the margin for error and resulting in more successful landings. Subsequent to landing and alignment of the UAV 10 with the charging hub 108, however, the charging hub 108 is repositioned into the extended position such that the charging hub 108 is exposed from and extends vertically through the landing platform 110 to facilitate connection to and charging of the UAV 10.

The landing platform 110 is supported by (e.g., connected (secured) to the body 106 and is configured to receive the UAV 10 during docking. In certain embodiments, it is envisioned that the base 102 may include (one or more) at least one damper that is positioned between the body 106 and the landing platform 110 in order to allow for relative movement therebetween during docking of the UAV 10 (e.g., to absorb force and thereby inhibit (if not entirely prevent) recoil of the UAV 10).

The landing platform 110 is pivotably connected (secured) to the body 106 at hinges 112 (FIGS. 9, 10) such that the landing platform 110 is repositionable between a closed position (FIGS. 9-13), in which the landing platform 110 receives and accommodates the UAV 10 and is laterally fixed (i.e., immovable) in relation to the body 106, and an open position (FIGS. 5-7), which provides access to various internal components of the base station 100. Embodiments in which the body 106 and the landing platform 110 may be non-pivotably connected (secured together) are also envisioned herein, however.

Figure 5:
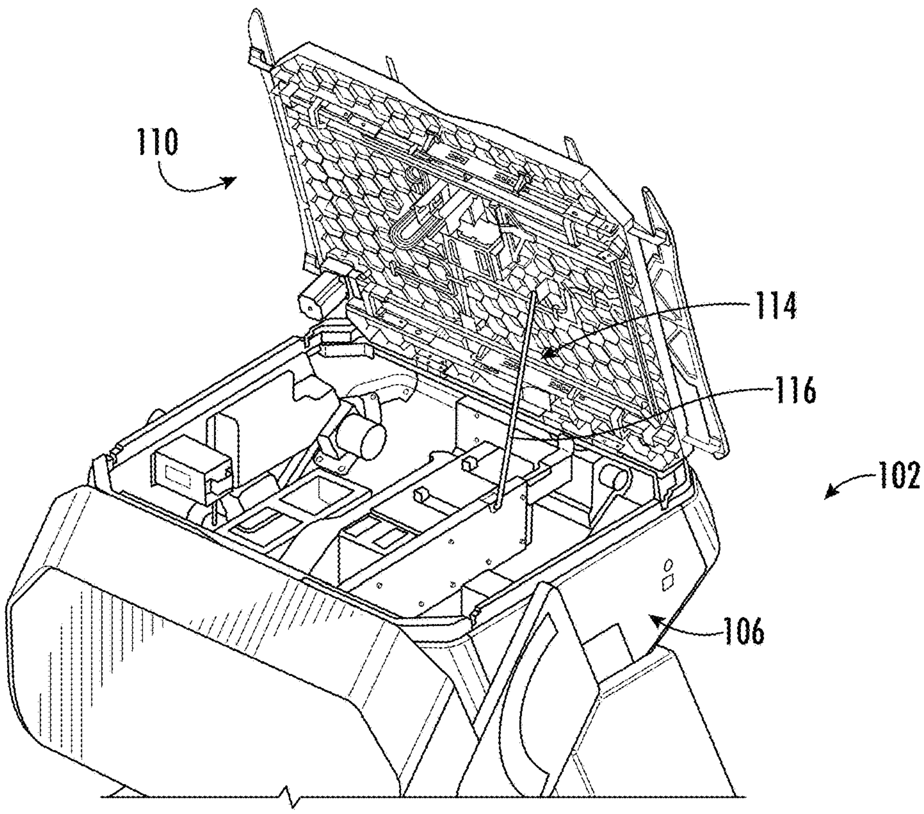
FIG. 5 is a partial, top, perspective view of the base station illustrating a landing platform thereof maintained in an open position by a support member.
Figure 6:
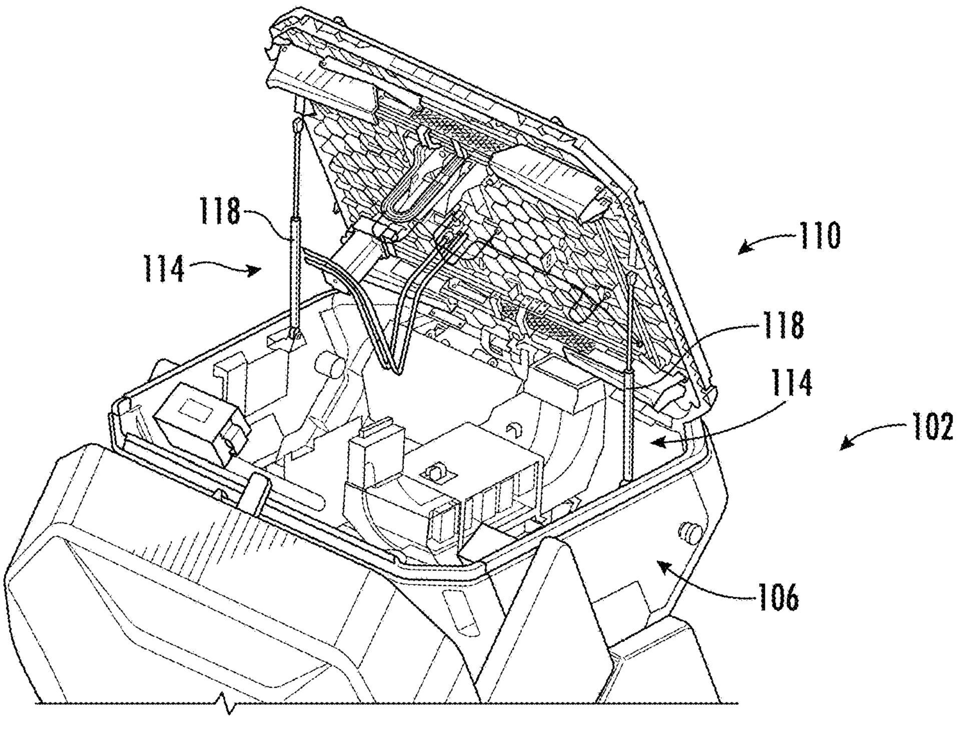
FIG. 6 is a partial, top, perspective view of the base station shown with an alternate embodiment of the support member.
Figure 7:
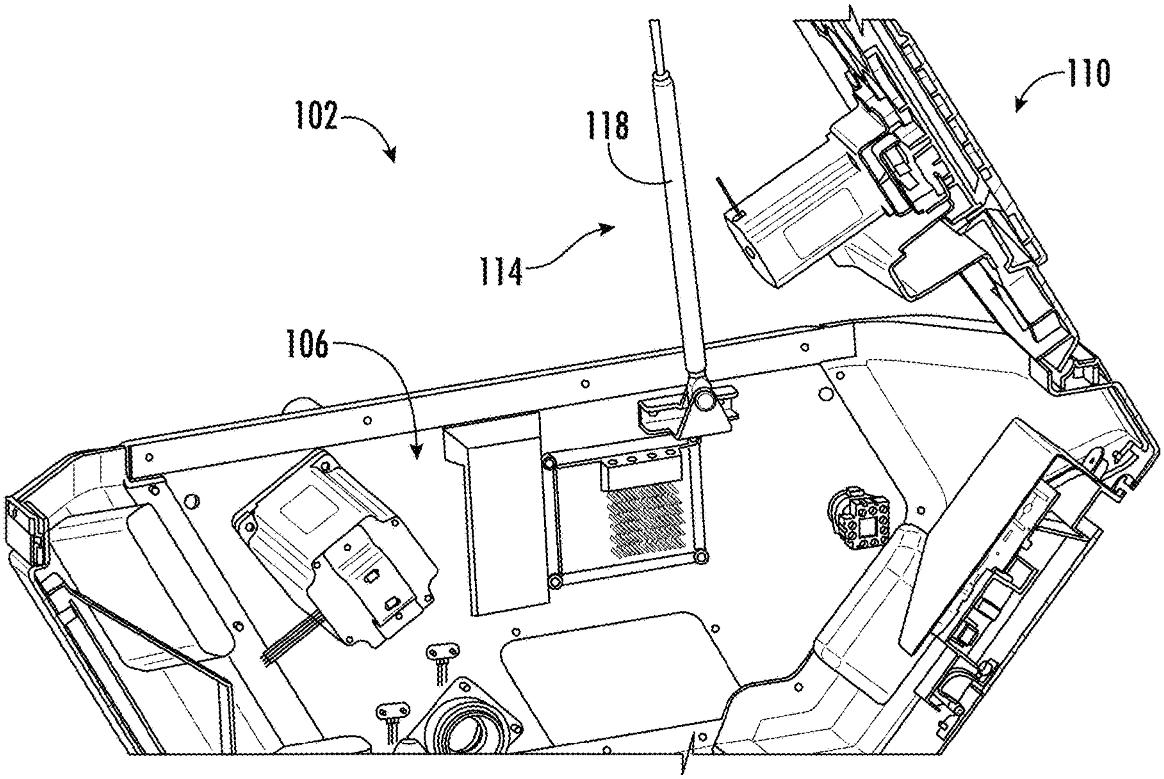
FIG. 7 is a partial, side, perspective view of the base station and the support member seen in FIG. 6.
Figure 8A:
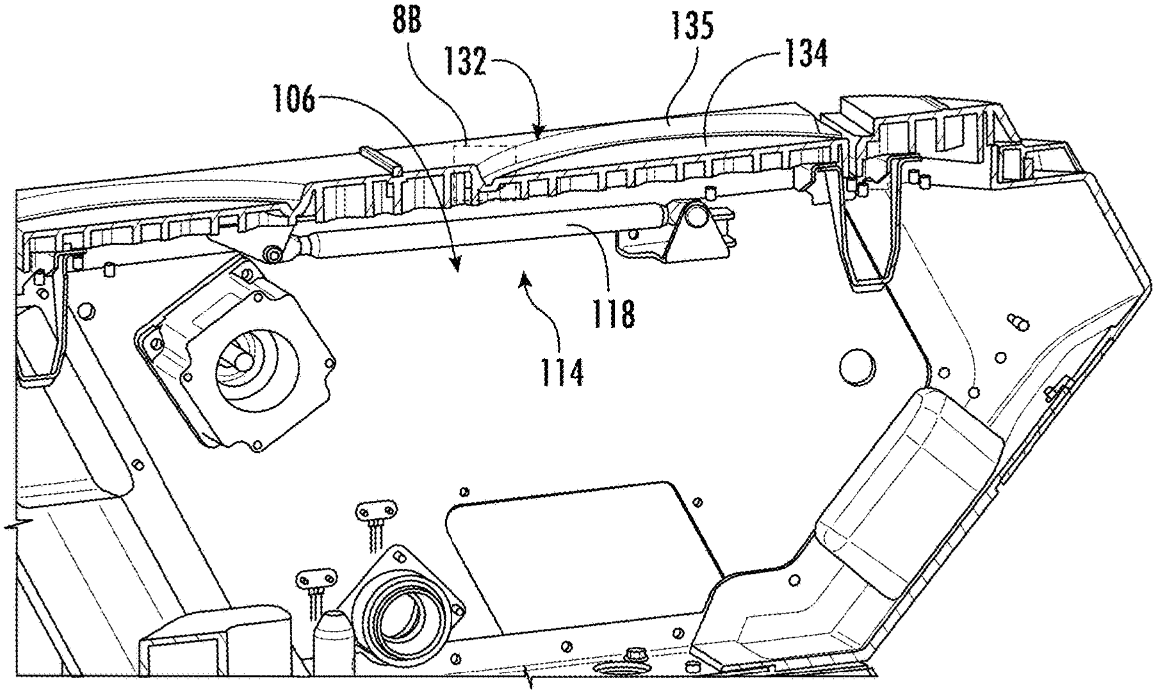
FIG. 8A is a partial, side, perspective view of the base station and the support member seen in FIG. 6 with the support member shown in a stowed position.
Figure 8B:
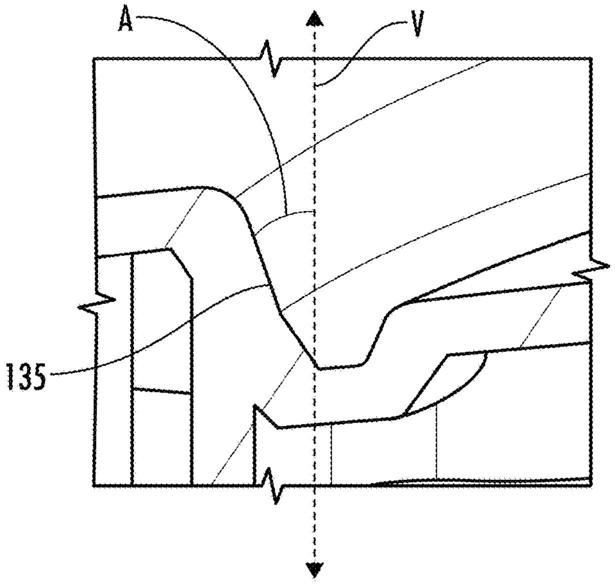
FIG. 8B is an enlargement of the area of detail identified in FIG. 8A.
Figure 8C:
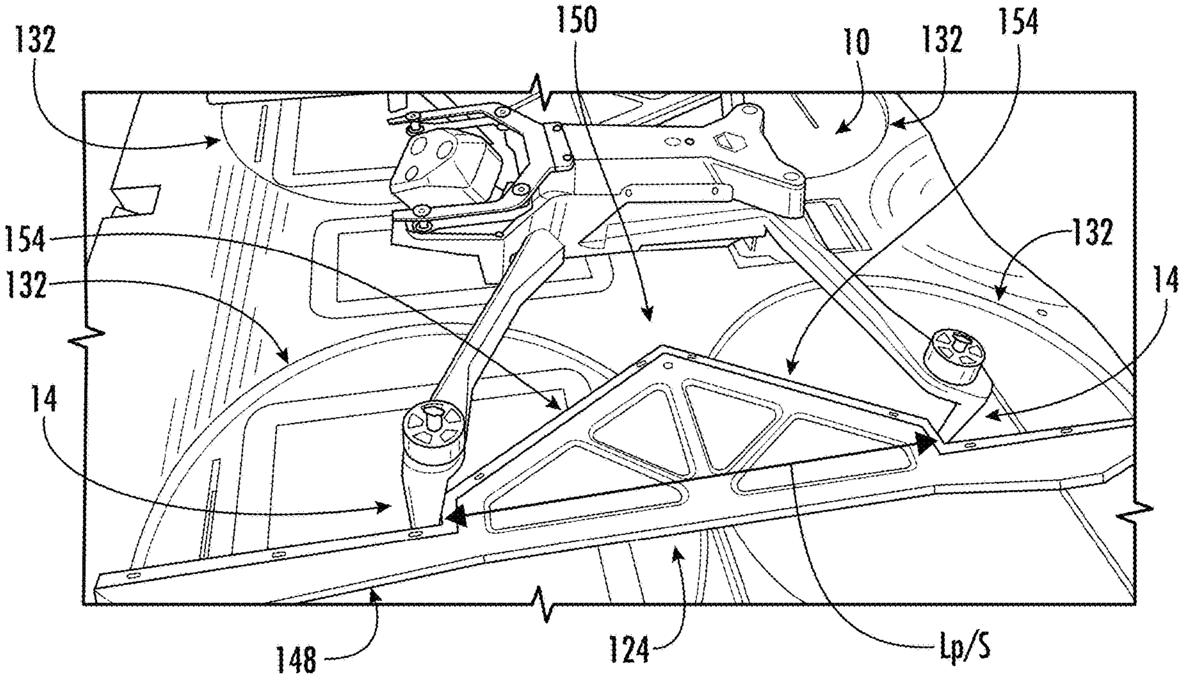
FIG. 8C is a partial, top, perspective view of the landing platform shown with a UAV.
Figure 9:
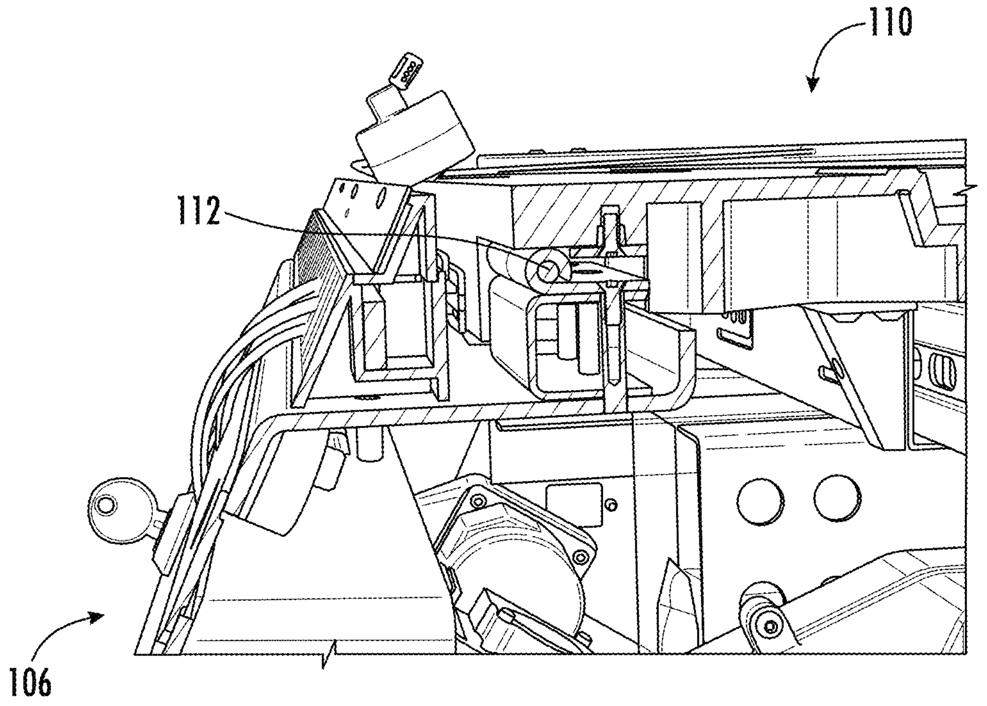
FIGS. 9 and 10 are cross-sectional, perspective views illustrating a hinged connection between the landing platform and a body of the base station.
Figure 10:
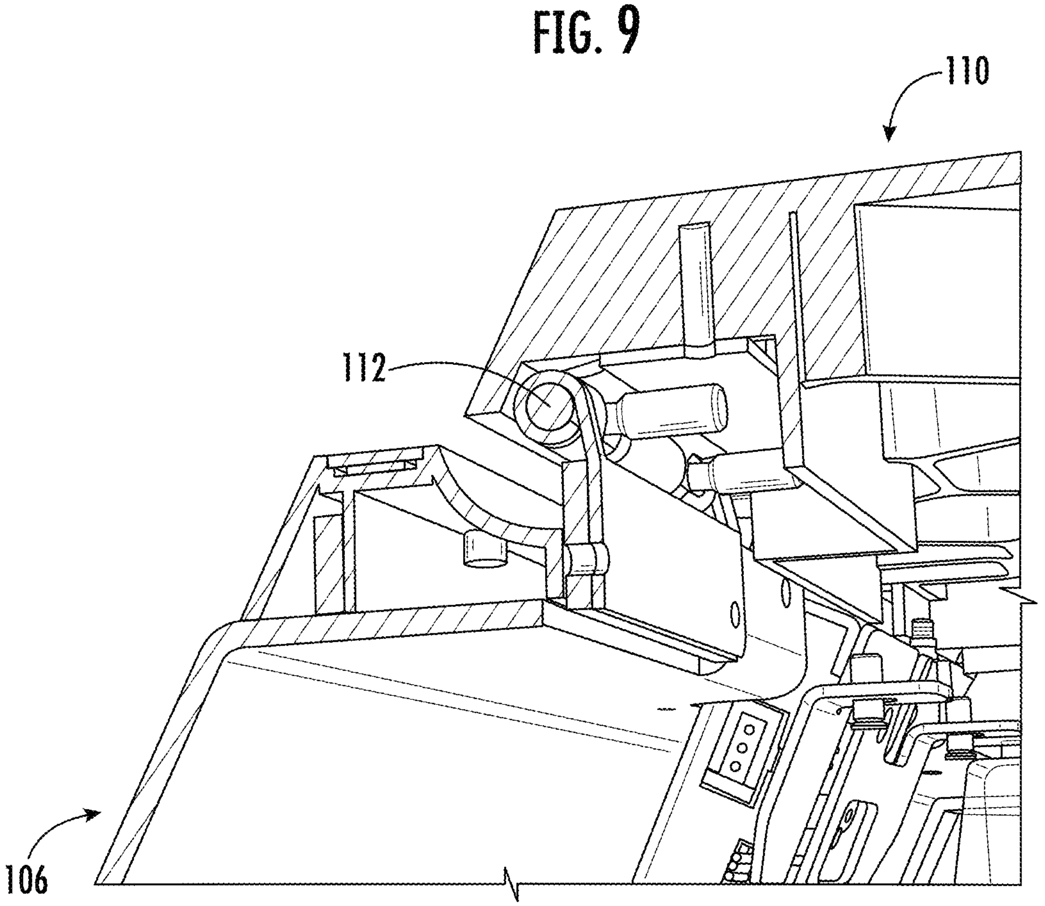

In order to facilitate repositioning of the landing platform 110 between the closed and open positions and brace the landing platform 110 in the open position, the base 102 includes (one or more) at least one support member 114 (FIGS. 5-8A). For example, it is envisioned that the support member(s) 114 may include rod(s) 116, as seen in FIG. 5, strut(s) 118, as seen in FIGS. 6-8A, or any other suitable component(s) or mechanism(s). The support member(s) 114 are repositionable between an extended (deployed) position (FIGS. 5-7), in which the support member(s) 114 maintain the landing platform 110 in the open position, and a retracted (stowed) position (FIG. 8A), in which the support member(s) 114 allow for closure of the landing platform 110.

In certain embodiments, it is envisioned that the landing platform 110 may be configured to tilt in relation to the base 102 in one or more degrees of freedom in order to match a landing angle of the UAV 10. Tiltability of the landing platform 110 reduces the requisite precision during docking (e.g., in the event of a crosswind) and, thus, potential damage to the UAV 10 and/or the landing platform 110, as well as recoil of the UAV 10.

Figure 11:
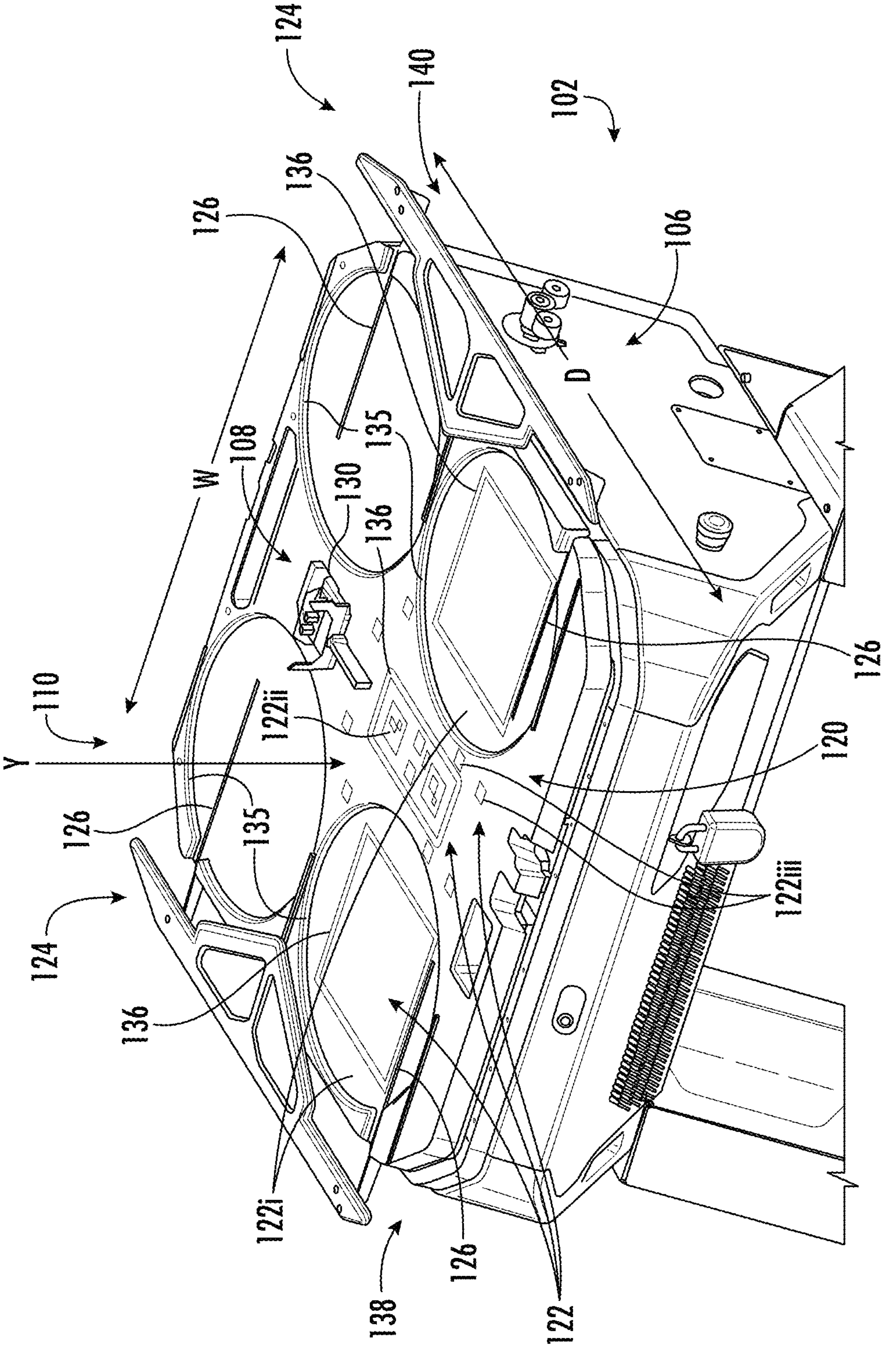
FIG. 11 is a partial, top, perspective view of the base station illustrating the landing platform, which includes repositionable alignment members.
Figure 12:
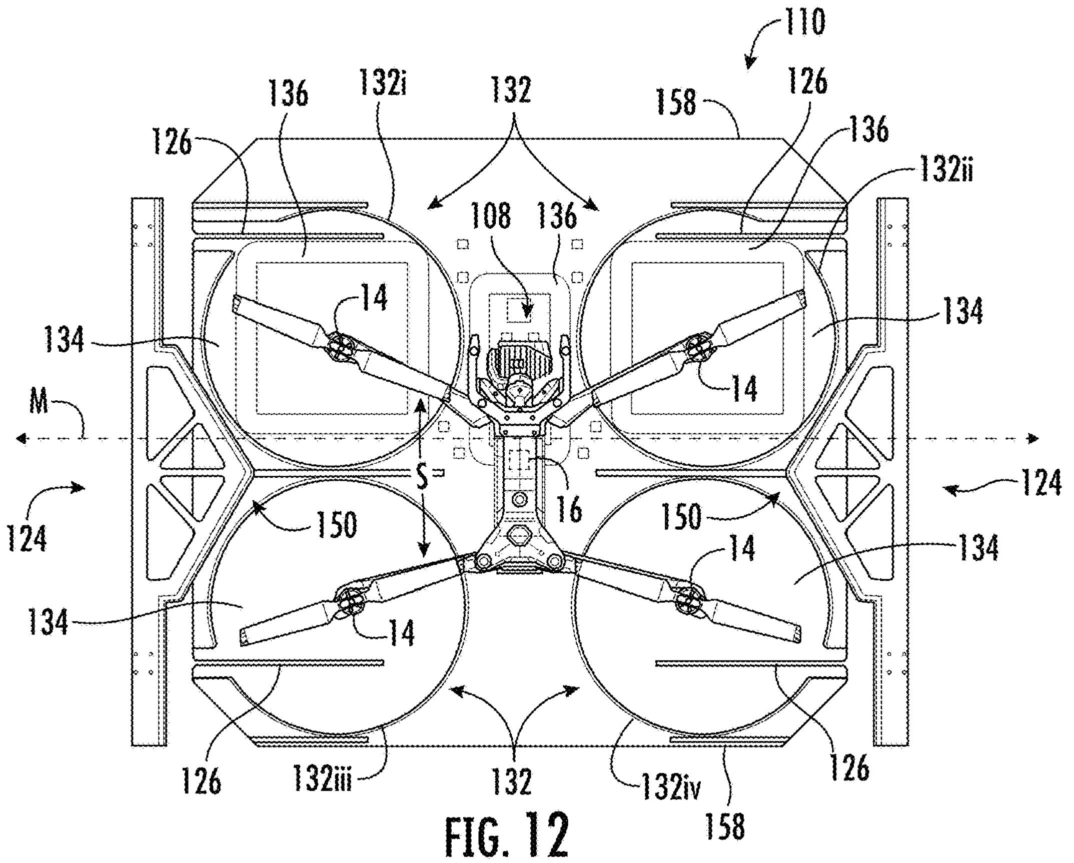
FIG. 12 is a top, plan view of the landing platform and the UAV with the alignment members shown in an extended position.
Figure 13:
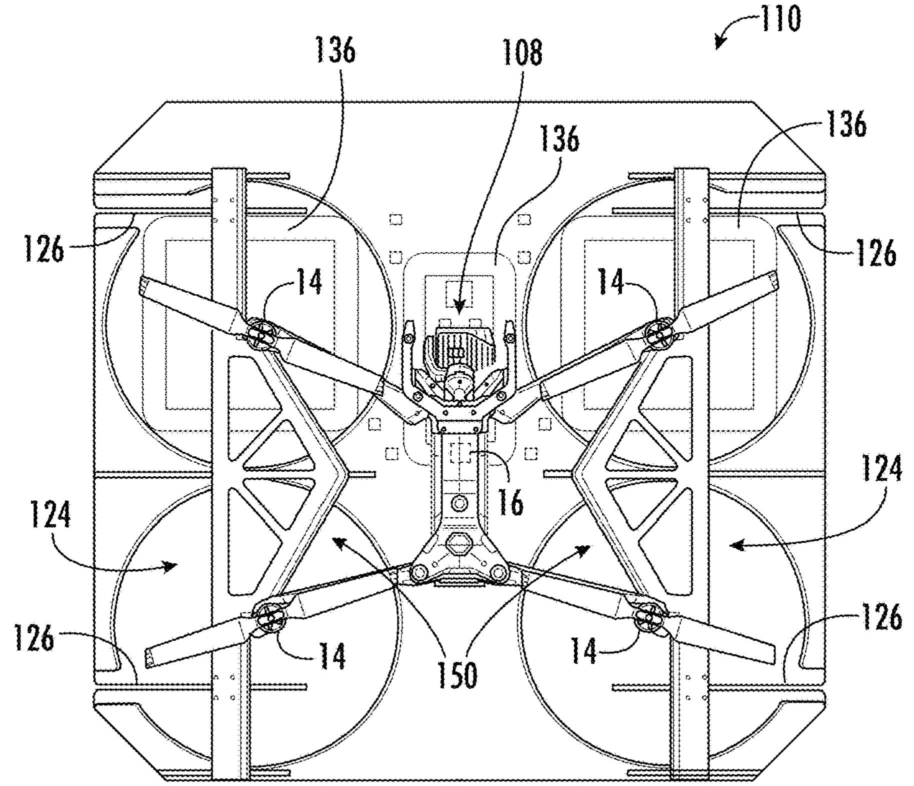
FIG. 13 is a top, plan view of the landing platform and the UAV with the alignment members shown in a retracted position.
Figure 16:
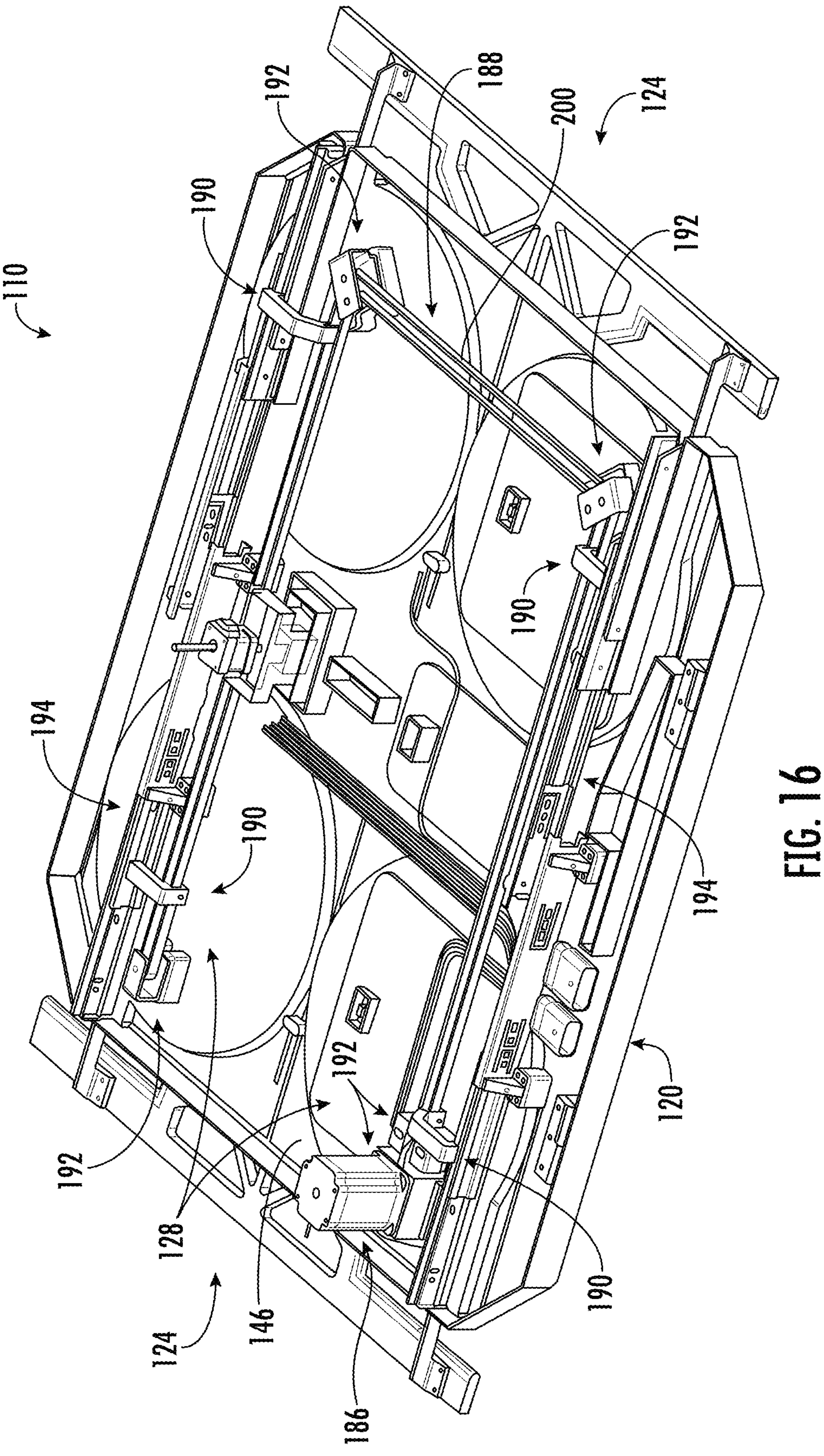
FIG. 16 is a bottom, perspective view of the landing platform with the alignment members shown in the extended position and illustrating a drive mechanism that interfaces with the alignment members to facilitate repositioning thereof.

With reference to FIGS. 11-13 in particular, the landing platform 110 defines a (lateral) width W (FIG. 11) and a depth D, which extend in generally orthogonal (perpendicular) relation to each other and in generally orthogonal (perpendicular) relation to a generally vertical landing direction Y (FIG. 11) of the UAV 10 when docking with the base station 100. The landing platform 110 includes: a stage 120, which is configured to receive the UAV 10; (one or more) at least one fiducial 122 (FIG. 11); a pair of (first and second) alignment members 124; slots 126; and a drive mechanism 128 (FIG. 16).

The stage 120 defines a window 130 (FIG. 11), which extends through the landing platform 110, and a plurality of landing areas 132 (FIG. 12).

The window 130 is generally aligned with the charging hub 108 (i.e., along the width W and the depth D of the landing platform 110) and is configured to receive the charging hub 108 such that the charging hub 108 moves through the window 130 during repositioning between the retracted and extended positions. Although shown as being generally rectangular in configuration, it is envisioned that the window 130 may include any suitable configuration (i.e., depending upon the particular configuration of the charging hub 108, the UAV 10, etc.).

The landing areas 132 (FIG. 12) receive and constrain the UAV 10 during docking with the base station 100. More specifically, the landing areas 132 are configured to receive legs 14 (FIGS. 8C, 12-15) of the UAV 10 during docking and correspond in number thereto. As such, in the illustrated embodiment, the landing platform 110 includes four landing areas 132*i*, 132*ii*, 132*iii*, 132*iv*. It is envisioned, however, that the specific number of landing areas 132 may be increased or decreased in alternate embodiments (e.g., depending on the particular configuration of the UAV 10) without departing from the scope of the present disclosure.

The landing areas 132 define depressions 134 that extend vertically into the stage 120 and which are configured to receive the legs 14 of the UAV 10. The depressions 134 not only facilitate landing of the UAV 10 with greater tolerance (i.e., by increasing the margin for error), but control the position of the UAV 10 and inhibit unintended movement of the UAV 10 in relation to the landing platform 110 (e.g., in windy conditions).

The depressions 134 define inner walls 135 (FIGS. 8A, 8B, 11) that are angled (tapered, beveled, chamfered, sloped) in configuration in order to guide the UAV 10 (i.e., the legs 14) into the landing areas 132. In addition to facilitating docking of the UAV 10 by further increasing the landing envelope and further reducing the requisite precision, the angled configuration of the inner walls 135 increases the likelihood that the UAV 10 will be retained within the landing areas 132 (e.g., in the event of recoil during landing).

In the illustrated embodiment, each of the inner walls 135 extends at an angle A (FIG. 8B) in relation to a vertical reference axis V, which extends in generally parallel relation to the landing direction Y (FIG. 11) and in generally orthogonal relation to the width W of the landing platform 110, that lies substantially within the range of approximately 30 degrees to approximately 60 degrees. Embodiments in which the angles A may lie outside of the disclosed range are also envisioned herein, however (e.g., depending upon the particular configuration of the UAV 10, the configuration of the landing platform 110, etc.).

During docking, it is envisioned that proper landing of the UAV 10 (i.e., reception of the legs 14 of the UAV 10 within the depressions 134) may be confirmed via an inertial measurement unit (IMU) 16 (FIGS. 12, 13) on the UAV and/or via detection of the legs 14 by the fiducials 122 (FIG. 11), as described in further detail below. In the event of an improper landing (e.g., in the event that one or more of the legs 14 of the UAV 10 are not received within the depressions 134), landing is aborted, the UAV 10 re-ascends, and landing is re-attempted. Additionally, or alternatively, in the event of an improper landing, it is envisioned that the UAV 10 and/or the base station 100 may generate and communicate an alert to a user.

In the illustrated embodiment, the depressions 134 are generally circular in configuration. It is envisioned, however, that the specific configurations of the depressions 134 may be varied in alternate embodiments (e.g., depending on the particular configuration of the UAV 10) without departing from the scope of the present disclosure. For example, an embodiment in which the depressions 134 may be generally polygonal (e.g., square-shaped) is also envisioned herein.

In order to facilitate drainage (e.g., in inclement weather), in certain embodiments, it is envisioned that the landing platform 110 may include one or more gutters (or other such drainage channels) that extend about the landing areas 132.

The fiducial(s) 122 (FIG. 11) facilitate visual identification of the base station 100 by the UAV 10, guidance of the UAV 10 during docking (i.e., towards the landing platform 110), and/or determining that the UAV 10 has landed properly (i.e., in a manner that allows for repositioning of the UAV 10 on the landing platform 110, which is described in further detail below). For example, it is envisioned that the fiducial(s) 122 may facilitate acquisition, descent, landing, and alignment of the UAV 10 during daytime operation, at night, in inclement weather, etc.

The fiducial(s) 122 are supported by and are connected (secured) to the landing platform 110 and may be positioned (located) in any suitable location (e.g., the stage 120, the landing areas 132, etc.). To promote or otherwise enhance visualization and/or recognition of the fiducial(s) 122, it is envisioned that the fiducial(s) 122 may be visible in different spectrums of light (e.g., ambient light, infrared light, etc.) and/or that the landing platform 110 may include contrasting coloration.

In the illustrated embodiment, the landing platform 110 includes: (one or more) at least one (first) fiducial 122*i*, which includes a first configuration and/or size (e.g., surface area); (one or more) at least one (second) fiducial 122*ii*, which includes a second, different configuration and/or size (e.g., surface area); and (one or more) at least one (third) fiducial 122*iii*.

The fiducial(s) 122*i* are positioned (located) within (one or more) at least one of the landing areas 132 (FIG. 12) (i.e., within (one or more) at least one of the depressions 134) and correspond in configuration thereto, which maximizes the detectable surface area of the fiducial(s) 122*i*. As such, in the illustrated embodiment, the fiducial(s) 122*i* are generally circular in configuration. It is envisioned, however, that the specific configuration(s) of the fiducial(s) 122*i* may be varied in alternate embodiments (e.g., depending on the particular configurations of the landing areas 132) without departing from the scope of the present disclosure. As such, embodiments in which the fiducial(s) 122*i* may be generally polygonal (e.g., rectangular, square-shaped, etc.) in configuration are also envisioned herein.

The fiducial(s) 122*ii* are positioned (located) on the stage 120 between the landing areas 132 (i.e., the depressions 134) and are non-circular in configuration. More specifically, in the illustrated embodiment, the fiducial(s) 122*ii* are generally polygonal (e.g., rectangular, square-shaped, etc.) in configuration. It is envisioned, however, that the specific configuration(s) of the fiducial(s) 122*ii* may be varied in alternate embodiments (e.g., depending on the particular configurations of the landing areas 132, the arrangement thereof, etc.) without departing from the scope of the present disclosure.

The fiducial(s) 122*iii* are spaced about the landing platform 110 (i.e., the stage 120) and further facilitate visual identification of the base station 100 by the UAV 10 and guidance of the UAV 10 during docking. In the illustrated embodiment, the fiducial(s) 122*iii* are also positioned (located) between the landing areas 132 (i.e., the depressions 134). It is envisioned, however, that the specific positions (location) of the fiducial(s) 122*iii* may be varied in alternate embodiments (e.g., depending on the particular configurations of the landing areas 132, the arrangement thereof, etc.) without departing from the scope of the present disclosure.

In order to facilitate detection of the fiducials 122 by the UAV 10, it is envisioned that the fiducials 122 may include a reflective outer surface (e.g., coating). Additionally, or alternatively, it is envisioned that the landing platform 110 may include (one or more) at least one light source 136 (FIGS. 11-13) in order to facilitate backlighting of the fiducials 122. For example, in the illustrated embodiment, the light source(s) 136 are associated with (e.g., connected (secured) to) the fiducials 122*i*, 122*ii*, whereas the fiducial 122*iii* is devoid of backlighting.

In various embodiments of the base station 100, it is envisioned that the light source(s) 136 may be controllable in order to generate lighting conditions that facilitate detection by the UAV 10. For example, it is envisioned that the light source(s) 136 may be adjusted in accordance with the exposure on an image capture device of the UAV 10.

In order to further increase detection of the base station 100 (i.e., the fiducials 122) by the UAV 10, it is envisioned that one or more components of the base station 100 may include an anti-glare (e.g., low gloss) finish.

Referring now to FIGS. 16-21 in particular, the alignment members 124 will be discussed. The alignment members 124 are positioned (located) at opposite lateral ends 138, 140 of the landing platform 110 and are configured for engagement (contact) with the UAV 10 (i.e., the legs 14). The alignment members 124 are movable (repositionable) in relation to the stage 120 between an extended position (FIGS. 11, 12, 16) and a retracted position (FIGS. 8C, 13), which facilitates reconfiguration of the landing platform 110 between a first (landing) configuration and a second (charging) configuration, respectively. More specifically, during reconfiguration of the landing platform 110 between the first and second configurations, the alignment members 124 are movable (repositionable) along an axis of movement M (FIG. 12) that extends in generally parallel relation to the width W (FIG. 11) of the landing platform 110 and in generally orthogonal (perpendicular) relation to the landing direction Y (FIG. 11) of the UAV 10.

When the landing platform 110 is in the first configuration, the alignment members 124 are in the extended position and are positioned laterally outward of the landing areas 132 (i.e., along the width W of the landing platform 110), which facilitates docking of the UAV 10 with the base station 100. When the landing platform 110 is in the second configuration, the alignment members 124 are in retracted position and are generally aligned with and are positioned vertically above the landing areas 132. As described in further detail below, during reconfiguration of the landing platform from the first configuration into the second configuration (i.e., during repositioning of the alignment members 124 from the extended position into the retracted position), the alignment members 124 are movable laterally inward (i.e., towards each other) along the axis of movement M and engage (contact) the UAV 10 (e.g., the legs 14 thereof) in order to reposition (e.g., generally center) the UAV 10 on the landing platform 110. Centration of the UAV 10 on the landing platform 110 generally aligns the power source 12 on the UAV 10 with the charging hub 108 (FIGS. 11-15), thereby facilitating charging of the UAV 10, and facilitates proper closure of the roof 104 by inhibiting (if not entirely preventing) contact with the UAV 10 and, thus, damage to the UAV 10 and/or the base station 100.

In certain embodiments, it is envisioned that the landing platform 110 may include (one or more) at least one sensor 142 (FIG. 22) (e.g., Hall sensor(s) 144) in order to ascertain the positions of the alignment members 124 in relation to the stage 120 upon powering of the base station 100. More specifically, the sensors 142 are used to determine the locations of the alignment members 124 within their possible range of motion such that the alignment members 124 can be adjusted (e.g., extended) in order to prepare the base station 100 for landing of the UAV 10.

Although shown as being connected (secured) to an underside 146 of the landing platform 110 (i.e., the stage 120) in the illustrated embodiment, it is envisioned that the sensor(s) 142 may be positioned in any location(s) suitable for the intended purpose of ascertaining the positions of the alignment members 124.

The alignment members 124 include: fences 148 (FIGS. 18, 19, 21); projections 150; and alignment brackets 152.

The fences 148 extend along the depth D (FIG. 11) of the landing platform 110 and support the projections 150 and the alignment brackets 152. More specifically, in the illustrated embodiment, the alignment members 124 are configured such that the fences 148 span (i.e., extend across) the landing areas 132 and define lengths Lf.

The projections 150 extend laterally inward from the fences 148 (i.e., towards each other, along the width W (FIG. 11) of the landing platform 110) and are generally centered along the fences 148 (i.e., along the lengths Lf thereof). In the illustrated embedment, the projections 150 are formed integrally (unitarily, monolithically) with the fences 148 (i.e., such that the fences 148 and the projections 150 are formed from a single piece of material). Embodiments in which the fences 148 and the projections 150 may be formed as separate, discrete components are also envisioned herein, however.

The projections 150 are generally triangular in configuration and define (angled) bearing surfaces 154 that are configured for engagement (contact) with the UAV 10 (e.g., the legs 14 thereof) during repositioning of the alignment members 124 from the extended position into the retracted position. More specifically, the projections 150 define lengths Lp (FIG. 18) that are approximately equal to the front-to-rear spacing S (FIGS. 8C, 12) between the legs 14 of the UAV 10.

In the illustrated embodiment, the alignment members 124 include (resilient) bumpers 156 (FIGS. 18. 19), which extend along both the fences 148 and the projections 150 (i.e., the bearing surfaces 154). The bumpers 156 are configured for engagement (contact) with the UAV 10 (i.e., the legs 14 thereof) and absorb force upon contact therewith in order to inhibit (if not entirely prevent) damage to the UAV 10 and/or the alignment members 124.

The alignment members 124 are configured such that the bearing surfaces 154 subtend angles α (FIG. 18) that lie substantially within the range of approximately 90 degrees to approximately 150 degrees. Embodiments in which the alignment members 124 may be configured such that the angles α lie outside of the disclosed range are also envisioned herein, however (e.g., depending upon the particular configuration of the UAV 10, the spacing between the legs 14 thereof, etc.). The angled configurations of the projections 150 urge the legs 14 of the UAV 10 outwardly (e.g., towards a periphery 158 (FIG. 12) of the landing platform 110) during repositioning of the alignment members 124 from the extended position into the retracted position.

The alignment brackets 152 extend laterally inward from the fences 148 and are positioned (located) outwardly of the projections 150 (i.e., along the lengths Lf of the fences 148). The alignment brackets 152 define opposite (first and second) ends 160, 162 (FIG. 20) and include bases 164 and arms 166. The alignment brackets 152 are positioned (located) within (are received by) the slots 126 (FIGS. 11-13) in the landing platform 110 and are movable therethrough during extension and retraction of the alignment members 124 (i.e., reconfiguration of the landing platform 110 between the first and second configurations, respectively).

The bases 164 are positioned at the ends 160 of the alignment brackets 152 and include openings 168 that are configured to receive fasteners 170 in order to connect (secure) the bases 164 to the fences 148.

The arms 166 extend laterally inward from the bases 164 (i.e., along the width W (FIG. 11) of the landing platform 110) and include openings 172, 174 and mounts 176, which are configured to receive fasteners 178, 180, 182, respectively, in order to connect (secure) the alignment members 124 (i.e., the alignment brackets 152) to the drive mechanism 128, as described in further detail below.

Figure 17:
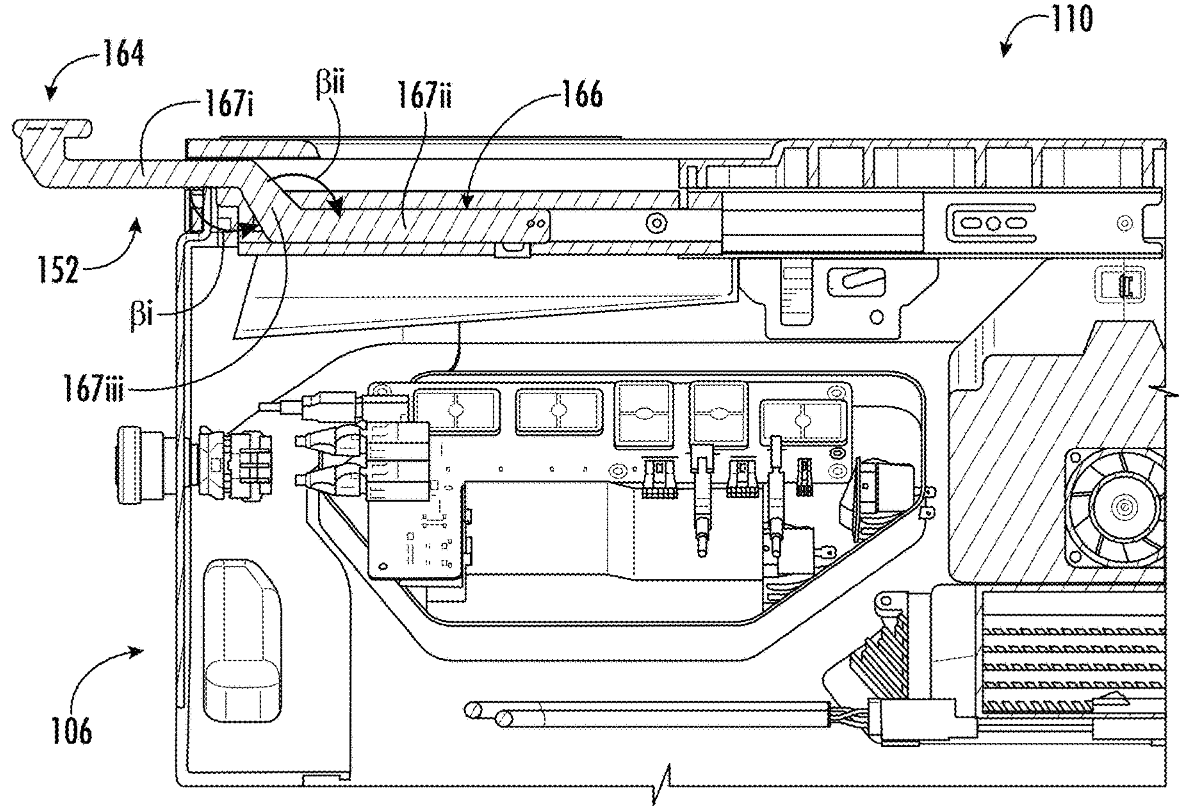
FIG. 17 is a partial, cross-sectional view of the base station.
Figure 18:
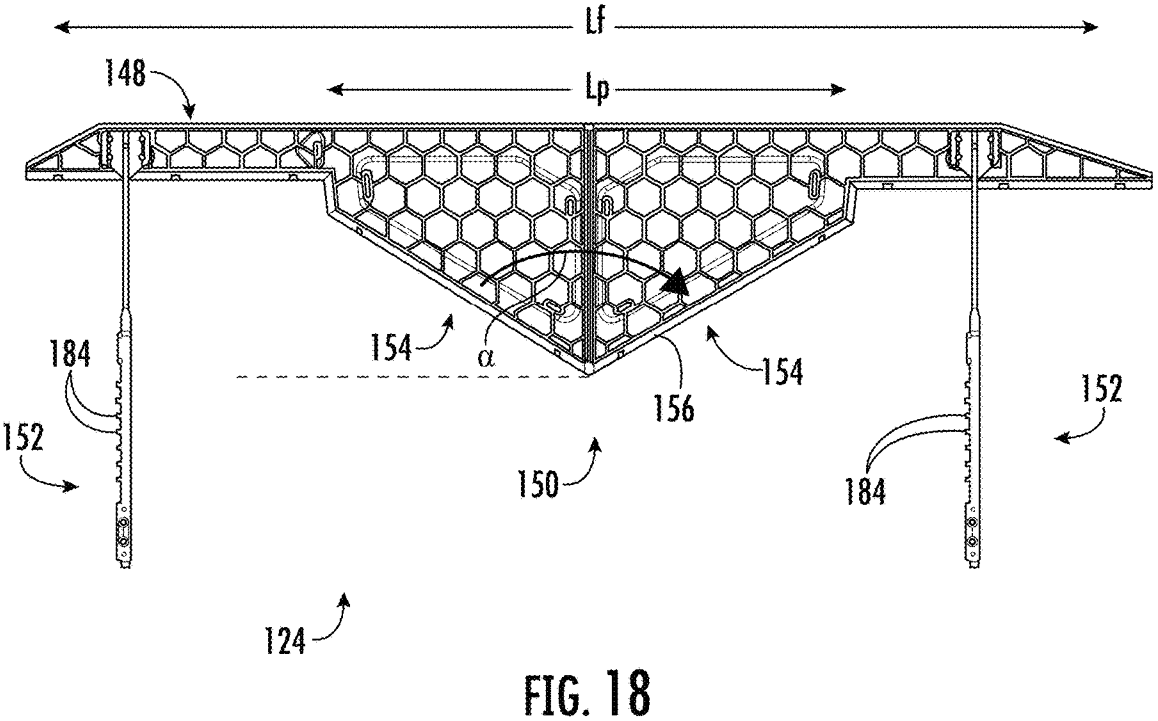
FIG. 18 is a bottom, plan view of one of the alignment members, each of which includes: a fence; a projection; and an alignment bracket.
Figure 19:
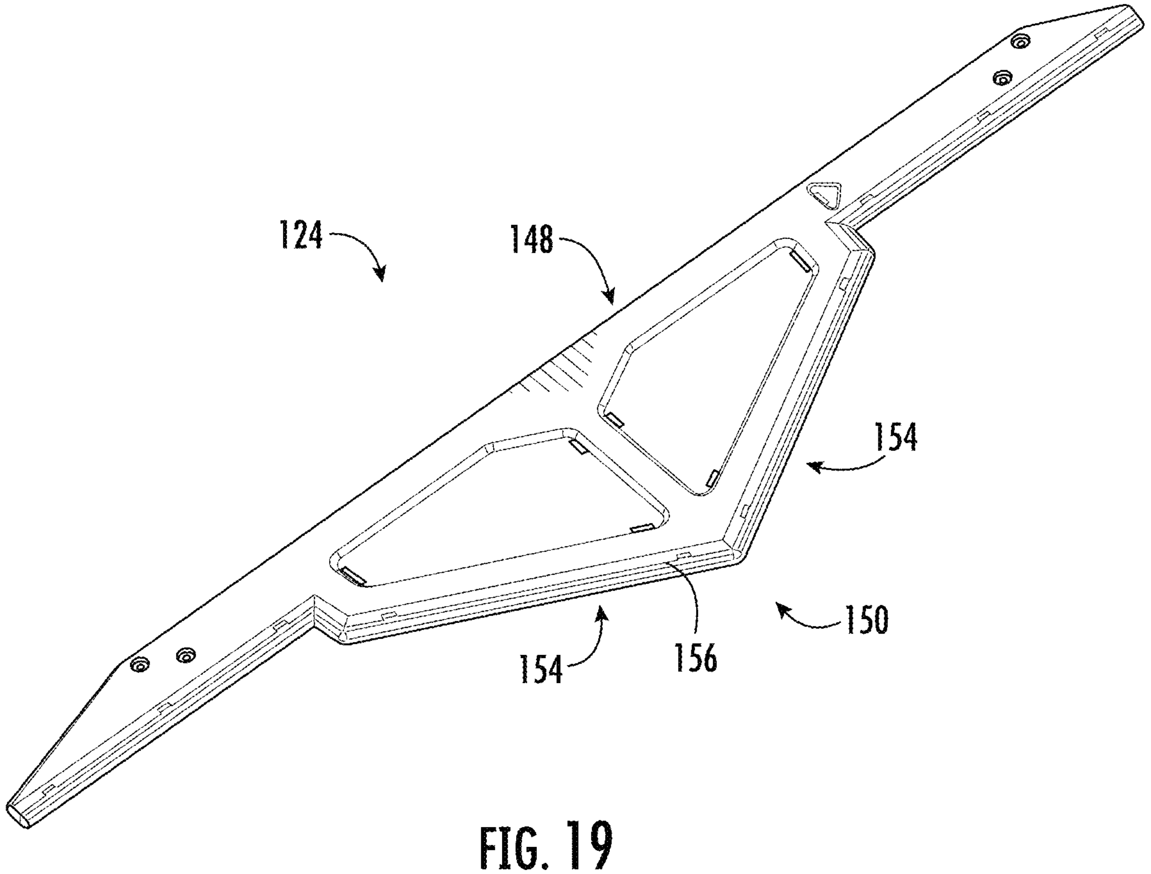
FIG. 19 is a partial, top, perspective view of one of the alignment members illustrating the fence and the projection.
Figure 20:
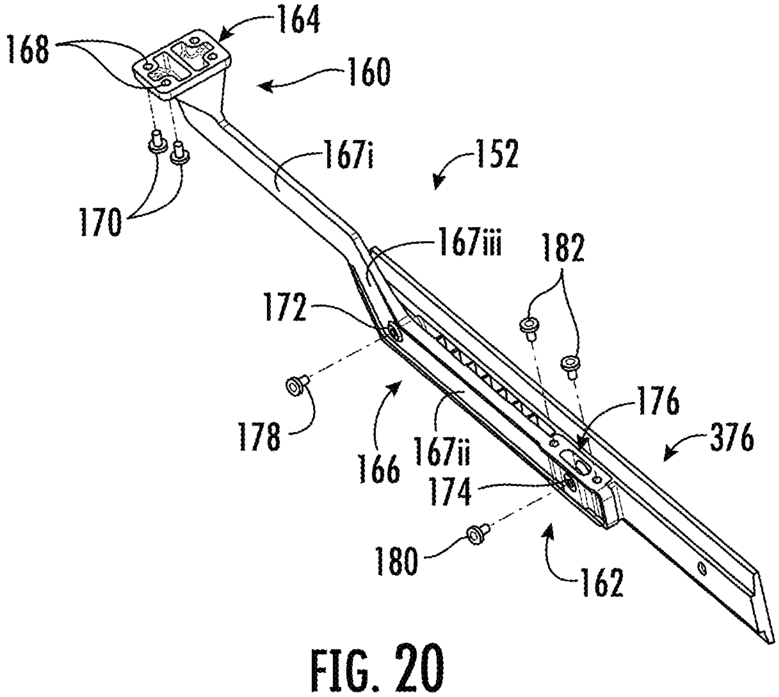
FIG. 20 is a partial, top, perspective view of one of the alignment members illustrating the alignment bracket.
Figure 21:
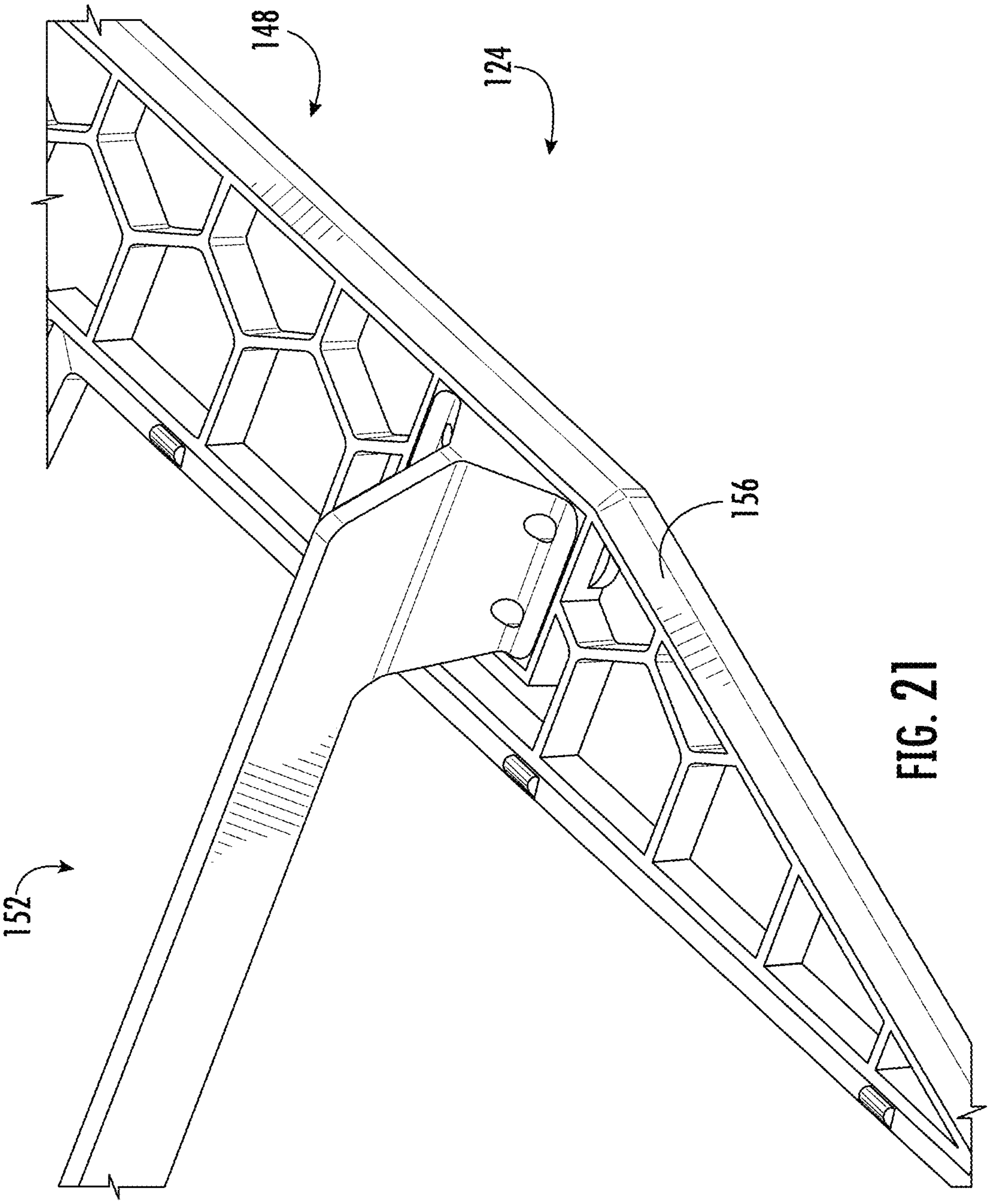
FIG. 21 is a partial, bottom, perspective view of one of the alignment members illustrating connection of the alignment bracket to the fence.

As seen in FIGS. 17 and 20, the arms 166 include: (first) sections 167*i*; (second) sections 167*ii*, which extend in generally parallel relation to the sections 167*i* and are vertically offset therefrom; and transitions 167*iii*, which extend between and connect the sections 167*i*, 167*ii*. The bases 164 are included (provided) on the sections 167*i*, and the mounts 176 are included (provided) on the sections 167*ii*.

In the illustrated embodiment, the arms 166 are configured such that the transitions 167*iii* subtend angles Bi, Bii (FIG. 17) with the sections 167*i*, 167*ii*, respectively, wherein the angles Bi, Bii lie substantially within the range of approximately 110 degrees to approximately 150 degrees. Embodiments in which the arms 166 may be configured such that either or both of the angles Bi, Bii lie outside of the disclosed range are also envisioned herein, however (e.g., depending upon the particular configuration of the stage 120, the drive mechanism 128, etc.).

Although shown as being approximately equivalent, embodiments in which the angles Bi, Bii may be nonequivalent are also envisioned herein.

In certain embodiments, it is envisioned that the alignment brackets 152 may further include fins 184 (FIG. 18) in order to facilitate drainage and the direction of water away from the drive mechanism 128. More specifically, the fins 184 are included (provided) on the sections 167*ii* and extend in a generally vertical orientation (i.e., such that the fins 184 extend in generally orthogonal (perpendicular) relation to the lengths of the sections 167*ii*).

With reference now to FIGS. 16 and 22-31, the drive mechanism 128 will be discussed. The drive mechanism 128 is positioned within the base 102 (i.e., the body 106) and is supported by the landing platform 110 such that the drive mechanism 128 is concealed by the landing platform 110 when the landing platform 110 is in the closed position. More specifically, the drive mechanism 128 is connected (secured) to the underside 146 of the landing platform 110 and to the alignment members 124, as described in further detail below, whereby the drive mechanism 128 indirectly connects the alignment members 124 to the stage 120.

The drive mechanism 128 interfaces with (i.e., is connected (secured) to) the alignment members 124 and is configured to facilitate repositioning thereof between the extended and retracted positions. The drive mechanism 128 includes: a motor assembly 186; a drive member 188; drive brackets 190; pulley assemblies 192; and slide assemblies 194.

The motor assembly 186 (FIG. 26) includes a motor 196, which is fixedly (i.e., immovably) and indirectly connected (secured) to the underside 146 of the landing platform 110 (i.e., the stage 120), and a motor shaft 198, which is connected (secured) to and extends from the motor 196. As described in further detail below, the motor assembly 186 drives the alignment members 124 via the drive member 188 and the drive brackets 190 to facilitate repositioning of the alignment members 124 between the extended and retracted positions.

The drive member 188 is positioned (located) vertically below (beneath) the landing platform 110 (i.e., the stage 120) and extends internally within the base station 100 (i.e., the body 106). The drive member 188 facilitates the transfer of power from the motor assembly 186 to the alignment members 124 and may include any structure(s) and component(s) suitable for that intended purpose.

In the illustrated embodiment, the drive member 188 includes a belt 200. Embodiments in which the particular configuration of the drive member 188 may be varied are also envisioned herein, however. For example, embodiments in which the drive member 188 may include a chain or the like are also envisioned herein.

The drive brackets 190 (FIG. 30) define (first and second) ends 202, 204 and extend between and connect the drive member 188 and the alignment members 124 (i.e., the alignment brackets 152) in order to facilitate the transfer of power from the motor assembly 186 to the alignment members 124 such that, upon actuation of the motor assembly 186, movement of the drive member 188 (i.e., advancement and retraction thereof) causes corresponding movement of the drive brackets 190 and the alignment members 124.

The ends 202 of the drive brackets 190 are connected (secured) to the drive member 188 and include: grooves 206; retainers 208 (FIGS. 23, 24); and openings 210.

The grooves 206 are recessed into the drive brackets 190 and are configured to receive the drive member 188 such that the drive member 188 extends into the drive brackets 190. More specifically, the grooves 206 extend in generally parallel relation to the width W (FIG. 11) of the landing platform 110 and the length of the drive member 188.

The retainers 208 extend between and connect the drive member 188 and the drive brackets 190. More specifically, the retainers 208 include (first) ends 212, which are connected (secured) to the drive member 188, and (second) ends 214, which are connected (secured) to the drive brackets 190 via fasteners 216 (FIG. 30) that extend into the openings 210 in order to connect the drive member 188 to the drive brackets 190. Upon assembly of the landing platform 110, the retainers 208 overlie the drive member 188 and span (i.e., extend across) the grooves 206, thereby maintaining the drive member 188 within the grooves 206 and securing the drive member 188 to the drive brackets 190.

The ends 204 of the drive brackets 190 include feet 218 and are connected (secured) to the alignment members 124, whereby the drive member 188 is operatively (e.g., indirectly) connected to the alignment members 124 via the drive brackets 190. The feet 218 are configured for engagement (contact) with the mounts 176 (FIG. 20) on the alignment brackets 152 and include openings 220, which are oriented in generally orthogonal (perpendicular) relation to the openings 210. The openings 220 are configured to receive the fasteners 182 (FIG. 20) such that the fasteners 182 extend through the drive brackets 190 and into the mounts 176.

Figure 30:
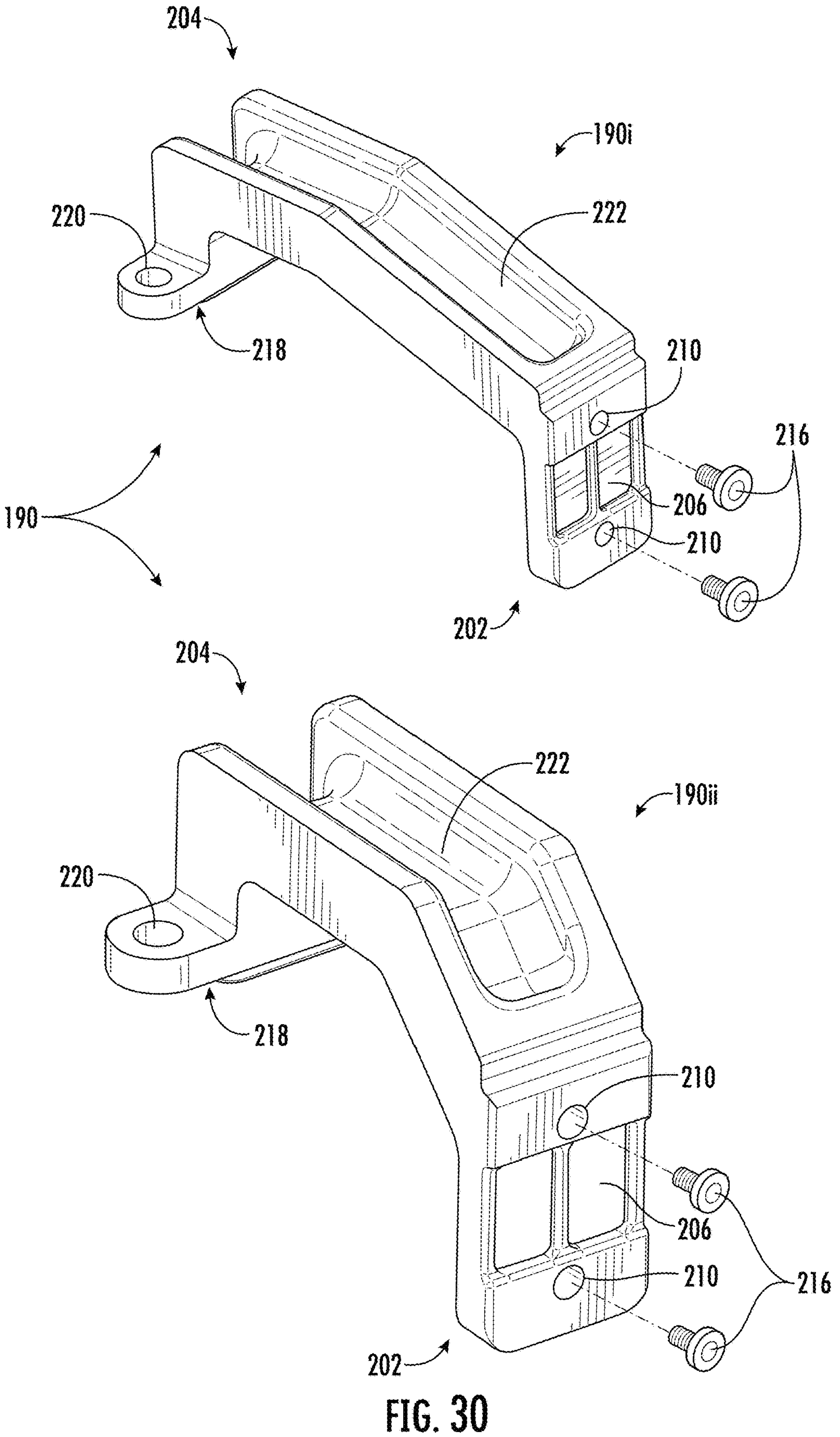
FIG. 30 is a bottom, perspective view of the drive brackets.
Figure 31:
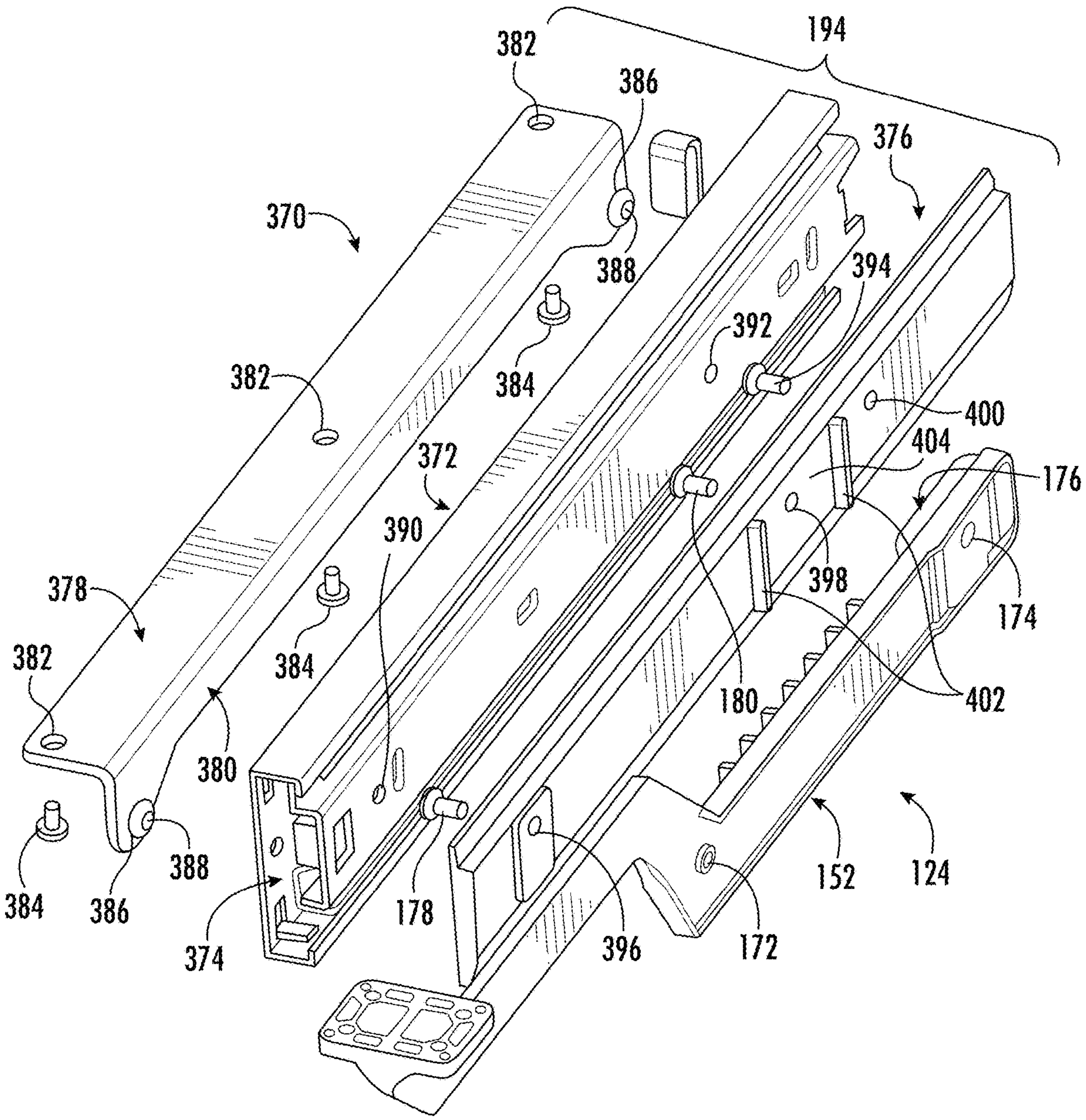
FIG. 31 is a top, perspective view of one of the slide assemblies shown with one of the alignment brackets.

In order to reduce the overall weight of the drive mechanism 128, in certain embodiments, it is envisioned that the drive brackets 190 may include reliefs 222, as seen in FIG. 30.

In the illustrated embodiment, the drive mechanism 128 includes (first) drive brackets 190*i* with first configurations and (second) drive brackets 190*ii* with second, different configurations. The differing configurations of the drive brackets 190*i*, 190*ii* are dictated by the specific locations (positions) thereof in relation to the alignment members 124 and the slide assemblies 194, packing concerns, etc. Embodiments in which each of the drive brackets 190 may be generally identical in configuration are also envisioned herein, however.

With reference now to FIGS. 16, 22, and 25-29 in particular, the pulley assemblies 192 will be discussed. The pulley assemblies 192 engage, support, and guide the drive member 188 to facilitate the transfer of power from the motor assembly 186 to the alignment members 124. The pulley assemblies 192 are connected (secured) to the underside 146 of the landing platform 110 (i.e., the stage 120) and are configured to apply both an axial and a lateral tension to the drive member 188, as described in further detail below.

The pulley assemblies 192 include: a (first) pulley assembly 224; a (second) pulley assembly 226; (third) pulley assemblies 228; and a (fourth) pulley assembly 230.

The pulley assembly 224 is connected (secured) to and extends between the motor assembly 186 and the landing platform 110 (i.e., the stage 120). The pulley assembly 224 includes a (first) frame 232 (FIG. 26) and a (first) pulley 234, which is rotatable about a (first) axis of rotation R1, and is non-adjustable in that configuration of the frame 232 and the axis of rotation R1 are both fixed (i.e., immovable) in relation to the frame 232.

The frame 232 includes: a base plate 236 and mounting brackets 238*i*, 238*ii*.

The base plate 236 defines a (central) aperture 240, which receives (accommodates) the motor shaft 198 and the pulley 234 such that the motor shaft 198 and the pulley 234 extend into the frame 232, and openings 242, which receive fasteners 244. The fasteners 244 extend through the base plate 236 and into the motor assembly 186 (i.e., the motor 196) to thereby fixedly (i.e., immovably) connect (secure) the base plate 236 to the motor assembly 186.

The mounting brackets 238*i*, 238*ii* extend vertically from the base plate 236 and respectively include flanges 246*i*, 246*ii* that define openings 248. The openings 248 receive fasteners 250, which extend through the flanges 2461, 246*ii* and into the underside 146 of the landing platform 110 (i.e., the stage 120), thereby directly connecting (securing) the pulley assembly 224 to the landing platform 110 and indirectly connecting (securing) the motor assembly 186 to the landing platform 110 via the pulley assembly 224.

In certain embodiments, it is envisioned that the frame 232 may include a visual indicator 252 (e.g., a notch 254) that provides a reference point in order to facilitate proper alignment and connection of the pulley assembly 224 and the motor assembly 186. Although shown as being included on the flange 246*ii*, it is envisioned that the visual indicator 252 may be positioned in any suitable location.

The pulley 234 engages (contacts) the drive member 188 such that the drive member 188 extends about the pulley 234. The pulley 234 is connected (secured) to the motor shaft 198 such that, upon actuation of the motor assembly 186, rotation of the motor shaft 198 in a first direction (e.g., clockwise) causes corresponding rotation of the pulley 234 about the axis of rotation R1, which is defined by the motor shaft 198, and, thus, advancement of the drive member 188, and rotation of the motor shaft 198 in a second direction (e.g., counterclockwise) causes corresponding rotation of the pulley 234 and, thus, retraction of the drive member 188. The pulley 234 thus supports, guides, and drives the drive member 188 in order to maintain tension in and apply force to the drive member 188 so as to facilitate advancement and retraction thereof.

The pulley assembly 226 is connected (secured) to the landing platform 110 (i.e., the stage 120) and is positioned adjacent to the motor assembly 186 and the pulley assembly 224. The pulley assembly 226 includes: a (second) frame 256; pulley shafts 258, which define (second) axes of rotation R2; (second) pulleys 260; and (one or more) at least one biasing member 262. The pulley assembly 226 is adjustable in that the axes of rotation R2 are laterally movable, as described in further detail below.

The frame 256 includes openings 264 and slots 266.

The openings 264 receive fasteners 268 such that the fasteners 268 extend through the frame 256 and into the underside 146 of the landing platform 110 (i.e., the stage 120), thereby directly connecting (securing) the pulley assembly 226 to the landing platform 110.

The slots 266 extend in generally orthogonal (perpendicular) relation to the length of the drive member 188 and the width W (FIG. 11) of the landing platform 110 and in generally parallel relation to the depth D of the landing platform 110. The slots 266 receive the pulley shafts 258 such that the pulley shafts 258 extend into and through the frame 256 via the slots 266, which facilitates connection of the biasing member(s) 262 to the pulley shafts 258 as well as lateral adjustment (movement, repositioning) of the pulley shafts 258 and, thus, the pulleys 260 and the axes of rotation R2, in relation to the frame 256.

The pulleys 260 engage (contact) the drive member 188 such that the drive member 188 extends therebetween whereby movement (repositioning) (i.e., advancement and retraction) of the drive member 188 causes corresponding rotation of the pulleys 260 in relation to the frame 256 about the axes of rotation R2. The pulleys 260 thus support and guide the drive member 188 in order to maintain the tension therein.

The pulleys 260 are connected (secured) to the pulley shafts 258, which facilities lateral movement (repositioning) of the pulleys 260 in relation to the frame 256 via movement of the pulley shafts 258 within the slots 266. Adjusting the lateral positions of the pulleys 260 applies a lateral force and a lateral (first) tension TL (FIG. 25) to the drive member 188, which are oriented in a direction that is generally orthogonal (perpendicular) in relation to the length of the drive member 188, and allows for variation in the lateral tension TL. Varying the lateral tension TL facilitates fine adjustments in the overall tension in the drive member 188 and proper engagement of the drive member 188 and the pulley assemblies 192.

The biasing member(s) 262 extend in generally orthogonal (perpendicular) relation to the length of the drive member 188. The biasing member(s) 262 include opposite ends 270, 272 that engage (contact) or are otherwise connected (secured) to the pulley shafts 258 such that the biasing member(s) 262 extend between the pulley shafts 258. The biasing member(s) 262 apply a lateral approximation force to the pulley shafts 258 that biases the pulley shafts 258 and, thus, the pulleys 260 laterally inward (i.e., towards each other and in generally orthogonal (perpendicular) relation to the length of the drive member 188) and into engagement (contact) with the drive member 188 so as to apply the aforementioned lateral tension TL thereto.

In order to increase or decrease the lateral approximation force and, thus, the lateral tension TL applied to the drive member 188, it is envisioned that the specific configuration(s) of the biasing member(s) 262 (e.g., the spring constant(s) thereof) may be varied.

In the illustrated embodiment, the ends 270, 272 of the biasing member(s) 262 include eyelets 274 that receive the pulley shafts 258 such that the pulley shafts 258 extend through the eyelets 274. It is envisioned, however, that the biasing member(s) 262 may engage and/or receive the pulley shafts 258 in any manner suitable for the intended purpose of facilitating the application of force thereto in the manner described herein.

In the illustrated embodiment, the pulley assembly 226 includes a pair of biasing members 262. It is envisioned, however, that the specific number of biasing members 262 may be varied in alternate embodiments. For example, an embodiment of the pulley assembly 226 that includes a single biasing member 262 is also envisioned herein.

Additionally, while the biasing members 262 are each illustrated as a coil spring 276, it is envisioned that the biasing members 262 may include any structure and components suitable for the intended purpose of applying the lateral tension TL to the pulleys 260 in the manner described above.

The pulley assemblies 228 are connected (secured) to the landing platform 110 (i.e., the stage 120) and are positioned (located) between the pulley assembly 226 and the pulley assembly 230. The pulley assemblies 228 are generally identical in configuration and each include: a (third) frame 278; pulley shafts 280, which define (third) axes of rotation R3; (third) pulleys 282; and a spacer 284. The pulley assemblies 228 are non-adjustable in that the axes of rotation R3 are fixed (i.e., immovable) in relation to the frame 278.

Although shown as including a pair of pulley assemblies 228, it is envisioned that the specific number of pulley assemblies 228 may be varied in alternate embodiments of the landing platform 110. For example, an embodiment of the landing platform 110 that includes a single pulley assembly 228 is also envisioned herein as are embodiments that include three or more pulley assemblies 228.

The frame 278 includes: (upper, first and lower, second) frame portions 286, 288, which extend in generally parallel relation; a backspan 290, which connects the frame portions 286, 288; openings 292; openings 294; and an opening 296.

The openings 292 receive fasteners 298 such that the fasteners 298 extend through the frame 278 and into the underside 146 of the landing platform 110 (i.e., the stage 120), thereby directly connecting (securing) the pulley assemblies 228 to the landing platform 110.

The openings 294 receive the pulley shafts 280 such that the pulley shafts 280 extend into and through the frame 278 via the openings 294. Reception (positioning) of the pulley shafts 280 within the openings 294 inhibits (if not entirely prevents) lateral movement of the pulley shafts 280 and, thus, the pulleys 282, in relation to the frame 278 such that the pulleys 282 are laterally fixed (i.e., immovable) in relation the frame 278.

The opening 296 extends through the frame portion 288 and receives a fastener 300 such that the fastener 300 extend through the frame portion 286 and into the spacer 284, thereby connecting (securing) the spacer 284 to the frame 278.

The pulleys 282 are connected (secured) to the pulley shafts 280 and engage the drive member 188 such that the drive member 188 extends about the pulleys 282 whereby movement (repositioning) of the drive member 188 causes corresponding rotation of the pulleys 282 in relation to the frame 278 about the axes of rotation R3. The pulleys 282 thus support and guide the drive member 188 in order to maintain the tension therein.

The spacer 284 is positioned (located) internally within the frame 278 (i.e., between the frame portions 286, 288) and is generally aligned with the opening 296. The spacer 284 maintains the configuration of the frame 278 by inhibiting (if not entirely preventing) deflection (e.g., cantilevering) of the frame portions 286, 288 and, thus, interference with rotation of the pulleys 282.

It is envisioned that the spacer 284 may be connected (secured) to the frame 278 in any suitable manner. For example, in the illustrated embodiment, the spacer 284 includes a (first, upper) end 302 that engages (contacts) the frame portion 286 in a snap (pressure) fit and a (second, lower) 304 with an opening 306 that receives the fastener 300 such that the fastener 300 extends into and connects the end 304 of the spacer 284 to the frame portion 288.

Figure 22:
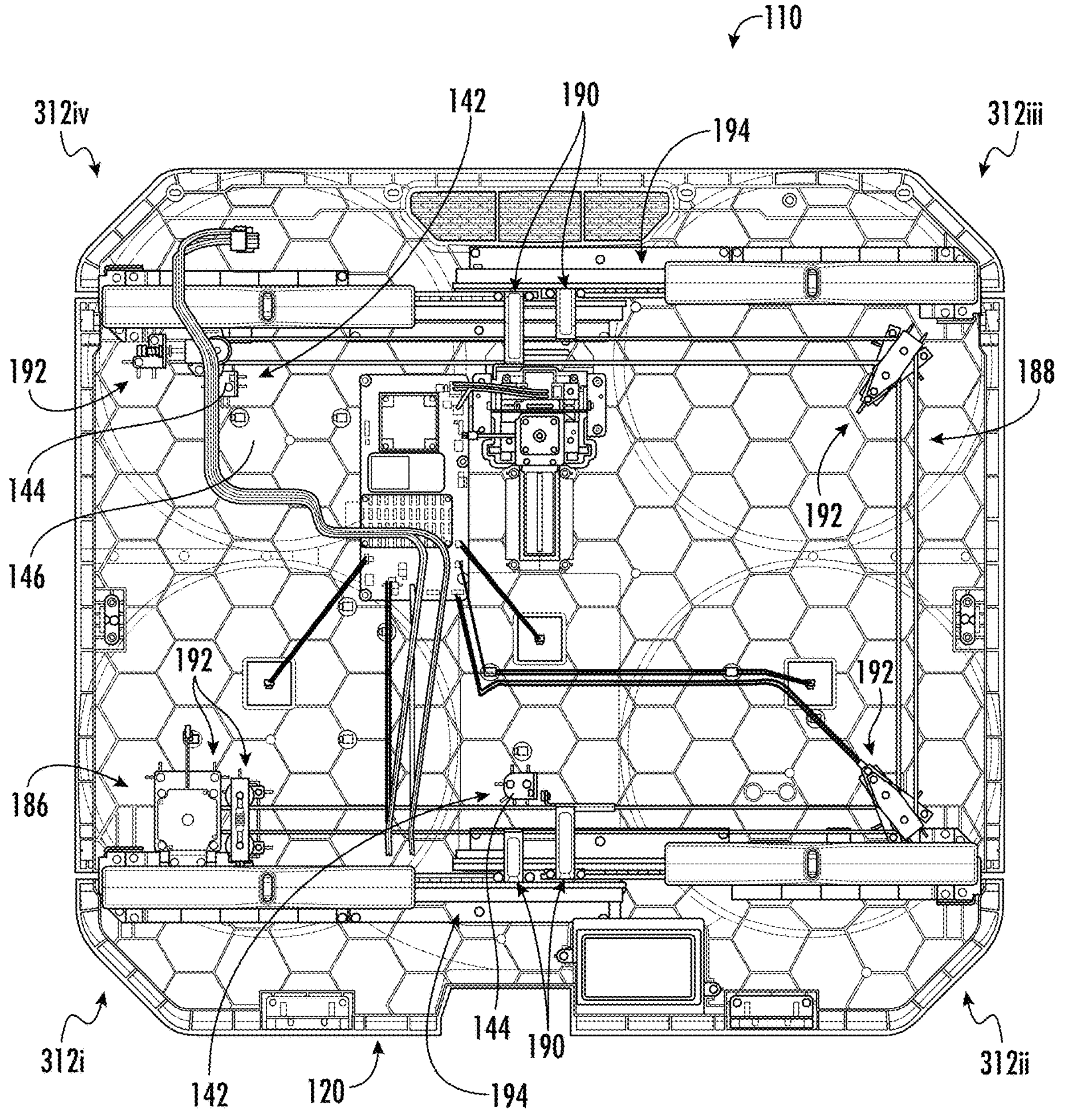
FIG. 22 is a bottom, plan view of the landing platform and the drive mechanism, which includes: a motor assembly; a drive member; drive brackets; pulley assemblies; and slide assemblies.
Figure 23:
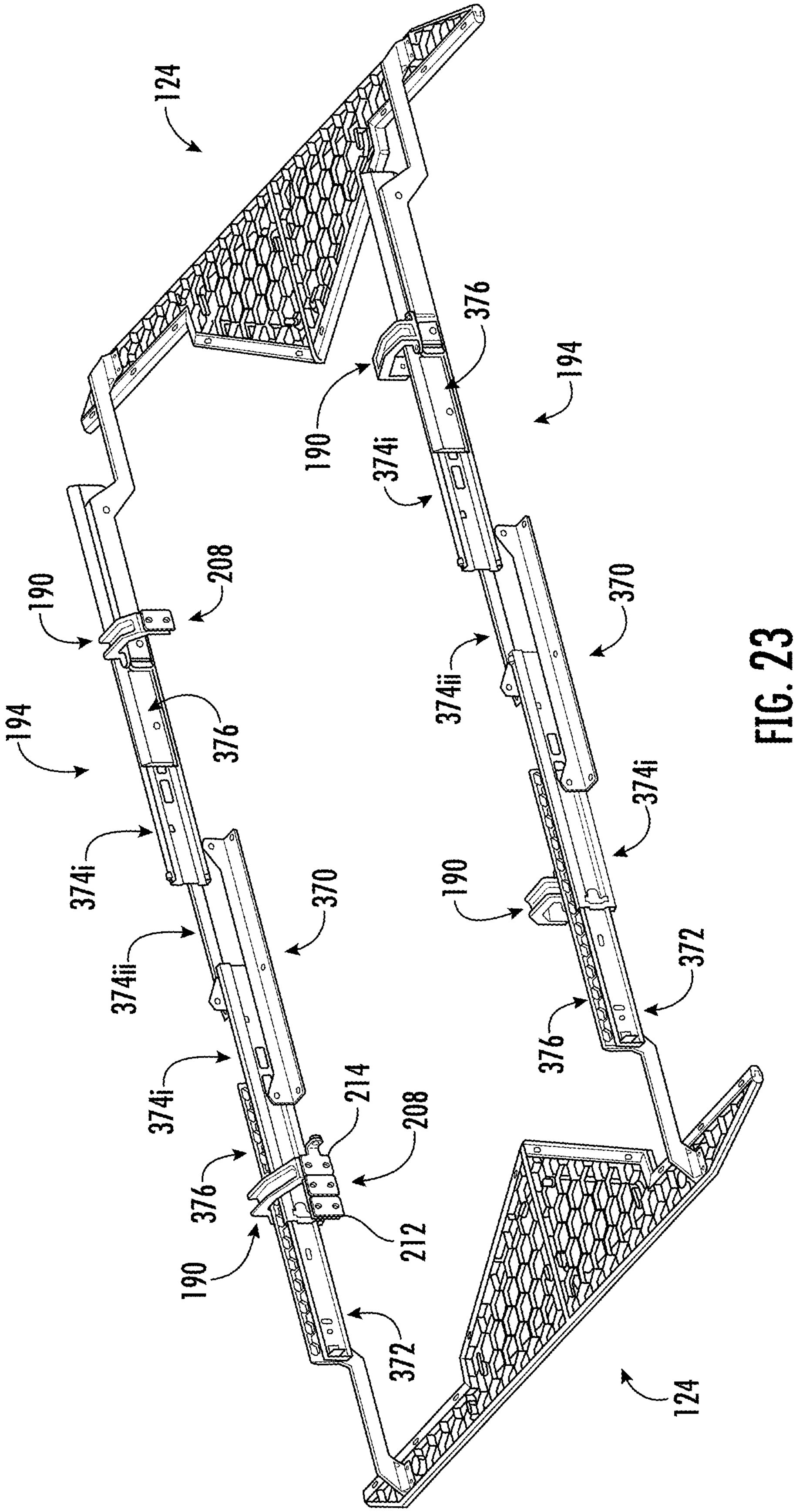
FIG. 23 is a partial, bottom, perspective view of the landing platform and the drive mechanism illustrating the alignment members, the drive brackets, and the slide assemblies with the alignment members shown in the extended position.
Figure 24:
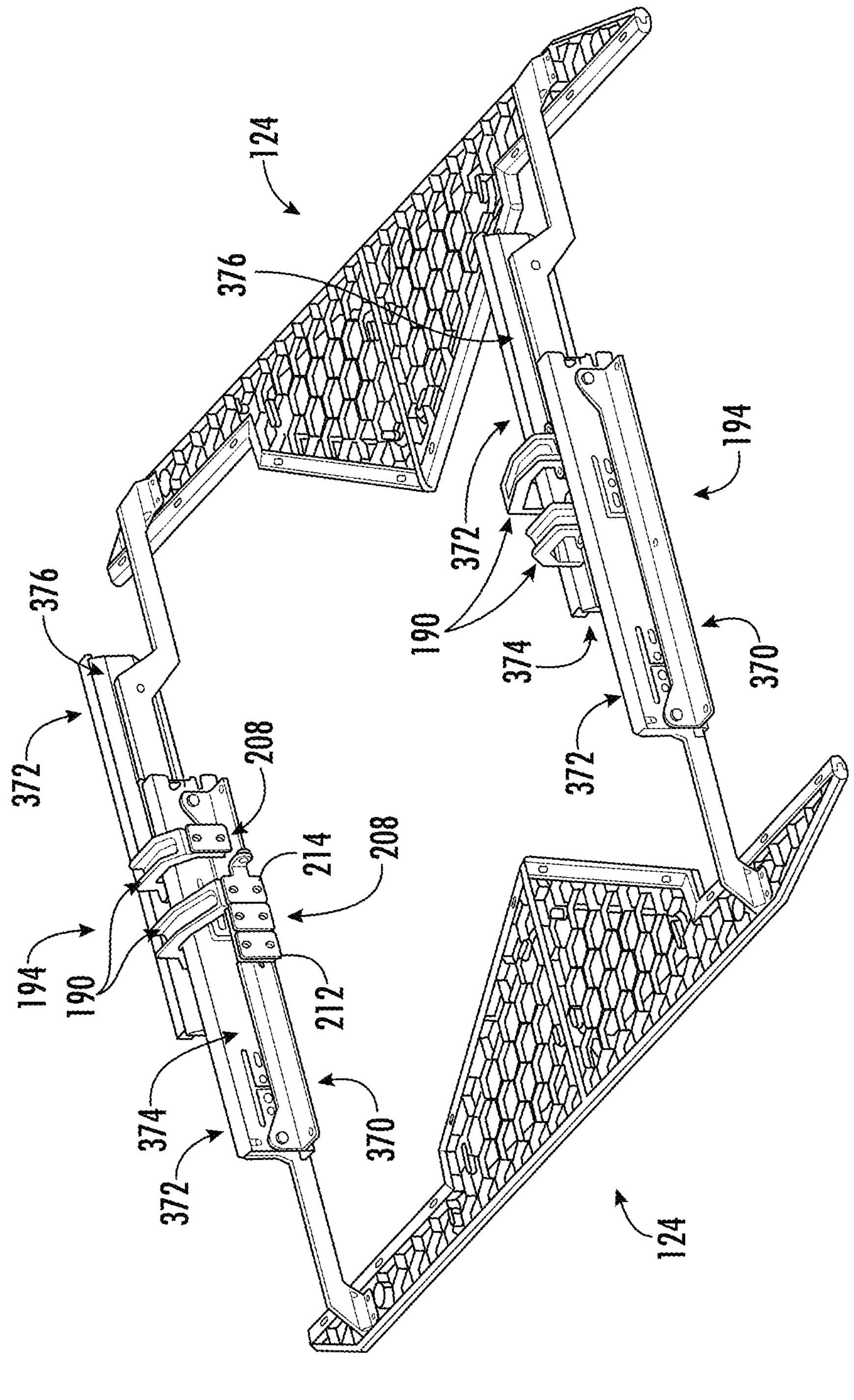
FIG. 24 is a partial, bottom, perspective view of the landing platform and the drive mechanism illustrating the alignment members, the drive brackets, and the slide assemblies with the alignment members shown in the retracted position.
Figure 25:
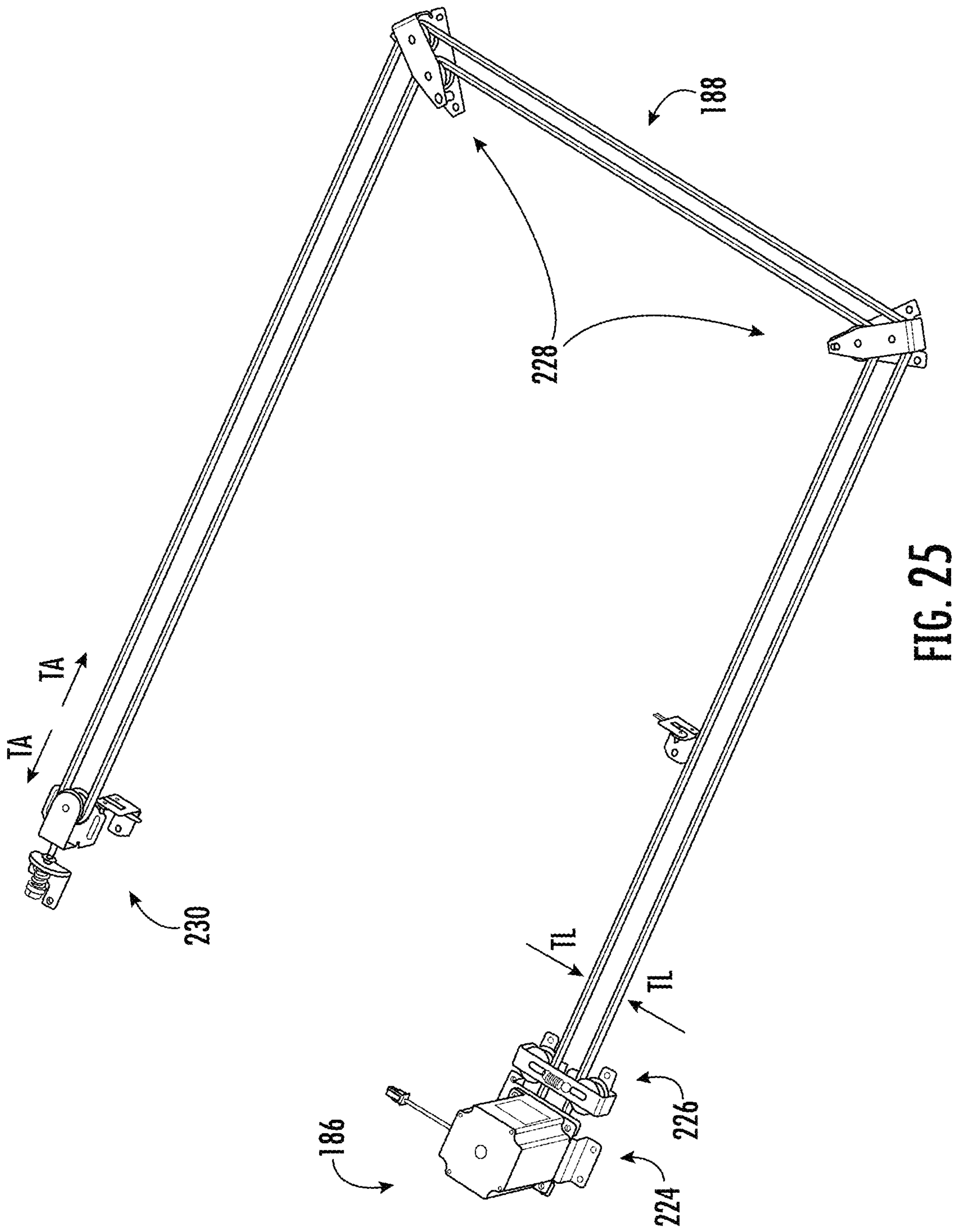
FIG. 25 is a bottom, perspective view of the drive mechanism illustrating a first pulley assembly, a second pulley assembly, a pair of third pulley assemblies, and a fourth pulley assembly.
Figure 26:
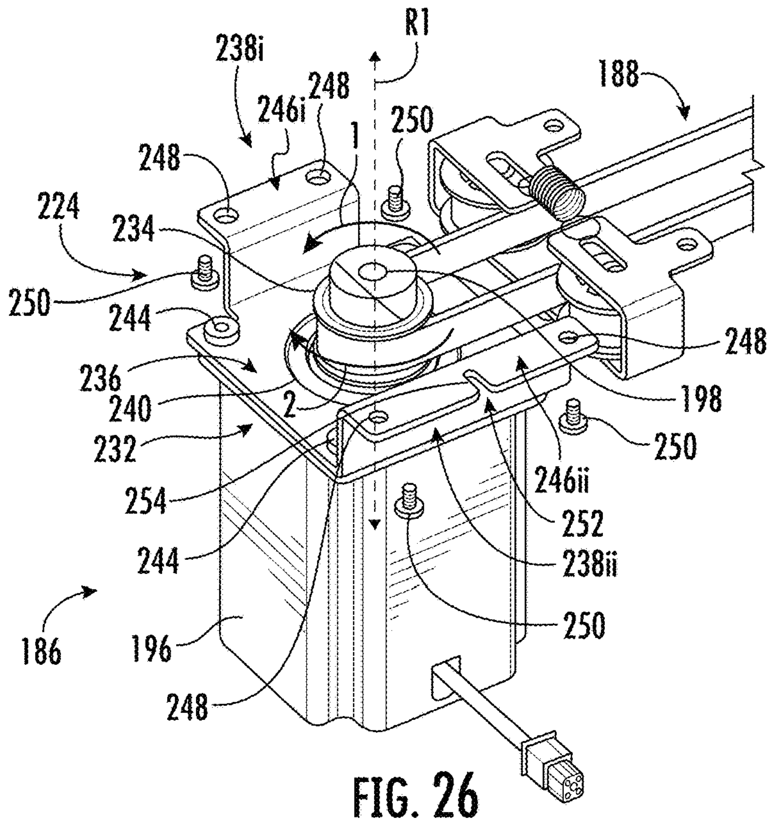
FIG. 26 is a top perspective view of the first pulley assembly and the second pulley assembly shown with the drive member.
Figure 27:
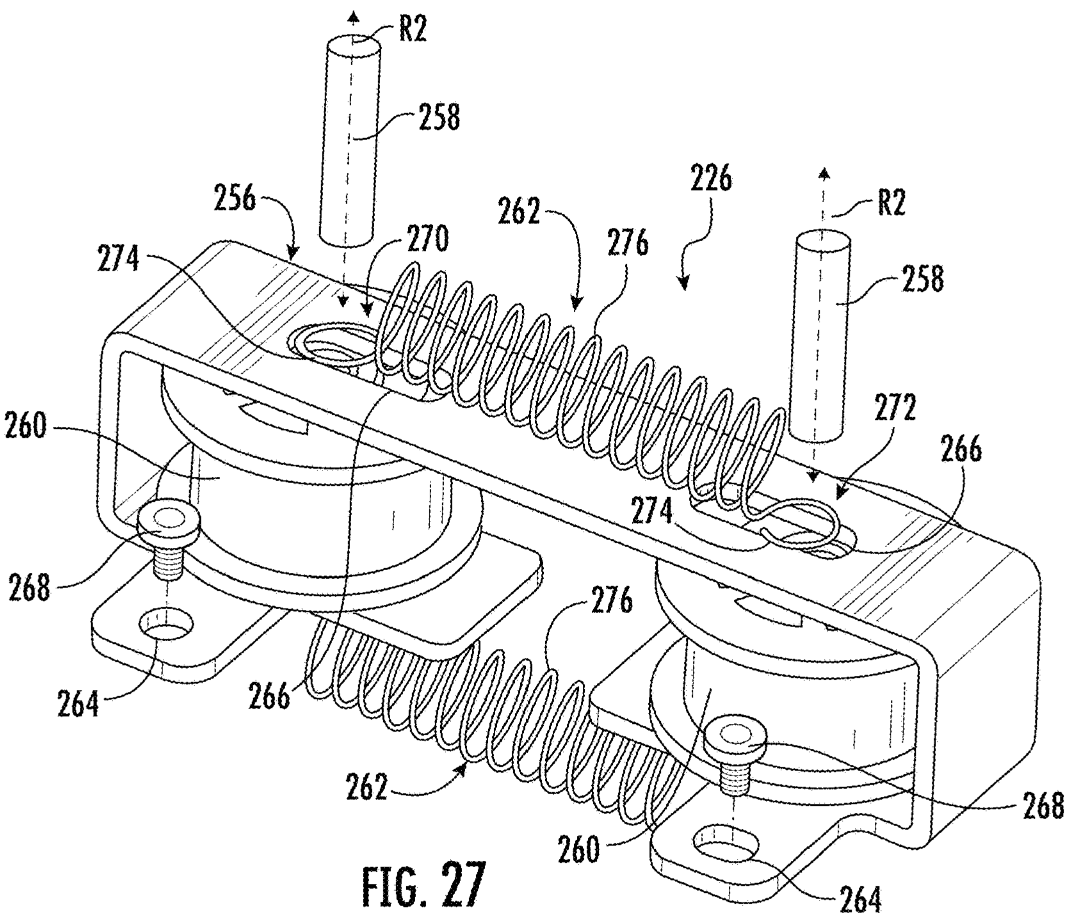
FIG. 27 is a bottom, perspective view of the second pulley assembly.
Figure 28:
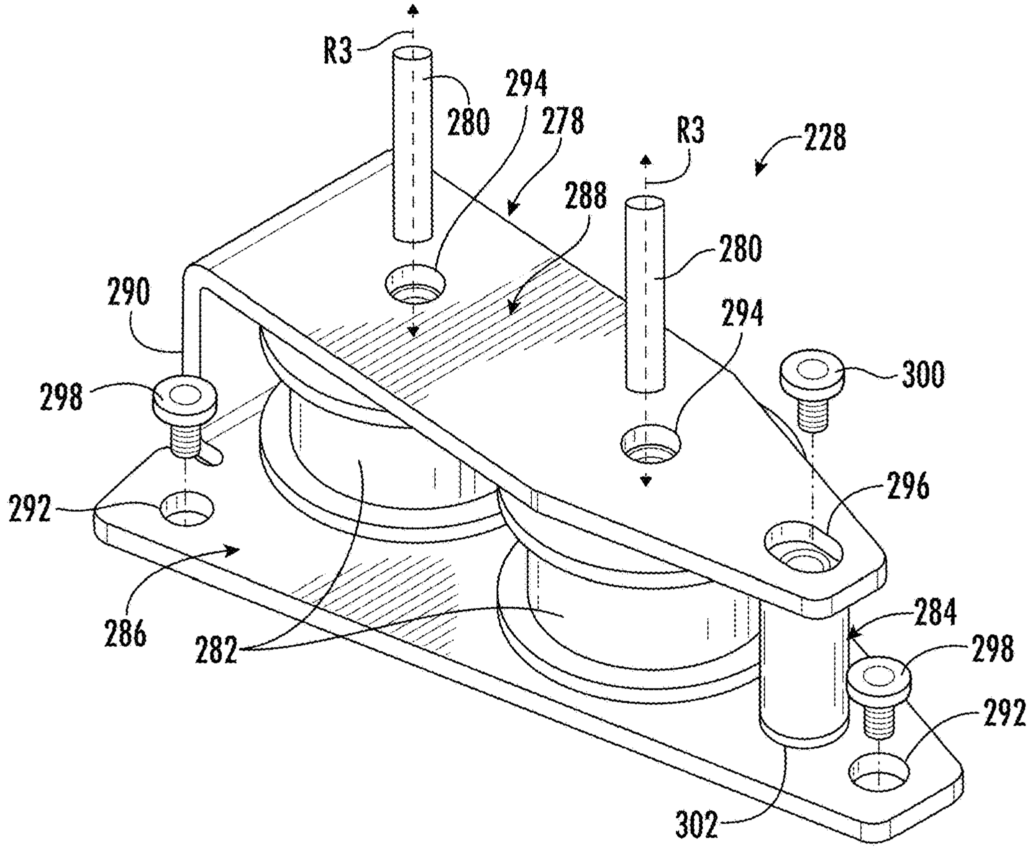
FIG. 28 is a bottom, perspective view of one of the third pulley assemblies.
Figure 29:
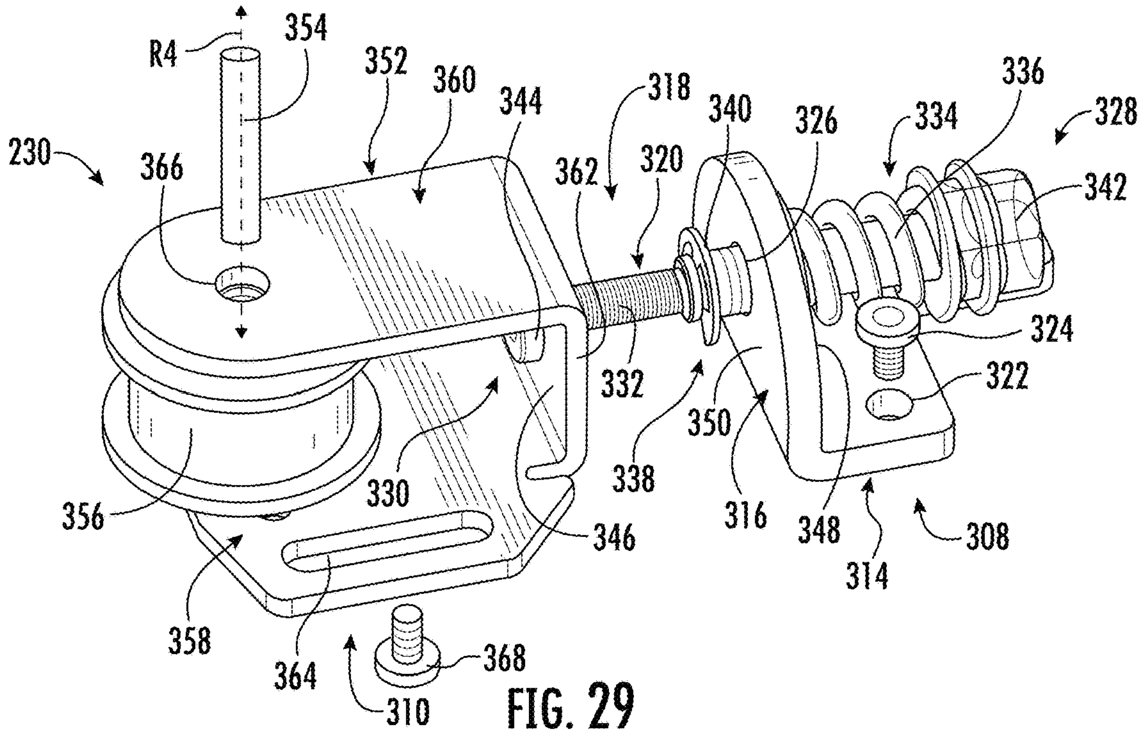
FIG. 29 is a bottom, perspective view of the fourth pulley assembly.

The pulley assembly 230 is connected (secured) to the landing platform 110 (i.e., the stage 120) and includes a (first, fixed) bracket 308 and a (second, movable) bracket 310. More specifically, the pulley assembly 230 is positioned such that the pulley assemblies 192 are arranged in a generally rectangular orientation, as seen in FIG. 22, with the pulley assemblies 224, 226 being generally positioned (located) in a (first) corner section **312*i* of the landing platform 110, the pulley assemblies 228 being generally positioned (located) in (second and third) corner sections 312*ii*, 312*iii* of the landing platform 110, and the pulley assembly 230 being generally positioned (located) in a (fourth) corner section 312***iv* of the landing platform 110.

The pulley assembly 230 is adjustable in that the bracket 310 is repositionable (movable, slidable) in relation to the bracket 308 to expand and compress the pulley assembly 230 and thereby reconfigure the pulley assembly 230 between expanded and compressed configurations. Expansion and compression of the pulley assembly 230 applies an axial force and an axial (second) tension TA (FIG. 25) to the drive member 188, which are oriented in a direction that is generally parallel in relation to the length of the drive member 188 and in generally orthogonal (perpendicular) relation to the lateral tension TL, and allows for variation in the axial tension TA. More specifically, during compression of the pulley assembly 230, the brackets 308, 310 are approximated (i.e., via movement of the bracket 310 towards the bracket 308), which applies and increases the axial tension TA in the drive member 188, thereby tightening the drive member 188, and during expansion of the pulley assembly 230, the brackets 308, 310 are separated (i.e., via movement of the bracket 310 away from the bracket 308), which decreases the axial tension TA in the drive member 188, thereby loosening the drive member 188. Altering the positions of the brackets 308, 310 thus allows the axial tension TA in the drive member 188 to be varied in order to allow for coarse adjustments in the overall tension in the drive member 188 and proper engagement of the drive member 188 and the pulley assemblies 192.

The bracket 308 is generally L-shaped in configuration and includes a (first) leg 314; a (second) leg 316; and an adjustment member 318 (e.g., a set screw 320 or other such fastener).

The leg 314 includes openings 322 that receive fasteners 324 such that the fasteners 324 extend through the bracket 308 and into the underside 146 of the landing platform 110 (i.e., the stage 120), thereby directly and fixedly (i.e., immovably) connecting (securing) the bracket 308 to the landing platform 110.

The leg 316 extends in generally orthogonal (perpendicular) relation to the leg 314 and includes an opening 326 that receives the adjustment member 318 such that the adjustment member 318 extends through the bracket 308.

The adjustment member 318 extends between and connects the brackets 308, 310 and includes: a (first) end 328; a (second) end 330; a shaft 332; a biasing member 334 (e.g., a coil spring 336); and a retention member 338 (e.g., a c-clip 340 or the like).

The end 328 of the adjustment member 318 includes a head 342, which is configured for engagement by a user, either manually or via a tool, to facilitate rotation of the adjustment member 318 in relation to the brackets 308, 310 and, thus, approximation and separation of the brackets 308, 310 (i.e., via axial repositioning of the bracket 310) in order to expand and compress the pulley assembly 230 and thereby apply and vary the axial tension TA (FIG. 25) in the drive member 188.

The end 330 of the adjustment member 318 extends into the bracket 310 and includes an anchor 344. The anchor 344 is configured for engagement (contact) with an inner surface 346 of the bracket 310 in order to inhibit (if not entirely prevent) inadvertent removal of the adjustment member 318 from the bracket 310.

The shaft 332 extends between the ends 328, 330 of the adjustment member 318 in generally parallel relation to the length of the drive member 188. The shaft 332 threadably engages (contacts) the bracket 310 such that rotation of the adjustment member 318 adjusts the relative positions (locations) of the brackets 308, 310 (i.e., the position (location) of the bracket 310 in relation to the bracket 308). More specifically, rotation of the adjustment member 318 in a first direction (e.g., clockwise) causes approximation of the brackets 308, 310 (i.e., movement of the bracket 310 towards the bracket 308), thereby compressing the pulley assembly 230 so as to increase the axial tension TA (FIG. 25) in the drive member 188, and rotation of the adjustment member 318 in a second direction (e.g., counterclockwise) causes separation of the brackets (i.e., movement of the bracket 310 away from the bracket 308), thereby expanding the pulley assembly 230 so as to decrease the axial tension TA in the drive member 188.

The biasing member 334 is supported by and extends about the shaft 332 such that the biasing member 334 extends in generally parallel relation to the length of the drive member 188. More specifically, the biasing member 334 is positioned between the head 342 and an inner surface 348 of the leg 316 of the bracket 308 such that rotation of the adjustment member 318 in the first direction cause compression of the biasing member 262, thereby creating a biasing force that acts upon the bracket 308 and the adjustment member 318 to thereby bias the pulley assembly 230 towards the expanded configuration, and rotation of the adjustment member 318 in the second direction allows for expansion of the biasing member 334 as the brackets 308, 310 are separated during expansion of the pulley assembly 230.

Although illustrated as the aforementioned coil spring 336 in the illustrated embodiment, it is envisioned that the biasing member 334 may include any structure and components suitable for the intended purpose of applying force to the adjustment member 318 in the manner described above.

The retention member 338 is supported by the shaft 332 and is positioned (located) between the brackets 308, 310. The retention member 338 is configured for engagement (contact) with an outer surface 350 of the leg 316 to limit travel of the adjustment member 318 in relation thereto during rotation of the adjustment member 318 in the second direction (i.e., during expansion of the pulley assembly 230), thereby inhibiting (if not entirely preventing) inadvertent removal of the adjustment member 318 from the bracket 308.

The bracket 310 includes: a (fourth) frame 352; a pulley shaft 354, which defines a (fourth) axis of rotation R4; and a (fourth) pulley 356.

The frame 352 includes: (upper, first and lower, second) frame portions 358, 360, which extend in generally parallel relation; a backspan 362, which connects the frame portions 358, 360; slots 364; and openings 366.

The slots 364 extend in generally parallel relation to the length of the drive member 188 and the depth width W (FIG. 11) of the landing platform 110 and in generally orthogonal (perpendicular) relation to the depth D of the landing platform 110. The slots 364 receive fasteners 368 such that the fasteners 368 extend through the frame 352 and into the underside 146 of the landing platform 110 (i.e., the stage 120). Reception (positioning) of the fasteners 368 within the slots 364 movably connects (secures) the bracket 310 to the landing platform 110 and facilitates axial movement (repositioning) of the bracket 310 in relation to the bracket 308 and the landing platform 110 as the pulley assembly 230 is compressed and expanded, during which, the fasteners 368 move axially through the slots 364.

The openings 366 receive the pulley shaft 354 such that the pulley shaft 354 extends into and through the frame 352 via the openings 366. Reception (positioning) of the pulley shaft 354 within the openings 366 inhibits (if not entirely prevents) lateral movement of the pulley shaft 354 and, thus, the pulley 356, in relation to the frame 352 such that the pulley 356 and the axis rotation R4 are laterally fixed (i.e., immovable) in relation the frame 352.

The pulley 356 is connected (secured) to the pulley shaft 354 and engages (contacts) the drive member 188 such that the drive member 188 extends about the pulley 356 whereby movement (repositioning) of the drive member 188 causes corresponding rotation of the pulley 356 in relation to the frame 352 about the axis of rotation R4. The pulley 356 thus supports and guides the drive member 188 in order to maintain the tension therein.

With reference now to FIGS. 16, 23, 24, and 31, the slide assemblies 194 will be discussed. The slide assemblies 194 are connected (secured) to and extend between the landing platform 110 (i.e., the stage 120) and the alignment members 124 so as to support the alignment members 124 and facilitate repositioning thereof between the extended and retracted positions and, thus, reconfiguration of the landing platform 110 between the first and second configurations.

The slide assemblies 194 include: slide brackets 370; guides 372; slide members 374; and (splash) guards 376.

The slide brackets 370 are connected (secured) to the landing platform 110 and support the guides 372, the slide members 374, and the guards 376. The slide brackets 370 are generally L-shaped in configuration and include (first and second) legs 378, 380, which extend in generally orthogonal (perpendicular) relation.

The legs 378 include openings 382, which receive fasteners 384 such that the fasteners 384 extend through the legs 378 and into the underside 146 of the landing platform 110 (i.e., the stage 120), thereby directly connecting (securing) the slide brackets 370 and, thus, the slide assemblies 194 to the landing platform 110.

The legs 380 include openings 386, which are oriented in generally orthogonal (perpendicular) relation to the openings 382 and receive fasteners 388 such that the fasteners 388 extend through the guides 372 and into the legs 380. The fasteners 388 thus directly and fixedly (i.e., immovably) connect (secure) the guides 372 to the slide brackets 370 so as to inhibit (if not entirely prevent) relative movement therebetween.

The guides 372 connect the slide members 374 to the slide brackets 370 and support the slide members 374. More specifically, the guides 372 support the slide members 374 such that the slide members 374 are axially repositionable (movable) in relation thereto during extension and retraction of the alignment members 124, as described in further detail below.

In certain embodiments, it is envisioned that the guides 372 and/or the slide members 374 may include (one or more) at least one stop in order to limit relative (axial) movement between the guides 372 and the slide members 374 (i.e., movement of the slide members 374 in relation to the guides 372).

The slide members 374 include openings 390, 392 and are connected (secured) to and extend between the guides 372 and the guards 376 and the alignment members 124, thereby connecting the guards 376 and the alignment members 124 to the guides 372 such that the guards 376 and the alignment members 124 are movable (repositionable) in relation thereto.

The openings 390 receive the fasteners 178 such that the fasteners 178 extend through the slide members 374, through the guards 376, and into the alignment members 124. The fasteners 178 directly and fixedly (i.e., immovably) connect (secure) the slide members 374 to the guards 376 and the alignment members 124 so as to inhibit relative movement therebetween such that movement of the alignment members 124 (i.e., extension and retraction thereof) causes corresponding movement of the slide members 374 and the guides 372.

The openings 392 receive fasteners 394 such that the fasteners 394 extend through the slide members 374 and into the guards 376. The fasteners 394 directly and fixedly (i.e., immovably) connect (secure) the slide members 374 to the guards 376 so as to inhibit relative movement therebetween such that the guards 376 move concomitantly (simultaneously) with the slide members 374.

In the illustrated embodiment, each of the slide assemblies 194 includes (first and second) slide members **374*i*, 374*ii* (FIG. 23) that are connected (secured) together so as to facilitate relative movement therebetween (e.g., via ball bearings and races, etc.). More specifically, in the illustrated embodiment, the slide member 374*ii* is nested within (received by) the slide member 374*i* such that the slide member 374*ii* is axially repositionable (slidable) in relation thereto, which facilitates telescopic extension and retraction of the slide assemblies 194. Embodiments of the slide assemblies 194 that include a single slide member 374** are also envisioned herein, however.

The guards 376 conceal (cover) the slide members 374 in order to protect the slide members 374 from water and/or debris, and thereby maintain the functionality (e.g., axial movement) thereof. More specifically, the guards 376 are positioned (located) between the slide members 374 and the alignment members 124 (i.e., the alignment brackets 152).

The guards 376 are non-metallic in construction (e.g., are formed from polycarbonate) and include: (first) openings 396, which receive the fasteners 178; (second) openings 398, which receive the fasteners 180; (third) opening 400, which receive the fasteners 394; and ribs 402.

The openings 398 receive the fasteners 180 such that the fasteners 180 extend through the guards 376 and into the alignment members 124 (i.e., the alignment brackets 152). The fasteners 180 thus directly and fixedly (i.e., immovably) connect (secure) the guards 376 to the alignment members 124 so as to inhibit relative movement therebetween in order to further facilitate concomitant (simultaneous) movement of the guards 376 with the alignment members 124 and the slide members 374.

The ribs 402 extend in a generally vertical orientation and are spaced axially along the length of the drive member 188 so as to define receiving spaces 404 therebetween. The receiving spaces 404 are configured to receive the mounts 176 on the alignment brackets 152 to facilitate proper registration of (alignment between) the guards 376 and the alignment members 124.

With general reference now to FIGS. 1-4 and 11-16, a method of docking the UAV 10 (FIGS. 3B, 8C, 12-15) with the base station 100 will be discussed, which includes a landing procedure followed by an alignment procedure.

During the landing procedure, the roof 104 (FIGS. 1-4) is opened in order to allow visual identification of the fiducials 122 and guidance of the UAV 10 towards the landing platform 110.

In contrast to certain known base stations, which often include a landing surface (e.g., a cradle) that is extendible from and retractable into the base station during landing, the landing platform 110 is open and positioned in a fixed location during landing of the UAV 10. The fixed location of the landing platform 110 improves the predictability of wind conditions, propeller wash, etc., thereby improving control of the UAV 10 during landing.

Prior to touchdown, the locations (positions) of the alignment members 124 are determined (e.g., via the sensor(s) 142 (FIG. 22)) and, if necessary, the alignment members 124 are repositioned towards the extended position (FIGS. 11, 12, 16) via the drive mechanism 128 (FIG. 16) in order to prepare the landing platform 110 for reception of the UAV 10.

In order to move the alignment members 124 towards the extended position, the motor assembly 186 is actuated such that the pulley 234 is rotated in a first direction 1 (FIG. 26), which acts upon and moves the drive member 188. Movement of the drive member 188 transfers force to the alignment members 124 via the drive brackets 190 such that the alignment members 124 move through the slots 126 (FIGS. 11-13) in the landing platform 110 and are repositioned towards the extended position.

Upon touchdown, the base station 100 performs a landing assessment to confirm proper landing of the UAV 10 (i.e., that the legs 14 of the UAV 10 have been received by the landing areas 132). In the event of an improper landing, the landing procedure is aborted, the UAV 10 is caused to ascend, and landing is reattempted.

Upon confirmation of proper landing, the alignment procedure is initiated via actuation of the motor assembly 186 and rotation of the pulley 234 in a second direction 2 (FIG. 26), which repositions the alignment members 124 towards the retracted position (FIGS. 8C, 13) by transferring force thereto via the drive member 188 and the drive brackets 190.

During retraction of the alignment members 124, the projections 150 (FIGS. 8C, 12, 13, 18, 19) are brought into engagement (contact) with the UAV 10 (e.g., the legs 14) such that the bearing surfaces 154 urge the UAV 10 outwardly towards the periphery 158 (FIG. 12) of the landing platform 110. Retraction of the alignment members 124 continues until the power source 12 on the UAV 10 is brought into general alignment with the charging hub 108, as seen in FIG. 14.

The charging hub 108 is then repositioned from the retracted position (FIG. 14) into the extended position (FIG. 15) such that that the charging hub 108 protrudes from the landing platform 110 (i.e., via the window 130) and engages (contacts) the power source 12 on the UAV 10 to facilitate charging thereof.

Following charging, the charging hub 108 is retracted, thereby disengaging the charging hub 108 from the power source 12 on the UAV 10. The alignment members 124 are then extended to thereby disengage and separate the alignment members 124 from the UAV 10. The UAV 10 then ascends, and the roof 104 is closed.

In certain methods of docking the UAV 10, following retraction of the charging hub 108, it is envisioned that the base station 100 may be utilized to (temporarily or indefinitely) store the UAV 10. In such methods, it is envisioned that the alignment members 124 may remain in the retracted position (e.g., in engagement (contact) with the UAV 10) to thereby stabilize and secure the UAV 10 on the landing platform 110. Alternatively, it is envisioned that the alignment members 124 may be extended to thereby disengage and separate the alignment members 124 from the UAV 10, which may occur prior to, concomitantly with, or following closure of the roof 104.

Persons skilled in the art will understand that the various embodiments of the disclosure described herein and shown in the accompanying figures constitute non-limiting examples and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°+25% (i.e., an angle that lies within the range of (approximately) 135° to (approximately)) 225° and the term "generally orthogonal" should be understood as referring to configurations in with the pertinent components are oriented so as to define an angle therebetween that is equal to 90°+25% (i.e., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another.

Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A base station for an unmanned aerial vehicle (UAV), the base station comprising:

a roof; and a base supporting the roof, wherein the base includes:

a body; and a landing platform supported by the body, wherein the landing platform includes:

a stage defining landing areas configured to receive the UAV during docking such that the UAV is movable within the landing areas; and a single pair of alignment members configured for engagement with the UAV, wherein the alignment members are repositionable in relation to the stage from an extended position into a retracted position to thereby reposition the UAV on the landing platform and inhibit contact between the UAV and the roof during closure of the roof.

2. The base station of claim 1, wherein the landing platform is pivotably connected to the body such that the landing platform is repositionable between a closed position and an open position.

3. The base station of claim 1, wherein the landing areas define depressions extending vertically into the stage.

4. The base station of claim 3, wherein the depressions are generally circular in configuration and are configured to receive legs of the UAV.

5. The base station of claim 1, wherein the alignment members are positioned laterally outward of the landing areas in the extended position.

6. The base station of claim 1, wherein the alignment members include:

fences spanning the landing areas; and projections extending laterally inward from the fences.

7. The base station of claim 6, wherein the projections are generally centered along the fences.

8. The base station of claim 6, wherein the projections are generally triangular in configuration.

9. The base station of claim 6, wherein the projections define bearing surfaces configured for engagement with the UAV.

10. The base station of claim 9, wherein the bearing surfaces subtend an angle therebetween substantially within a range of approximately 90 degrees to approximately 150 degrees whereby the projections urge the UAV outwardly towards a periphery of the landing platform upon contact therewith during repositioning of the alignment members from the extended position into the retracted position.

11. A base station for an unmanned aerial vehicle (UAV), the base station comprising:

a body;

a charging hub supported by the body and configured for electrical connection to the UAV to facilitate charging thereof; and a landing platform supported by the body, wherein the landing platform includes:

a stage including:

depressions configured to receive the UAV to thereby inhibit movement of the UAV in relation to the landing platform such that the UAV is movable within the depressions; and a window generally aligned with the charging hub; and a single pair of alignment members configured for engagement with the UAV, wherein the alignment members are repositionable in relation to the stage from an extended position into a retracted position to thereby generally align a power source on the UAV with the charging hub.

12. The base station of claim 11, wherein the landing platform further includes:

fiducials configured to facilitate landing of the UAV.

13. The base station of claim 12, wherein the fiducials include:

at least one first fiducial having a first configuration; and at least one second fiducial having a second configuration different than the first configuration.

14. The base station of claim 13, wherein the at least one first fiducial is positioned within at least one of the depressions.

15. The base station of claim 14, wherein the at least one second fiducial is positioned between the depressions.

16. The base station of claim 15, wherein the landing platform further includes:

at least one light source associated with the at least one first fiducial and the at least one second fiducial to facilitate backlighting thereof.

17. The base station of claim 16, wherein the fiducials further include at least one third fiducial devoid of backlighting.

18. A base station for an unmanned aerial vehicle (UAV), the base station comprising:

a charging hub configured for electrical connection to the UAV, wherein the charging hub is repositionable between an extended position and a retracted position; and a landing platform configured to receive the UAV, wherein the landing platform is reconfigurable from a first configuration into a second configuration to thereby generally align the UAV with the charging hub and facilitate charging of the UAV.

19. The base station of claim 18, wherein the landing platform includes a single pair of alignment members repositionable along an axis extending in generally orthogonal relation to a landing direction of the UAV during reconfiguration of the landing platform from the first configuration into the second configuration.

20. The base station of claim 19, wherein the alignment members are movable laterally inward towards each other during reconfiguration of the landing platform from the first configuration into the second configuration.

* * * * *